United States Patent
Tanaka et al.

(10) Patent No.: US 8,800,873 B2
(45) Date of Patent: Aug. 12, 2014

(54) APPARATUS FOR OPTICALLY READING INFORMATION STORED IN GRAPHIC SYMBOL

(75) Inventors: Masami Tanaka, Handa (JP); Kunihiko Ito, Chiryu (JP); Manabu Miyazaki, Kariya (JP); Hiroshi Ota, Nagoya (JP); Koji Konosu, Kariya (JP)

(73) Assignee: Denso Wave Incorporated, Tokyo (JP)

( * ) Notice: Subject to any disclaimer, the term of this patent is extended or adjusted under 35 U.S.C. 154(b) by 1890 days.

(21) Appl. No.: 11/812,686

(22) Filed: Jun. 21, 2007

(65) Prior Publication Data
US 2007/0295814 A1 Dec. 27, 2007

(30) Foreign Application Priority Data

| Jun. 22, 2006 | (JP) | 2006-172957 |
| Sep. 6, 2006 | (JP) | 2006-241504 |
| Mar. 22, 2007 | (JP) | 2007-075345 |

(51) Int. Cl.
*G06K 7/10* (2006.01)
*G06K 9/36* (2006.01)
*G06K 9/80* (2006.01)
*G06K 5/04* (2006.01)
*G06K 9/00* (2006.01)
*G06K 9/22* (2006.01)
*G06K 19/06* (2006.01)
*G06K 19/08* (2006.01)
*G06K 21/00* (2006.01)
*G06K 7/14* (2006.01)

(52) U.S. Cl.
USPC .............. 235/462.1; 235/462.01; 235/462.12; 235/454; 235/462.04; 235/462.06; 235/462.25

(58) Field of Classification Search
USPC .................... 235/462.1, 462.12, 462.01, 454, 235/462.04, 462.06, 462.25
See application file for complete search history.

(56) References Cited

U.S. PATENT DOCUMENTS 4,654,583 A * 3/1987 Ninomiya et al. ............ 382/147
5,528,022 A * 6/1996 Nakazawa ..................... 235/436

(Continued)

FOREIGN PATENT DOCUMENTS

| DE | 603 00 635 | 7/2003 |
| JP | S59-041088 | 3/1984 |

(Continued)

OTHER PUBLICATIONS

Office Action dated Feb. 12, 2009 in the corresponding German patent application No. 10 2007 028 866.4-53 (and English translation).

(Continued)

*Primary Examiner* — Daniel Walsh
(74) *Attorney, Agent, or Firm* — Posz Law Group, PLC

(57) ABSTRACT

In an apparatus for optically reading a graphic symbol composed of a plurality of optically identifiable unit sections of information, a first image pickup unit has a first photodetector and picks up a first optical image of the graphic symbol based on light detected by the first photodetector. A second image pickup unit has a second photodetector and configured to pick up a second optical image of the graphic symbol based on light detected by the second photodetector. A correcting unit corrects a light intensity level of at least one section of one of the first and second optical images based on a light intensity level of at least one section of the other of the first and second optical images. The at least one section corresponds to at least one of the unit sections of information of the graphic symbol.

20 Claims, 31 Drawing Sheets

(56) References Cited

U.S. PATENT DOCUMENTS

| | | | |
|---|---|---|---|
| 5,942,762 A * | 8/1999 | Hecht | 250/556 |
| 6,130,437 A * | 10/2000 | Cerny et al. | 250/559.4 |
| 6,147,358 A * | 11/2000 | Hecht | 250/566 |
| 6,394,349 B1 * | 5/2002 | Shigekusa et al. | 235/454 |
| 6,997,384 B2 | 2/2006 | Hara | |
| 7,219,843 B2 * | 5/2007 | Havens et al. | 235/462.42 |
| 8,366,004 B2 * | 2/2013 | Li et al. | 235/462.12 |
| 2003/0116628 A1 * | 6/2003 | Nakazawa et al. | 235/462.1 |
| 2003/0123710 A1 * | 7/2003 | Nakazawa et al. | 382/115 |
| 2003/0222147 A1 * | 12/2003 | Havens et al. | 235/462.45 |
| 2004/0020990 A1 * | 2/2004 | Havens et al. | 235/472.01 |
| 2004/0164165 A1 * | 8/2004 | Havens et al. | 235/462.43 |
| 2005/0279836 A1 * | 12/2005 | Havens et al. | 235/472.01 |
| 2006/0283952 A1 * | 12/2006 | Wang | 235/462.01 |
| 2007/0194121 A1 * | 8/2007 | Yang et al. | 235/454 |
| 2008/0080785 A1 * | 4/2008 | Ford | 382/275 |
| 2009/0212112 A1 * | 8/2009 | Li et al. | 235/462.12 |
| 2012/0154659 A1 * | 6/2012 | Wang | 348/333.1 |
| 2013/0153662 A1 * | 6/2013 | Narasa Prakash | 235/462.07 |
| 2013/0338506 A1 * | 12/2013 | Kim et al. | 600/447 |

FOREIGN PATENT DOCUMENTS

| | | |
|---|---|---|
| JP | H02-098789 | 4/1990 |
| JP | A-05-089274 | 4/1993 |
| JP | A-06-251184 | 9/1994 |
| JP | H11-120284 | 4/1999 |

OTHER PUBLICATIONS

Office Action dated Oct. 31, 2008 in corresponding Chinese patent application No. 200710112049.6 (and English translation).

Office Action dated Oct. 14, 2008 in corresponding Korean patent application No. 10-2007-0061261 (and English translation).

* cited by examiner

FIG. 8A
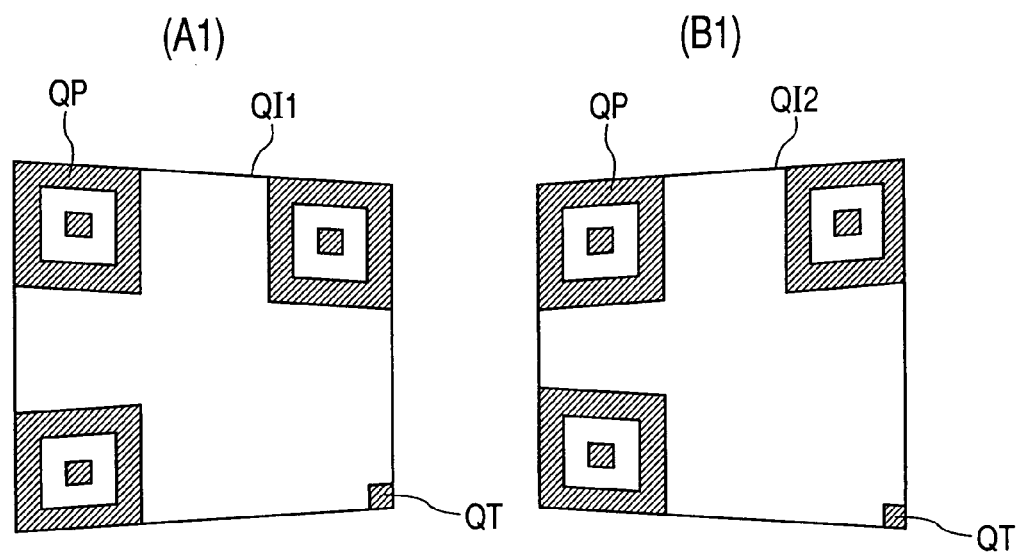
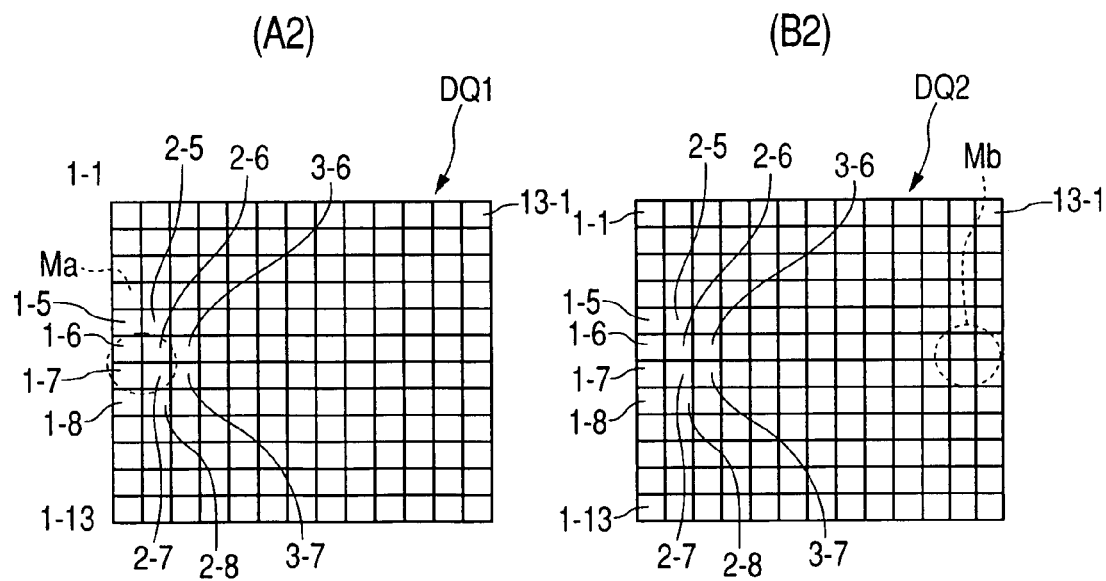

FIG. 8B (A3)

| | 2-5 | DQ1 |
|---|---|---|
| 1-5 | 36 | 36 |
| 1-6 | 255 | 255 | 36 |
| 1-7 | 255 | 255 | 78 |
| 1-8 | 78 | 36 | |

(labels: 2-6, 3-6, 3-7, 2-7, 2-8)

(B3)

| | | DQ2 |
|---|---|---|
| 1-5 | 36 | 36 |
| 1-6 | 78 | 25 | 36 |
| 1-7 | 78 | 24 | 78 |
| 1-8 | 78 | 36 | |

(labels: 2-5, 2-6, 3-6, 3-7, 2-7, 2-8)

(A4)

| | | DQ1 |
|---|---|---|
| 1-5 | 36 | 36 |
| 1-6 | 78 | 25 | 36 |
| 1-7 | 78 | 24 | 78 |
| 1-8 | 78 | 36 | |

(labels: 2-5, 2-6, 3-6, 3-7, 2-7, 2-8)

FIG. 15
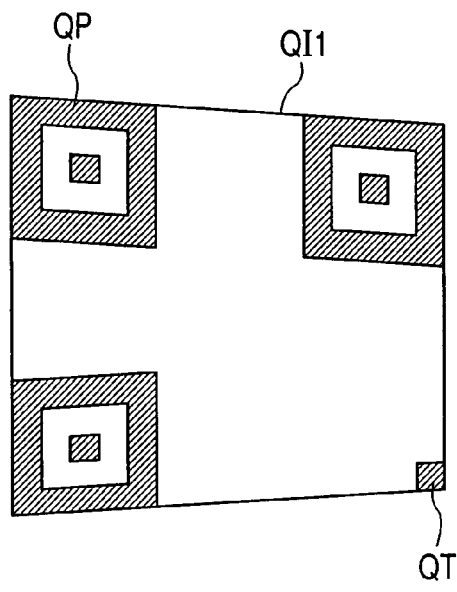
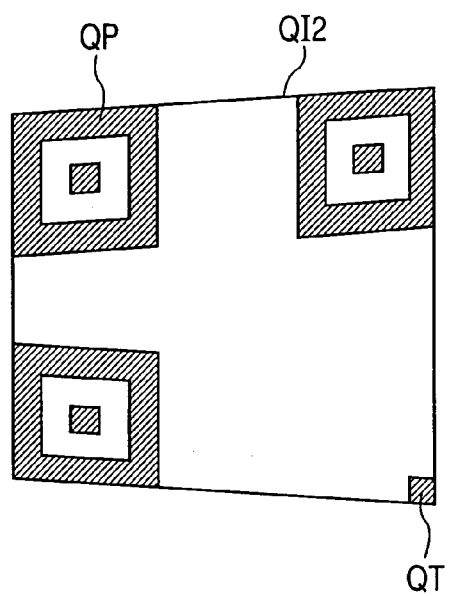
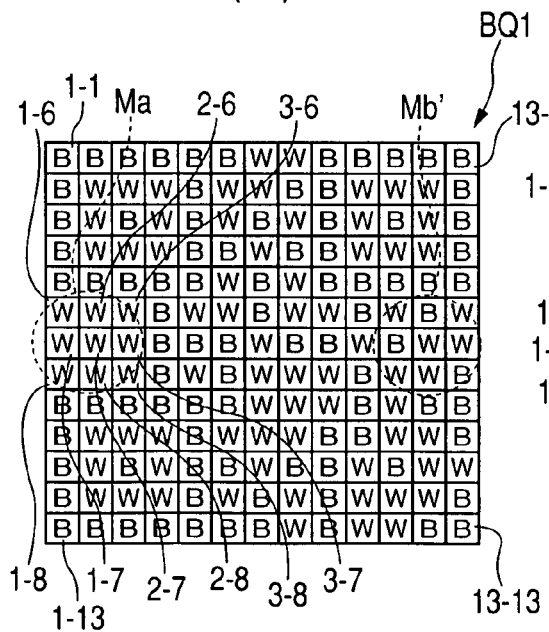
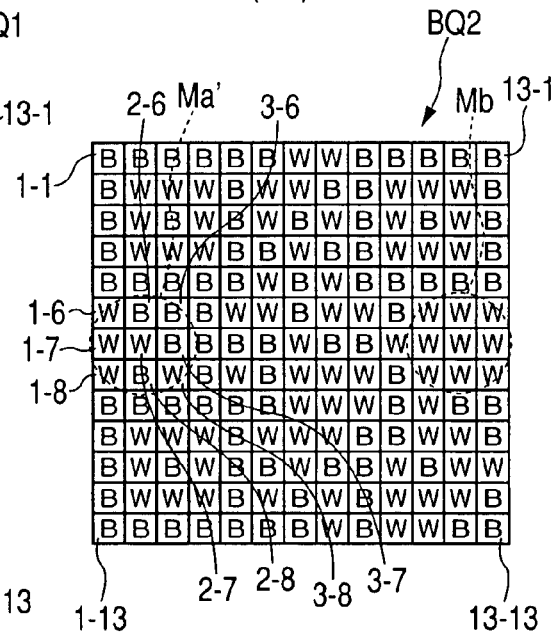

FIG. 20
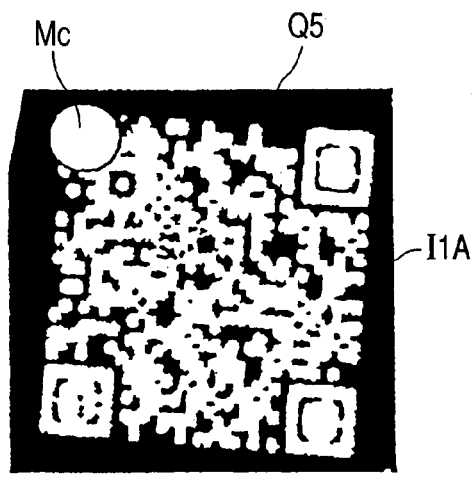
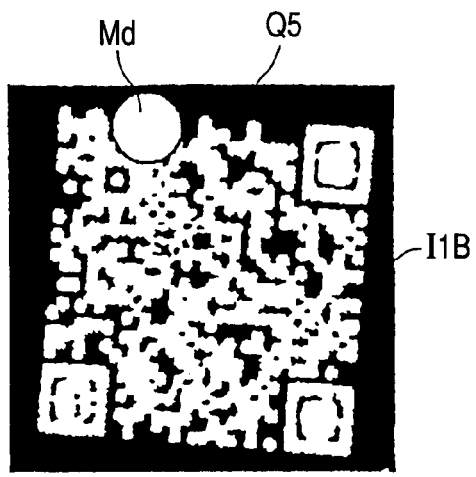
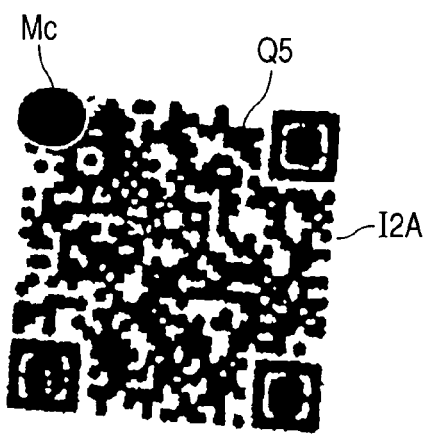
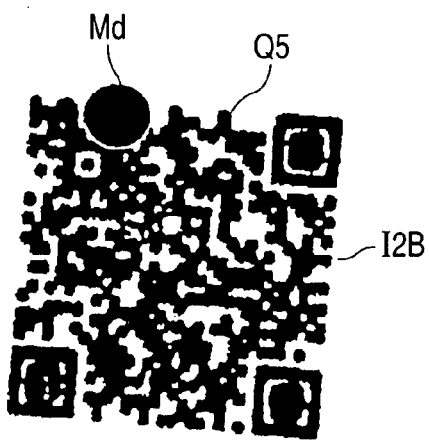

FIG. 21
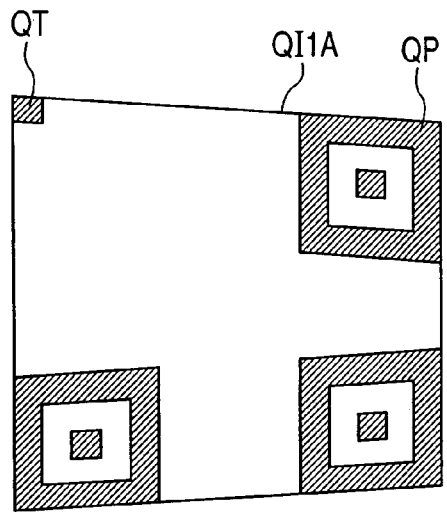
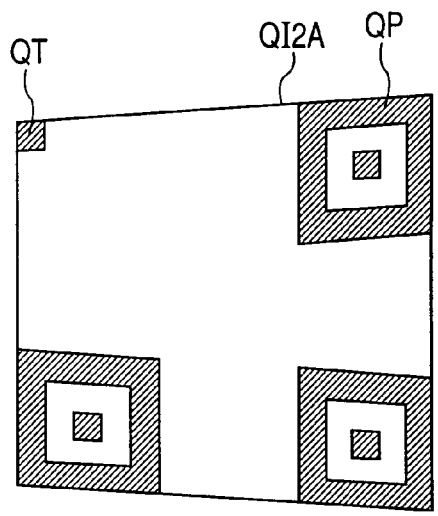
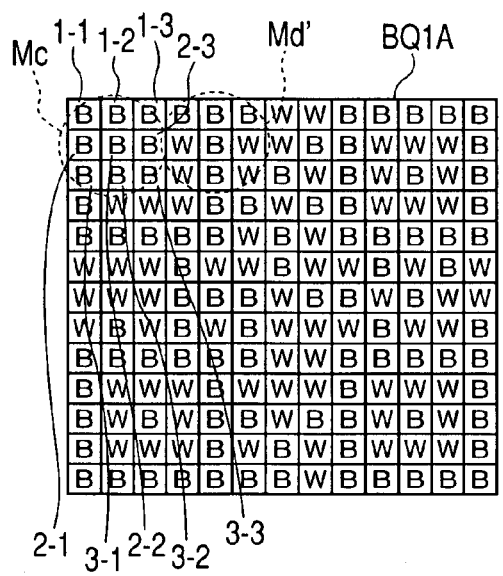
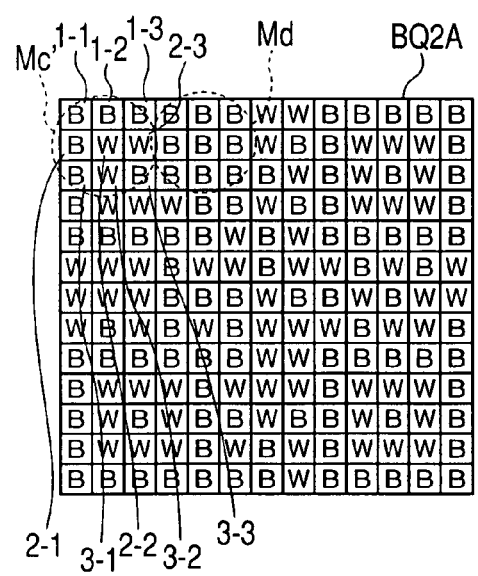

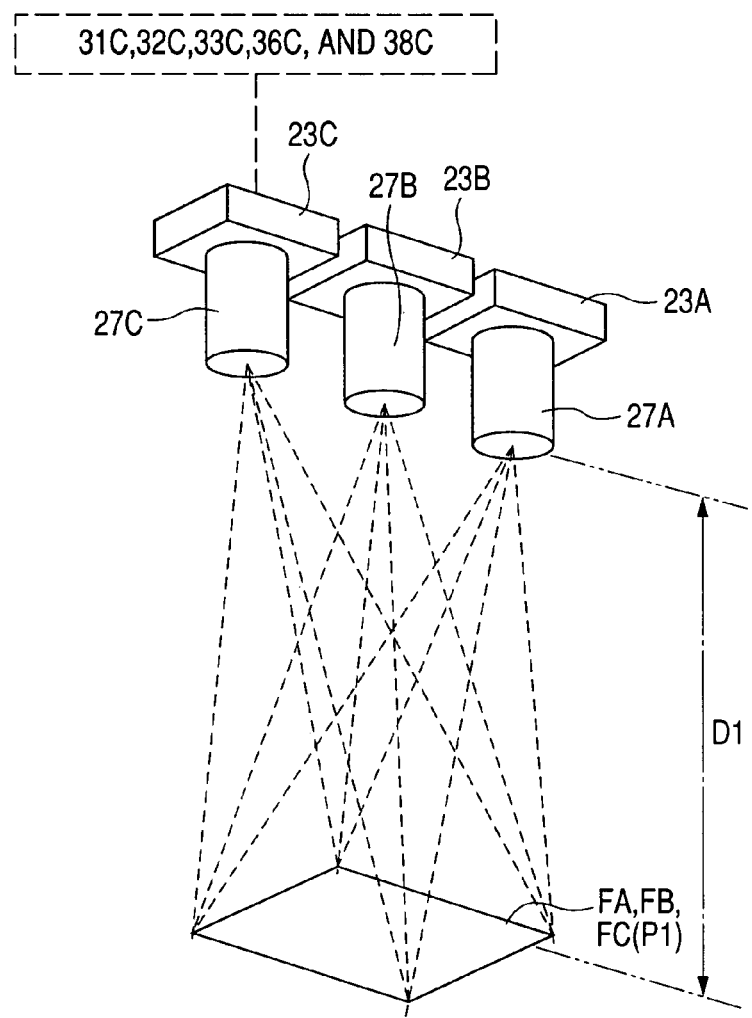

FIG. 26

FIG. 30
(A)
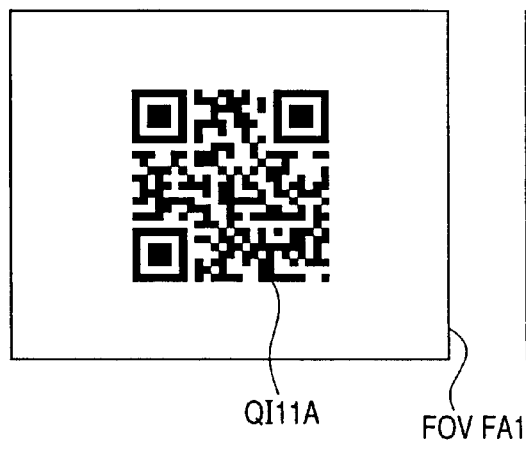
QI11A  FOV FA1
(B)
QI12A  FOV FA1
(C)
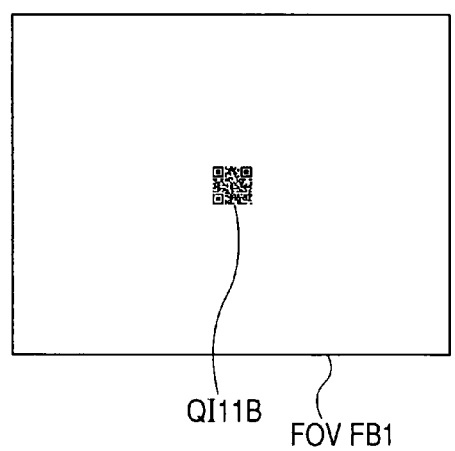
QI11B  FOV FB1
(D)
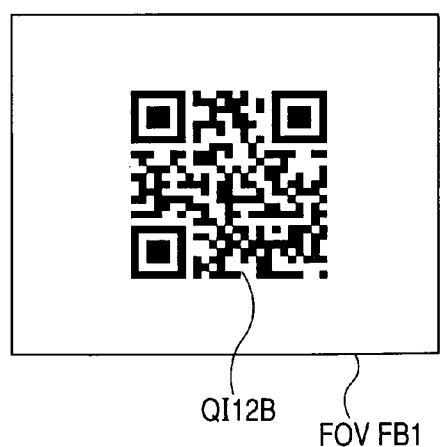
QI12B  FOV FB1

APPARATUS FOR OPTICALLY READING INFORMATION STORED IN GRAPHIC SYMBOL

CROSS REFERENCE TO RELATED APPLICATIONS

This application is based on Japanese Patent Applications 2006-172957, 2006-241504, and 2007-075345 which were respectively filed on Jun. 22, 2006, Sep. 6, 2006, and Mar. 22, 2007. This application aims the benefit of priority from the Japanese Patent Applications, so that the descriptions of which are all incorporated herein by reference.

FIELD OF THE INVENTION

The present invention relates to apparatuses capable of optically reading graphic symbols, such as barcodes, QR Codes®, and the like, used to be attached to targets, such as commercial goods.

BACKGROUND OF THE INVENTION

Optical information readers that aim at optically reading information symbols, such as barcodes, QR codes, and the like, attached to goods and documents have been well known.

Such optical information readers are each made up of a handheld body case provided at its one end portion with a reading window; a photodetector, such as a CCD (Charge-Coupled Device) area sensor; an imaging unit with an imaging lens; and a light illuminating device, such as a LED (Light Emitting Diode). The photodetector, the imaging unit, and the light illuminating device are installed in the body case.

In this structure of the optical information reader, when a user wants to read an information symbol attached to a goods, the user for example locates the optical information reader so that the reading window is opposite to the goods and away therefrom at an arbitrary distance.

While the optical information reader is arranged in such a state, the light illuminating device works to supply illumination light through the reading window toward an information symbol to be irradiated thereto. Light reflected from the information symbol based on the irradiated illumination light enters through the reading window into the imaging unit.

The light entered into the imaging unit is focused on the photodetector by the imaging lens to be imaged thereon, so that an image corresponding to the information symbol is picked up by the photodetector. Based on the contrast pattern between light (white) pixels and dark (black) pixels in the picked-up image, information stored in the information symbol can be decoded.

When such an optical information reader is used to read an information symbol printed on a calendered paper, the illumination light irradiated on the information symbol on the calendered paper may be specularly reflected depending on an incident angle of the illumination light with respect to the calendered paper. The incident angle of the illumination light with respect to a surface of a target for reading means an angle of the illumination light with respect to the normal of the surface. The incident angle will also be referred to as a reading angle hereinafter.

This specular reflection (mirror reflection) may cause at least part of the information symbol to be picked up as light pixels (white pixels) independently of the light and dark information stored in the corresponding at least part of the information symbol. This may cause improper reading of the information stored in the information symbol Particularly, in reading an information symbol directly marked on a metal surface of goods in direct marking, such specular reflection may likely appear, making it difficult to properly read the information stored in the information symbol.

In such cases where the information stored in an information symbol is improperly read by an optical information reader, the optical information reader is designed to determine that a target for reading is abnormal. For this reason, a user periodically tries to:

rearrange the optical information reader in front of the target information symbol while changing the position of the optical information reader relative to the target information symbol and/or the reading angle of the optical information reader with respect thereto; and perform the image reading operations every rearranging.

This may deteriorate the efficiency of reading the information stored in the information symbol.

In order to reduce the influence of specular reflection, some conventional optical information readers have been prepared.

As a first example, U.S. Pat. Publication No. 6,394,349 corresponding to Japanese Unexamined Patent Publication No. H11-120284 discloses an optical information reader.

The optical information reader as the first example is designed to:

irradiate a target information code by using one combination of a plurality of illumination light beams whose irradiating directions with respect to the information code are different from each other;

read a first image of the information code using light reflected by the information code based on the one combination of the plurality of illumination light beams being irradiated on the information code;

determine whether a specular reflection region exists in the first image;

irradiate the target information code by using another combination of the plurality of illumination light beams when it is determined that a specular reflection region exists in the first image;

read a second image of the information code using light reflected by the information code based on another combination of the plurality of illumination light beams being irradiated on the information code; and combine the first image and the second image, thus reading the combined image.

As a second example, Japanese Unexamined Patent Publication No. S59-41088 discloses an optical information reader designed to mechanically change the incident angle of an illumination light with respect to an information code when optically detecting the occurrence of specular reflection.

However, in the optical information reader of the second example, the structure of the mechanical change of the incident angle may increase in complexity.

As a third example, Japanese Unexamined Patent Publication No. H02-98789 discloses an image reader with first and second image pickup devices. The first and second image pickup devices are disposed opposing to a calendered surface of a target plate on which a character string has been printed such that whose optical axes are orthogonal thereto and parallel to each other. When the first and second image pickup devices work to respectively pick up corresponding first and second images of the target, the first and second images are written into corresponding first and second memories, respectively.

Thereafter, an image superimposing circuit of the image reader is designed to carry out image superimposing tasks to:

associate all addresses of the first memory with those of the second memory such that a part of the first image of the same part of the target corresponds to that of the second image thereof;

compare the light intensity data of each pixel of the first image data with that of a corresponding one pixel of the second image data;

select the light intensity data of some pixels of the first image data to write it into a superimposing image memory when it is determined that the light intensity of some pixels of the first image data is lower than that of corresponding some pixels of the second image data based on the comparison result; and select the light intensity data of the remaining pixels of the second image data to write it into the superimposing image memory when it is determined that the light intensity of the remaining pixels of the first image data is lower than that of the corresponding remaining pixels of the second image data based on the comparison result.

However, in the image reader of the third example, because the image superimposing task is carried out pixel by pixel of each of the first and second images of the target, it may increase in complexity.

In addition, in direct marking, an information symbol is directly printed on a surface of a target part. For this reason, there are many information symbols to be used for directly marking, whose unit section of information contained therein, such as a cell in QR codes, is smaller in size than that of information contained in another information symbol to be used except for the directly marking.

In order to read an information symbol consisting of a plurality of unit sections of information having a comparatively small size, the angle of view of an imaging unit of an optical information reader is set to be narrow. This allows the number of pixels of a photodetector to be allocated to each unit section of information of the information symbol to increase. Note that, in this specification, the angle of view of an imaging unit means the angle of visible field of view measured from the center of an imaging lens. In other words, the angle of view of an imaging unit means the angle of a field of view of a photodetector to be imaged thereby.

However, the narrower the angle of view of an imaging lens is, the narrower the field of view of a photodetector is. For this reason, an information reader with an imaging unit having a narrow angle of view can pick up an image of an information symbol consisting of a plurality of comparatively small-sized unit sections of information. However, it may be difficult for an information reader with an imaging unit having a narrow angle of view to pick up an image of an information symbol consisting of a plurality of comparatively large-sized unit sections of information. This is because the information symbol consisting of a plurality of comparatively large-sized unit sections of information may extend off the filed of view of the photodetector.

SUMMARY OF THE INVENTION

In view of the background, an object of at least one aspect of the present invention is to provide optical information reading apparatuses, which are capable of simply reading information stored in a graphic symbol with either little or no influence of at least one of specular reflection and the size of each unit section of information contained in the graphic symbol.

According to one aspect of the present invention, there is provided an apparatus for optically reading a graphic symbol composed of a plurality of optically identifiable unit sections of information. The apparatus includes a first image pickup unit having a first photodetector and configured to pick up a first optical image of the graphic symbol based on light detected by the first photodetector. The apparatus includes a second image pickup unit having a second photodetector and configured to pick up a second optical image of the graphic symbol based on light detected by the second photodetector. The apparatus includes a correcting unit configured to correct a light intensity level of at least one section of one of the first and second optical images based on a light intensity level of at least one section of the other of the first and second optical images. The at least one section corresponds to at least one of the unit sections of information of the graphic symbol.

According to another aspect of the present invention, there is provided an apparatus for optically reading a graphic symbol composed of a plurality of optically identifiable unit sections of information. The apparatus includes a first image pickup unit having a first imaging optics and a first photodetector optically coupled thereto. The first imaging optics and the first photodetector have a predetermined first field of view. The first image pickup unit is configured to pick up a first optical image of the graphic symbol based on light transferred from the graphic symbol located within the first field of view. The apparatus includes a second image pickup unit having a second imaging optics and a second photodetector optically coupled thereto. The second imaging optics and the second photodetector have a predetermined second field of view. The second image pickup unit is configured to pick up a second optical image of the graphic symbol based on light transferred from the graphic symbol located within the second field of view. The first imaging optics, the first photodetector, the second imaging optics, and the second photodetector are optically arranged such that the first field of view and the second field of view are substantially overlapped with each other. The apparatus includes a correcting unit configured to correct a light intensity level of at least one section of one of the first and second optical images based on a light intensity level of at least one section of the other of the first and second optical images.

According to a further aspect of the present invention, there is provided an apparatus for optically reading a graphic symbol composed of a plurality of optically identifiable unit sections of information, at least one of the unit sections represents a position detecting pattern. The apparatus includes a first image pickup unit having a first imaging optics and a first photodetector optically coupled thereto. The first imaging optics has a predetermined first angle of view. The first image pickup unit is configured to pick up a first optical image of the graphic symbol based on light transferred from the graphic symbol via the first imaging optics and detected by the first photodetector. The apparatus includes a second image pickup unit having a second imaging optics and a second photodetector optically coupled thereto. The second imaging optics has a predetermined second angle of view different in size from the first angle of view. The second image pickup unit is configured to pick up a second optical image of the graphic symbol based on light transferred from the graphic symbol via the second angle of view and detected by the second photodetector. The first imaging optics, the first photodetector, the second imaging optics, and the second photodetector are optically arranged such that a first field of view of the first photodetector and a second field of view of the second photodetector are substantially overlapped with each other. The apparatus includes a decoding unit configured to select one of the first optical image and the second optical image based on a difference between the position detecting pattern contained in the first optical image and the position detecting pattern contained in the second optical image, and to decode information of the unit sections of the graphical symbol based on the selected one of the first optical image and the second optical image.

BRIEF DESCRIPTION OF THE DRAWINGS

Other objects and aspects of the invention will become apparent from the following description of embodiments with reference to the accompanying drawings in which:

FIG. 8A is a view schematically illustrating clipped first and second QR code images and first and second image data respectively based on the first and second QR code images according to the first embodiment;

FIG. 8B is a view schematically illustrating digital values indicative of light intensity levels of some of cells of each of the first and second image data according to the first embodiment;

FIG. 15 is a view schematically illustrating clipped first and second QR code images and first and second binary data respectively based on the first and second QR code images according to the third embodiment;

FIG. 20 is a view schematically illustrating originally reversal first and second QR code images and black-and-white inverted first and second QR code images based on the originally reversal first and second QR code images according to the fourth embodiment;

FIG. 21 is a view schematically illustrating clipped first and second QR code images and first and second binary data respectively based on the first and second QR code images according to the fourth embodiment;

FIG. 23 is a table schematically illustrating a logical combination rule used by the optical information reader according to the fourth embodiment;

FIG. 24 is a perspective view schematically illustrating an example of part of the structure of a reading unit according to a fifth embodiment of the present invention;

FIG. 26 is a view schematically illustrating clipped first to third binary data according to the fifth embodiment;

FIG. 30 is a view schematically illustrating first QR code images of different QR codes in size being picked up by the field of view of the first photodetector, and second QR code images of the different QR codes in size being picked up by the second of view of the second photodetector;

DETAILED DESCRIPTION OF EMBODIMENTS OF THE INVENTION

Embodiments of the present invention will be described hereinafter with reference to the accompanying drawings.

First Embodiment

Figure 1:
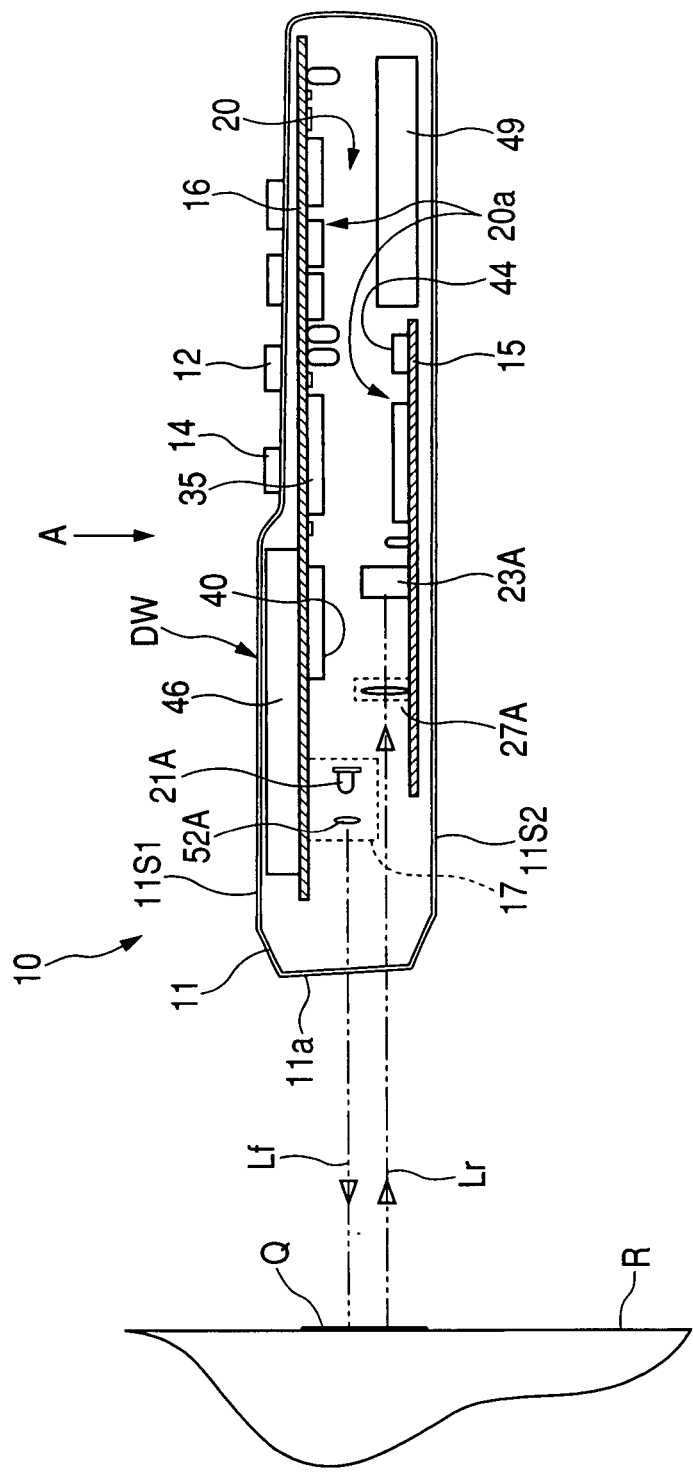
FIG. 1 is a cross sectional view schematically illustrating an example of the structure of an optical information reader according to a first embodiment of the present invention.
Figure 2:
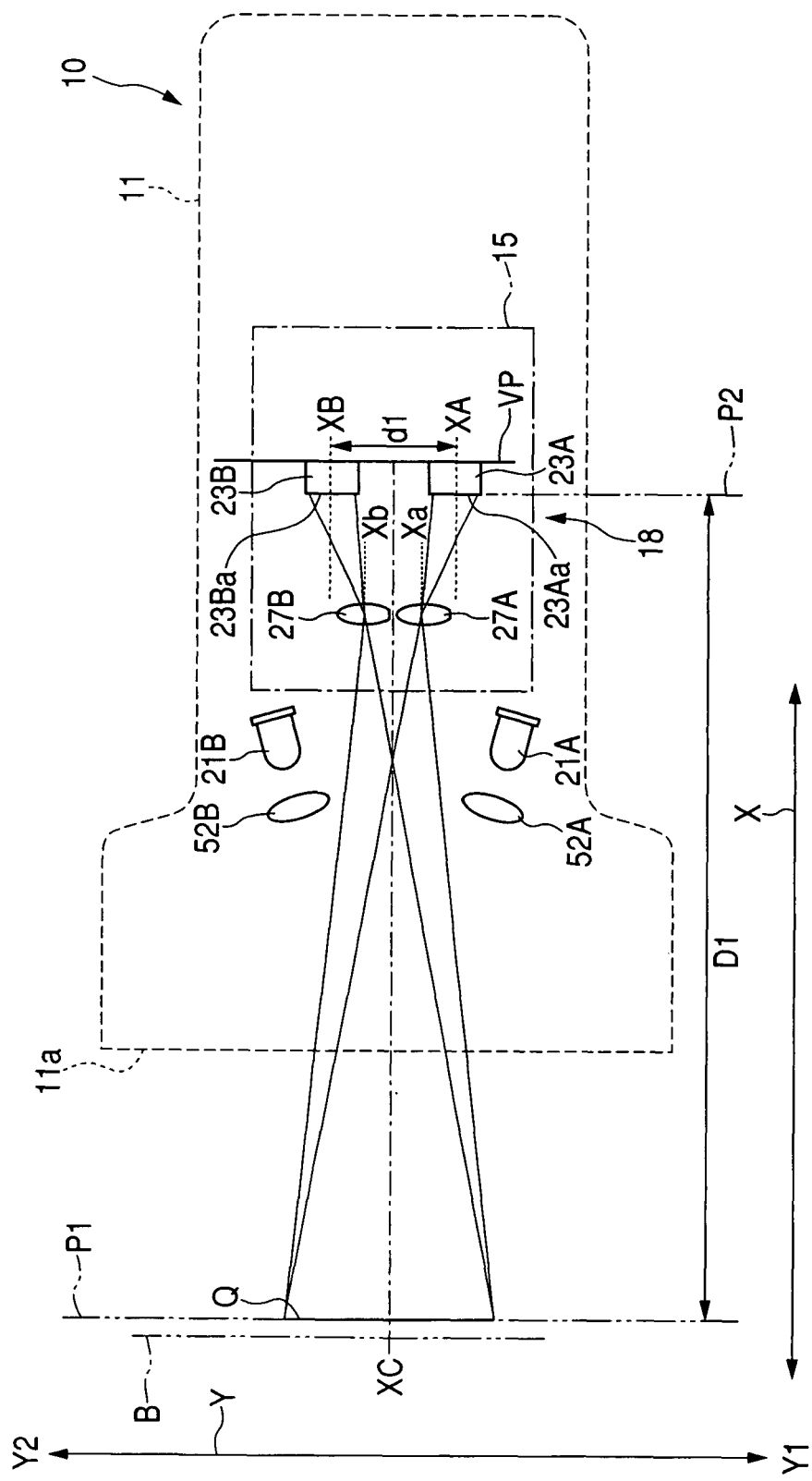
FIG. 2 is a view as viewed from the direction of arrow A of FIG. 1.
Figure 3:
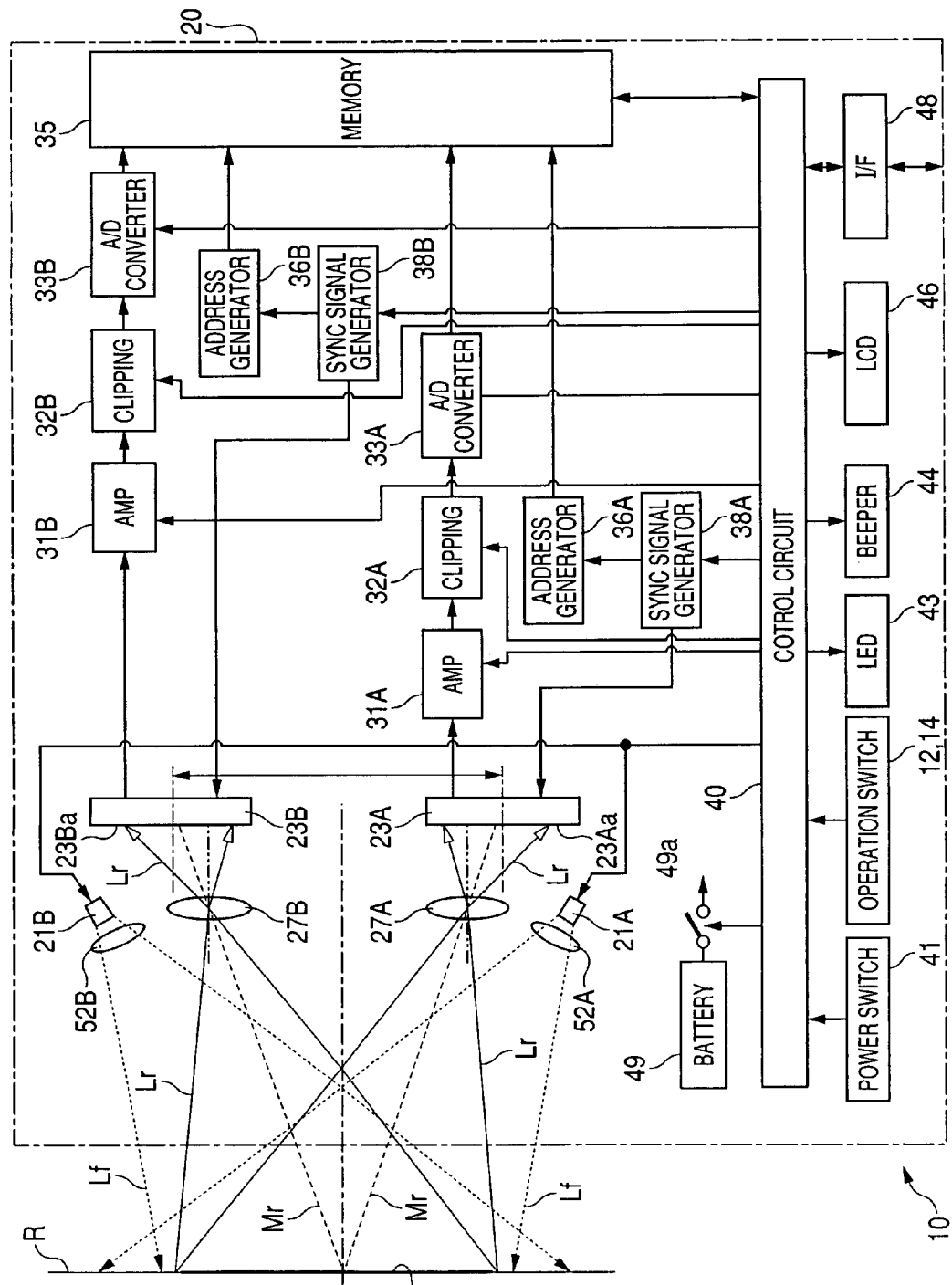
FIG. 3 is a block diagram schematically illustrating an example of the circuit structure of the optical information reader illustrated in FIG. 1.

Referring to FIGS. 1 to 3, an optical information reader 10 according to a first embodiment of the present invention, referred to simply as "information reader 10", is designed to read graphic symbols including two-dimensional codes, such as QR codes, barcodes, or other various types of graphic symbols.

The graphic symbols have been attached to targets, such as commercial goods or the like, by directly or indirectly marking, printing, or using other methods. The target R includes a label that is a piece of paper or another media. The target R can be attached on goods, which is the same as general barcodes. For example, such a graphic symbol includes information, such as a manufacturer serial number, a name, a unique identification number, a date of manufacture of the corresponding target, and the like.

In recent years, the screen of a display (e.g. a liquid crystal display) in computer terminals including a cellular phone, a PDA (Personal Digital Assistant), or the like, can be used as one of the targets. Specifically, in this case, a graphic symbol is displayed on the screen of the display.

Specifically, the information reader 10 is equipped with a substantially rectangular-parallelepiped housing 11. The housing 11 is made of synthetic resin, such as ABS resin and formed at its one lateral end with a substantially rectangular shaped reading window 11a communicated with the inner hollow space of the housing 11. For example, the reading window 11a can be designed as an opening wall or translucent surface. The size of the reading window 11a can be designed to allow the apparatus 10 to read various types of information symbols as targets of the information reader 10.

The housing 11 includes one and the other opposing long sidewalls 11S1 and 11S2. The one long side wall 11S1 is formed at its one lateral end side (reading-window side) with an opening or a translucent display window DW.

The information reader 10 is provided with operation switches 12 and 14 mounted on the one long sidewall 11S1 to be operable by users. For example, the operation switches 12 and 14 allow a user to enter various instructions to the information reader 10.

The information reader 10 is equipped with a circuit unit 20 installed in the housing 11. The circuit unit 20 is composed of a plurality of circuit components 20a described hereinafter, a substantially rectangular-shaped first circuit board 15, and a substantially rectangular-shaped second circuit board 16. Some of the circuit components are mounted on either the first circuit board 15 or second circuit board 16 to be electrically connected to each other thereon/therein.

The first circuit board 15 is supported to, for example, the other long sidewall 11S2 to be arranged in the longitudinal direction of the information reader 10. Similarly, the second circuit board 16 is supported to, for example, the one long sidewall 11S1 to be arranged in the longitudinal direction of the information reader 10.

The information reader 10 is provided with an optical system 17 mounted on one surface of one lateral end (reading-window side end) of the second circuit board 16 opposing one lateral end of the first circuit board 15. The information reader 10 is also provided with a reading unit 18 mounted on one surface of the first circuit board 15 opposing the one lateral end of the second circuit board 16.

As illustrated in FIGS. 2 and 3, the optical system 17 is composed of a pair of first and second illuminating red LEDs (Light Emitting Diodes) 21A and 21B and a pair of first and second collective lenses 52A and 52B.

For example, in the first embodiment, the first and second LEDs 21A and 21B are symmetrically disposed both sides of a center axis XC of the information reader 10 in parallel to the longitudinal direction of the reading window 11a (see "Y direction" in FIG. 2). The center axis XC of the information reader 10 is defined to pass the center of the reading window 11a in the longitudinal direction of the information reader 10 orthogonal to the reading-window surface (see "X direction" in FIG. 2).

The first and second LEDs 21A and 21B are arranged such that their optical axes are directed to the center area of the reading window 11a while intersect with each other.

Each of the collective lens 52A and 52B consists of a diffusing lens and a convex lens. Each of the collective lens 52A and 52B is coaxially aligned with a corresponding one of the first and second LEDs 21A and 21B.

The arrangement of the optical system 17 permits red illumination light Lf emitted from each of the LEDs 21A and 21B via a corresponding one of the collective lens 52A and 52B to be transferred through the reading window 11a toward the exterior thereof (see FIG. 3).

In addition, as illustrated in FIGS. 2 and 3, the reading unit 18 is composed of a pair of first and second photodetectors 23A and 23B and a pair of first and second imaging lenses 27A and 27B, which are examples of various types of imaging optics.

Each of the first and second photodetectors 23A and 23B is for example composed of a two-dimensional image sensor, such as a CMOS image sensor, a CCD (Charge Coupled Device) image sensor, or the like. Specifically, each of the first and second photodetectors 23A and 23B is provided at its one surface with a light-sensitive pixel area 23Aa and 23Ba. The light-sensitive pixel area of each of the first and second photodetectors 23A and 23B has a substantially rectangular or square shape, and is composed of optoelectric transducers (pixels) vertically and horizontally arranged in matrix (in height and width). Each of the optoelectric transducers of each of the first and second photodetectors 23A and 23B is operative to sense light, convert the sensed light to an electric signal (image), and output it.

Each of the first and second imaging lenses 27A and 27B is for example composed of a body tube and a plurality of collective lenses disposed coaxially therein.

For example, in the first embodiment, the first and second imaging lenses 27A and 27B are mounted on the one surface of the first circuit board 15 to be symmetrically disposed both sides of the center axis XC of the information reader 10 in parallel to the direction Y of the reading window 11a.

The first and second imaging lenses 27A and 27B are arranged such that their optical axes Xa and Xb are parallel to the center axis XC of the information reader 10.

As illustrated in FIG. 2, the first and second photodetectors 23A and 23B are respectively mounted on the first circuit board 15 such that:

their pixel areas respectively face the first and second imaging lenses 27A and 27B;

their other surfaces are located on a virtual plane VP disposed orthogonal to their optical axes (center axes) XA and XB of their pixel areas; and their optical axes XA and XB are arranged with a predetermined interval d1 therebetween to be shifted laterally from and parallely to the optical axes Xa and Xb of the first and second imaging lenses 27A and 27B.

Figure 4:
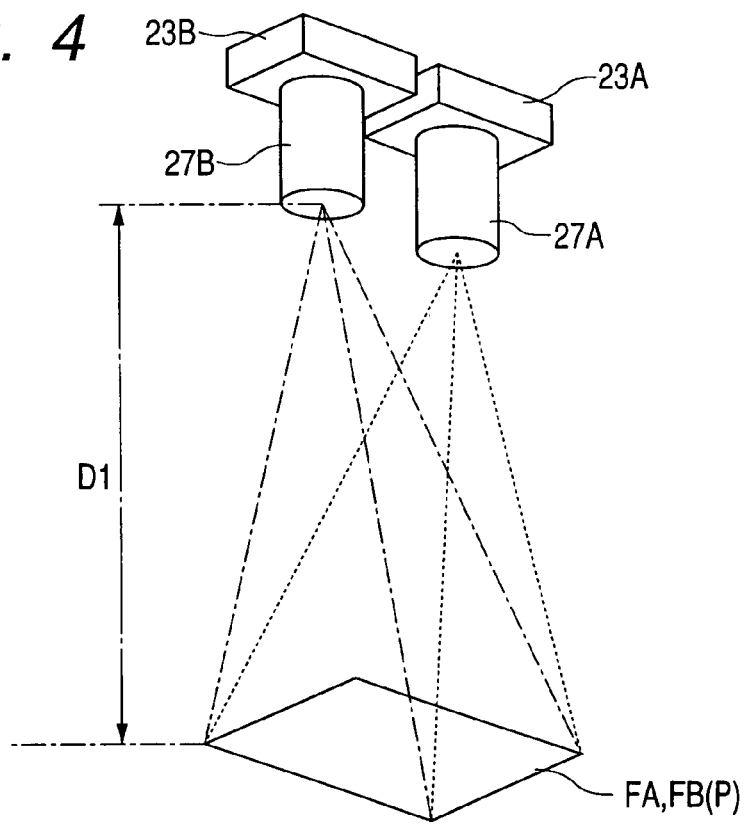
FIG. 4 is a perspective view schematically illustrating field of views of first and second photodetectors illustrated in FIG. 3.

The arrangement of the first and second photodetectors 23A and 23B and the first and second imaging lenses 27A and 27B allow predetermined FOVs (Field Of Views) FA and FB of the first and second photodetectors 23A and 23B to be superimposed on a virtual plane P1 (see FIG. 4).

As illustrated in FIGS. 2 and 4A, the virtual plane P1 is located externally close to and parallel to the reading window 11a of the information reader 10 at a constant distance D1 from a virtual plane P2 in the direction X of the information reader 10. The virtual plane P2 contains the pixel areas of the first and second photodetectors 23A and 23B.

Specifically, in starting to read a QR code Q attached onto one surface of a target R, the information reader 10 is located so that the reading window 11a is opposite to the target R and that the QR code Q is positioned within the FOVs FA and FB.

Next, for example, turning ON of the operation switch 12 permits each of the LEDs 21A and 21B to emit red illumination light Lf toward the target R. The red illumination light emitted from each of the LEDs 21A and 21B is transferred via a corresponding one of the first and second collective lenses 52A and 52B and the reading window 11a to be irradiated on the target R and the QR code Q.

Light reflected from the target R containing the QR code Q based on the red illumination light is entered through the reading window 11a into each of the imaging lenses 27A and 27B. The reflected light entered into each of the imaging lenses 27A and 27B is focused on the pixel area of a corresponding one of the first and second photodetectors 23A and 23B.

At that time, turning ON of the operation switch 14 allows the optoelectric transducers of each of the first and second photodetectors 23A and 23B to be driven so that an image corresponding to the target R containing the QR code Q is picked up by each of the first and second photodetectors 23A and 23B.

Specifically, a charge in each optoelectric transducer of the pixel area of the first photodetector 23A based on the reflected light imaged on the pixel area constituting a first image is scanned horizontal-line by horizontal-line so that the first image corresponding to a light intensity of each optoelectric transducer of the pixel area of the first photodetector 23A is output. Similarly, a charge in each optoelectric transducer of the pixel area of the second photodetector 23B based on the reflected light imaged on the pixel area constituting a second image is scanned horizontal-line by horizontal-line so that the second image corresponding to a light intensity of each optoelectric transducer of the pixel area of the second photodetector 23B is output.

Next, the structure of the QR code Q to be readable by the information reader 10 will be described hereinafter with reference to FIG. 5.

The QR code Q has a substantially square shape with four apexes at its corners. The QR code Q is composed of three isolated positioning marks (finding patterns) QP, QP, QP disposed respectively at three corners of the QR code Q.

The QR code Q is also composed of an apex detecting cell QT located at the remaining corner of the QR code Q, and of a data region QG arranged among the three isolated positioning marks QP, QP, QP and the apex detecting cell QT.

The QR code Q is constituted by the same number of vertical and horizontal cells C, for example, 13×13 cells.

Each cell C is selected from optically identifiable two kinds of cells. For example, in the first embodiment, one of the optically identifiable two kinds of cells is printed in black (dark) color whereas the other thereof is printed in white (light) color whose light reflectance is different from that of the black (dark) color (see FIG. 5). For example, the white color of one cell C shows a bit of "0", and the black color of another one cell C shows a bit of "1".

The three isolated positioning marks QP, QP, QP and the apex detecting cell QT allow the total QR code area to be identified.

For example, the black or white colored cells C of the QR code Q except for the positioning marks QP, the cell QT, timing patterns (not shown), and the like show information consisting of a plurality of bits arranged in matrix (rows and columns).

In addition, the QR code Q contains a Reed Solomon code that allows correction of errors included in the QR code Q based on the Reed Solomon code, even if the code area thereof is dirty or damaged up to, for example, 30% that represents the error correction level (capability) of QR codes.

The number of cells (13×13 cells) of the QR code Q is set to be extremely lower than the number of pixels (optoelectric transducers), for example, 525×525 pixels, of each of the first and second photodetectors 23A and 23B.

Figure 5:
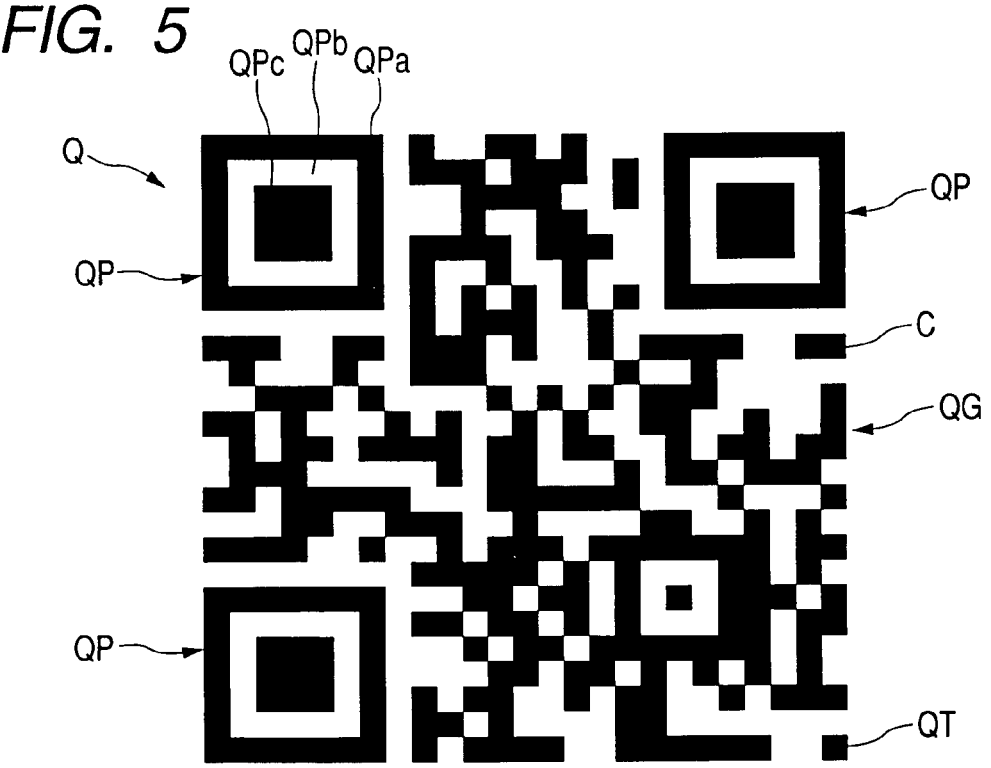
FIG. 5 is a view schematically illustrating an example of the structure of a QR code according to the first embodiment.
Figure 7A:
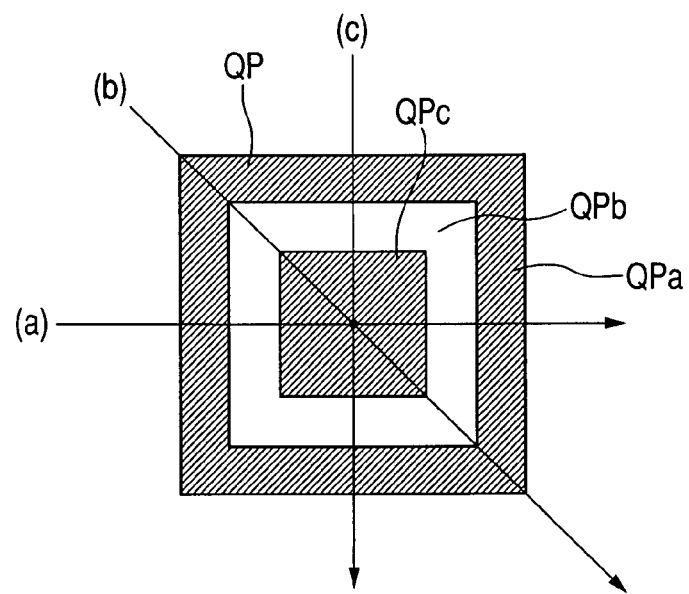
FIG. 7A is a view schematically illustrating the positional relationships between orientations of a positioning symbol of the QR code and a horizontal scanning line of a photodetector according to the first embodiment.

As schematically illustrated in FIG. 5 and FIG. 7A shown thereafter, each of the positioning marks QP includes a first pattern QPa having a large square annular shape and consisting essentially of black (dark) cells. The first pattern QPa has a width of one cell and constitutes the outer periphery of each of the positioning marks QP.

Each of the positioning marks QP also includes a second pattern QPb having a middle square annular shape and consisting essentially of white (light) cells. The second pattern QPb has a width of one cell and is similarly smaller in size than the first pattern QPa. The second pattern QPb is concentrically and adjacently arranged with respect to the first pattern QPa.

Each of the positioning marks QP further includes a third pattern QPc consisting essentially of vertical 3 black cells× horizontal 3 black cells in shape of square. The third pattern QPc is concentrically and adjacently arranged with respect to the second pattern QPb so that the combination of the first to third patterns QPa to QPc constitutes the square mark QP.

Referring to FIGS. 1 and 3, the circuit unit 20 includes, as the circuit components 20a, the operation switches 12 and 14, a control circuit 40, a power switch 41, an LED (light emitting device) 43, a beeper 44, a liquid crystal display 46, a communication interface 48, and a battery 49.

The control circuit 40 for example consists of a microcomputer. The microcomputer is composed of, for example, a CPU (Central Processing Unit), an internal memory unit including a ROM (Read Only Memory), a RAM (Random Access Memory) and the like, an I/O (Input/Output) interface, and a system bus to which the CPU, the internal memory unit, and the I/O interface are electrically connected to be communicable therebetween.

The control circuit 40 is electrically connected to the battery 49 via a switch 49a electrically connected to the control circuit 40. The control circuit 40 is also electrically connected through the I/O interface to the power switch 41. Upon the power switch 41 being turned on by a user, the switch 49*a* is turned on so that electrical power is supplied to the optical devices 21A, 21B, 23A, and 23B, the control circuit 40, and the remaining electrical components 20*a* of the circuit unit 20 to thereby activate them.

The control circuit 40 is configured to operate in accordance with at least one program stored in, for example, the ROM to control the overall of the information reader 10 and to perform decoding processes and other processes. The program can be loaded from a signal bearing media to the memory unit. Examples of suitable signal bearing media include recordable type media such as floppy disks and CD (Compact Disk)-ROM, and transmission type media such as digital and analog communications links.

The control circuit 40 is electrically connected via the I/O interface to, the operation switches 12 and 14 so that instructions sent from the switches 12 and 14 are input to the control circuit 40. The control circuit 40 is electrically connected via the I/O interface to each of the first and second LEDs 21A and 21B and operative to control the first and second LEDs 21A and 21B to execute reading processes of the QR code Q.

The control circuit 40 is also electrically connected via the I/O interface to the LED 43, the beeper 44, and the liquid crystal display 46 to control them. Moreover, the control circuit 40 is electrically connected via the I/O interface to the communication interface 48 to communicate with external devices including a host system, such as a management computer, through the communication interface 48.

For example, the liquid crystal display 46 is mounted on the other surface of the one lateral end of the second circuit board 16 to be disposed closely opposing the display window DW. Moreover, the beeper 44 is mounted on the other lateral end of the one surface of the first circuit board 15.

The LED 43 is operative to visually indicate information to send notice to a user under control of the control circuit 40. The beeper 44 is operative to emit a series of beeps to send notice to a user under control of the control circuit 40. The liquid crystal display 46 is operative to display, in a visible format, information sent from the control circuit 40 under control thereof.

The control circuit 40 is operative to control the exposure time (the shutter speed) of each of the first and second photodetectors 23A and 23B.

In addition, the circuit unit 20 includes, as the circuit components 20*a*, first and second amplifiers (AMP) 31A and 31B, first and second clipping circuit 32A and 32B, and first and second analog to digital (A/D) converters 33A and 33B.

The circuit unit 20 also includes, as the circuit components 20*a*, a memory 35, first and second address generators 36A and 36B, and first and second synchronous signal generators 38A and 38B. The circuit components 31A, 31B, 32A, 32B, 33A, 33B, 35, 36A, 36B, 38A, and 38B are electrically connected to the control circuit 40 so that they are controllable by the control circuit 40.

The first amplifier 31A is electrically connected to the first photodetector 23A and operative to amplify a first image outputted from the first photodetector 23A at a predetermined gain based on a gain control signal sent from the control circuit 40.

The first clipping circuit 32A is electrically connected to the first amplifier 31A and the first A/D converter 33A and operative to clip a first QR code image QI1 corresponding to the QR code Q from the amplified first image outputted from the first amplifier 31A.

The first A/D converter 33A is electrically connected to the first clipping circuit 32A and operative to convert the first QR code image QI1 cell by cell into first image data DQ1 of the QR code Q.

The first synchronous signal generator 38A is electrically connected to the first photodetector 23A and the first address generator 36A. The first synchronous signal generator 38A is operative to, for example, periodically generate a synchronous signal (timing signal) to periodically output it to the first photodetector 23A and the first address generator 36A under control of the control circuit 40

The first address generator 36A is electrically connected to the memory 35. The first address generator 36A is operative to, for example, count the number of the periodically inputted timing signals so as to generate a unique address signal corresponding to each of the count values in synchronization with a corresponding one of the timing signals, thus outputting the unique address signals to the memory 35.

For example, a light intensity of each cell of the first QR code image QI1 is sequentially read out as a first image in accordance with a corresponding one of the timing signals periodically transmitted from the first synchronous signal generator 38A. The first image of each cell of the first QR code image QI1 is converted into a corresponding digital value of each cell of the first image data DQ1 by the first A/D converter 33A.

The digital value of each cell of the first image data DQ1 is sequentially sent from the first A/D converter 33A to the memory 35 to be stored in its corresponding unique address. The unique address of the memory 35 in which the digital value of each cell of the first image data DQ1 is stored is indicated by an address signal generated by the first address generator 36A based on a corresponding one of the count values.

Similarly, the second amplifier 31B is electrically connected to the second photodetector 23B and operative to amplify a second image outputted from the second photodetector 23B at a predetermined gain based on a gain control signal sent from the control circuit 40.

The second clipping circuit 32B is electrically connected to the second amplifier 31B and the second A/D converter 33B and operative to clip a second QR code image QI2 corresponding to the QR code Q from the amplified second image outputted from the second amplifier 31B.

The second A/D converter 33B is electrically connected to the second clipping circuit 32B and operative to convert the second QR code image QI2 cell by cell into second image data DQ2 of the QR code Q.

The second synchronous signal generator 38B is electrically connected to the second photodetector 23B and the second address generator 36B. The second synchronous signal generator 38B is operative to, for example, periodically generate a synchronous signal (timing signal) to periodically output it to the second photodetector 23B and the second address generator 36B under control of the control circuit 40

The second address generator 36B is electrically connected to the memory 35. The second address generator 36B is operative to, for example, count the number of the periodically inputted timing signals so as to generate a unique address signal corresponding to each of the count values in synchronization with a corresponding one of the timing signals, thus outputting the unique address signals to the memory 35.

For example, a light intensity of one cell of the second QR code image QI2 is sequentially read out as a second image in accordance with a corresponding one of the timing signals periodically transmitted from the second synchronous signal generator 38B. The second image of one cell of the second QR code image QI2 is converted into a corresponding digital value of each cell of the second image data DQ2 by the second A/D converter 33B.

The digital value of each cell of the second image data DQ2 is sequentially sent from the second A/D converter 33B to the memory 35 to be stored in its corresponding unique address. The unique address of the memory 35 in which the digital value of each cell of the second image data DQ2 is stored is indicated by an address signal generated by the second address generator 36B based on a corresponding one of the count values.

Next, operations of the information reader 10 will be described hereinafter.

When a user wants to read the QR code Q attached to the target R, the user locates the information reader 10 so that the reading window 11a is opposite to the target R and that the QR code Q is positioned within the FOVs FA and FB (see FIG. 4).

In this state, the user operates the operation switch 12 to turn it on. An instruction indicative of the turning on of the operation switch 12 is sent to the control circuit 40.

Figure 6:
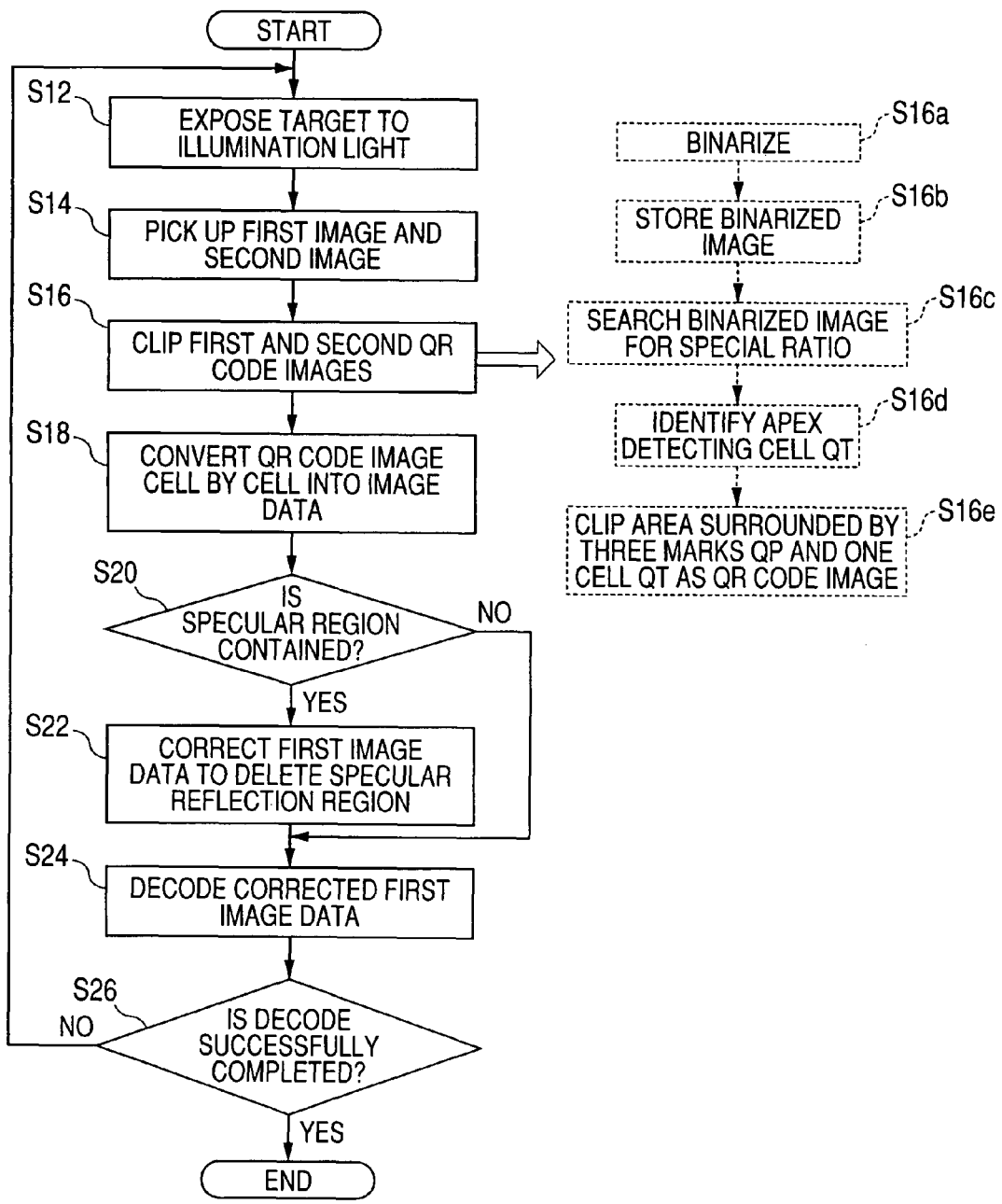
FIG. 6 is a flowchart schematically illustrating flow of reading operations of a QR code executable by the optical information reader illustrated in FIG. 1.

The control circuit 40 controls each of the first and second LEDs 21A and 21B to emit the red illumination light Lf toward the target R in step S12 of FIG. 6. This allows the target R containing the QR code Q to be exposed to the red illumination light emitted from each of the LEDs 21A and 21B via a corresponding one of the first and second collective lenses 52A and 52B and the reading window 11a.

While the target R containing the QR code Q is exposed to the red illumination light, light reflected from the target R containing the QR code Q based on the red illumination light is entered through the reading window 11a into each of the imaging lenses 27A and 27B. The reflected light entered into each of the imaging lenses 27A and 27B is focused on the pixel area of a corresponding one of the first and second photodetectors 23A and 23B.

During the reflected light being focused on the pixel area of each of the first and second photodetectors 23A and 23B, the optoelectric transducers of each of the first and second photodetectors 23A and 23B are simultaneously driven in step S14. As a result, first and second images of the target R containing the QR code Q are simultaneously picked up by the optoelectric transducers of the first and second photodetectors 23A and 23B, respectively.

A corresponding one of the first and second images is scanned horizontal-line by horizontal-line in each of the photodetectors 23A and 23B so that a corresponding one of the first and second images is sequentially output horizontal-line by horizontal-line.

The first and second image signals outputted from each of the first and second photodetectors 23A and 23B is amplified by a corresponding one of the first and second amplifiers 31A and 31B to be transferred to a corresponding one of the first and second clipping circuits 32A and 32B.

Next, the control circuit 40 controls the first clipping circuit 32A to clip a first QR code image QI1 corresponding to the QR code Q from the amplified first image outputted from the first amplifier 31A in step S16. Simultaneously, the control circuit 40 controls the second clipping circuit 32B to clip a second QR code image QI2 corresponding to the QR code Q from the amplified second image outputted from the second amplifier 31B in step S16.

Specifically, in step S16, when clipping the first QR code image QI1 from the amplified first image outputted from the first amplifier 31A, the control circuit 40 controls the first clipping circuit 32A to compare a light intensity level of each pixel in the first image with a predetermined threshold level in step S16a. This allows the light intensity level of each pixel in the first image to be binarized to a binary signal of each pixel.

In the first embodiment, the predetermined threshold level corresponds to an intermediate level in the 256 levels of light intensity.

The control circuit 40 controls the first clipping circuit 32A to store therein the binarized first image in step S16b.

For example, when the light intensity level of one pixel in the first image is equal to or higher than the predetermined threshold level, the first image of the one pixel is binarized to a white (light) pattern corresponding to a binary digit of 0. In contrast, when the light intensity level of one pixel in the first image is lower than the predetermined threshold level, the light intensity of the one pixel in the first image is binarized to a black (dark) pattern corresponding to a binary digit of 1.

As a result, a binarized image of the target R containing the QR code Q is obtained.

Next, the control circuit 40 controls the first clipping circuit 32A to execute a positioning mark detecting task based on the binarized image stored in the first clipping circuit 32A.

Specifically, under control of the control circuit 40, the first clipping circuit 32A searches the binarized image (the dark and light patterns) for a specified ratio in length in step S16c.

Specifically, FIG. 7A shows the positional relationships between the orientations of the positioning mark QP (the QR code Q) and the horizontal scanning line of the first photodetector 23A.

In FIG. 7A, if the QR code Q (each of the positioning marks QP) is oriented so that its one pair of opposing sides is parallel to the horizontal scanning line passing through the center of one of the marks QP, the horizontal scanning line is shown as reference character (a).

If the QR code Q (each of the positioning marks QP) is oriented so that its one pair of opposing sides is inclined with respect to the horizontal scanning line passing through the center of one of the marks QP at an angle of, for example, 45 degrees, the horizontal scanning line is shown as reference character (b).

If the QR code Q (each of the positioning marks QP) is oriented so that its one pair of opposing sides is inclined with respect to the horizontal scanning line passing through the center of one of the marks QP at an angle of, for example, 90 degrees, the horizontal scanning line is shown as reference character (c).

Figure 7B:
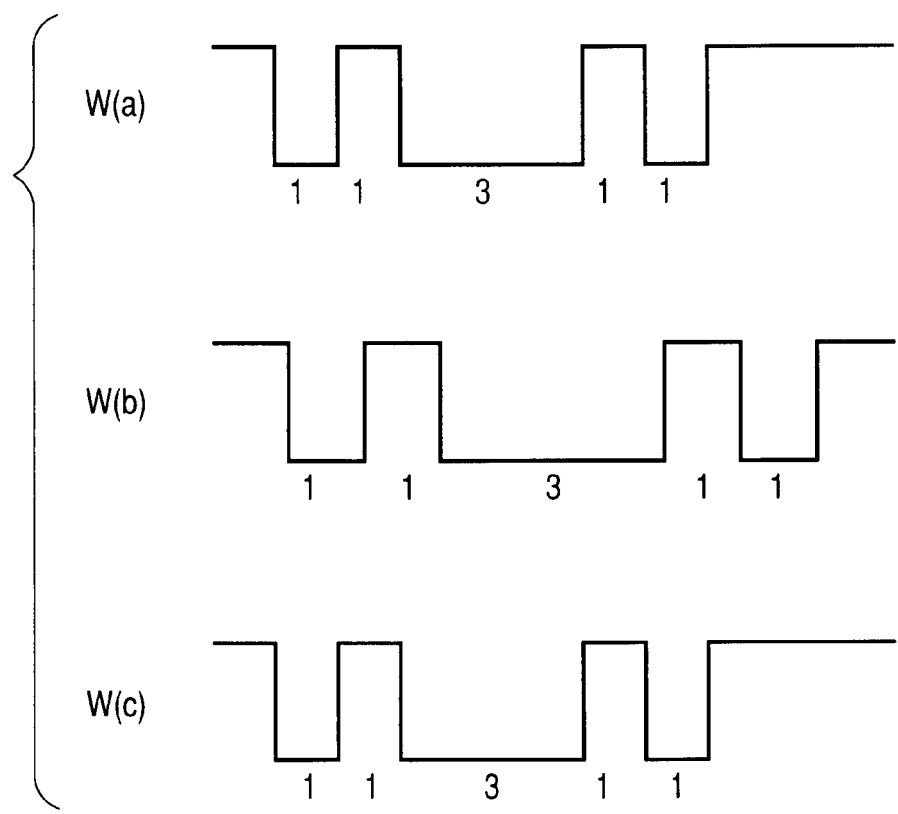
FIG. 7B is a view schematically illustrating signal waveforms corresponding to light and dark patterns respectively detectable along horizontal scanning lines (a), (b), and (c) illustrated in FIG. 7A.

FIG. 7B shows signal waveforms W(a), W(b), and W(c) corresponding to the light and dark patterns respectively detectable along the horizontal scanning lines (a), (b), and (c). As clearly illustrated in FIG. 7B, the frequency component ratios of the signal waveforms W(a), W(b), and W(c) are equivalent to each other.

Specifically, the frequency component ratio obtainable from each of the horizontal scanning lines (a), (b), and (c) passing through the center of the positioning mark QP is represented as follows:

dark:light:dark:light:dark=1:1:3:1:1

That is, as clearly illustrated in FIG. 7A, the ratio in length among the dark and light patterns of the positioning mark QP is constantly set to the ratio of 1 (dark):1 (light):3 (dark):1 (light):1 (dark) independently of any orientations of the QR code Q with respect to the horizontal scanning line.

Accordingly, the first clipping circuit 32A searches the binarized image (the dark and light patterns) for a specified ratio of 1 (dark):1 (light):3 (dark):1 (light):1 (dark) in length in step S16c.

Because the first image picked up by the first photodetector 23A corresponds to the target R containing the QR code Q, the first clipping circuit 32A easily retrieves the specified ratio of 1 (dark):1 (light):3 (dark):1 (light):1 (dark) in length, which corresponds each of the positioning marks QP, in the continuous dark patterns and light patterns (the binarized image) in step S16c.

Thus, under control of the control circuit 40, the first clipping circuit 32A identifies the location of the remaining apex detecting cell QT based on the identified locations of the three positioning marks QP in step S16d.

Thereafter, under control of the control circuit 40, the first clipping circuit 32A clips, from the amplified first image outputted from the first amplifier 31A, an area surrounded by the identified locations of the three marks QP, QP, QP, and one cell QT as the first QR code image QI1 consisting of 13×13 cells in step S16e.

Similarly, when clipping the second QR code image QI2 from the amplified second image outputted from the second amplifier 31B, the control circuit 40 and the second clipping circuit 32B execute the tasks in steps S16a to S16e. This allows an area surrounded by the identified locations of the three marks QP, QP, QP, and one cell QT to be clipped from the amplified second image outputted from the second amplifier 31B as the second QR code image QI2 consisting of 13×13 cells.

(A1) and (B1) of FIG. 8A schematically illustrate the clipped first QR code image QI1 and the clipped second QR image Q2, respectively. As illustrated in FIG. 2 and (A1) of FIG. 8A, the clipped first QR code image QI1 becomes distorted such that its one side (Y1 side, such as right side) in the Y direction is wider than its other side (Y2 side, such as left side) therein. This is because the first photodetector 23A is arranged such that its center axis XA is shifted toward the Y1 side from the center axis XC in the Y direction.

Similarly, as illustrated in (B1) of FIG. 8A, the clipped second QR code image QI2 becomes distorted such that its one side (Y2 side, such as left side) in the Y direction is wider than its other side (Y1 side, such as right side) in the Y direction. This is because the second photodetector 23B is arranged such that its center axis XB is shifted toward the Y2 side from the center axis XC in the Y direction.

Next, the control circuit 40 controls the first A/D converter 33A to execute a mapping task to thereby convert the first QR code image QI1 cell by cell into first image data DQ1 of the QR code Q in step S18.

In the first embodiment, a digital value of each cell of the first image data DQ1 has 8 bits corresponding to 256 levels (0 level to 255 level) of light intensity.

Specifically, as the first image data DQ1, the digital values of 13×13 cells each corresponding to one level of light intensity within the range from 0 level to 255 level can be obtained by the first A/D converter 33A.

As in the case of the first A/D converter 33A, the control circuit 40 controls the second A/D converter 33B to execute a mapping task to thereby convert the second QR code image QI2 cell by cell into second image data DQ2 of the QR code Q.

In the first embodiment, a digital value of each cell of the second image data DQ2 has 8 bits corresponding to 256 levels (0 level to 255 level) of light intensity.

Specifically, as the second image data DQ2, the digital values of 13×13 cells each corresponding to one level of light intensity within the range from 0 level to 255 level can be obtained by the second A/D converter 33B.

Note that, if the QR code Q has 21×21 cells, as the first image data DQ1, the digital values of 21×21 cells each corresponding to one level of light intensity within the range from 0 level to 255 level can be obtained by the first A/D converter 33A. This can be effected as in the case of the second A/D converter 33B.

(A2) and (B2) of FIG. 8A schematically illustrate the first image data DQ1 of 13×13 cells in rows and columns and the second image data DQ2 of 13×13 cells in rows and columns, respectively. In addition, (A3) and (B3) of FIG. 8B schematically illustrate part of cells in the first image data DQ1 and that of cells in the second image data DQ2, respectively.

In the first embodiment, the top-left corner cell of the first image data DQ1, which is located in the first row and the first column thereof, is labeled with 1-1, and the rest cells in the first column are sequentially labeled with 1-2, 1-3, ..., 1-13.

Similarly, the cells in the second column are labeled with 2-1, 2-2, ..., 2-13, the cells in the third column are labeled with 3-1, 3-2, ..., 3-13, the cells in the twelfth column are labeled with 12-1, 12-2, ..., 2-13, and the cells in the thirteenth column are labeled with 13-1, 13-2, 13-13.

In the same manner as the first image data DQ1, the cells of the second image data DQ2 are labeled.

Figure 9:
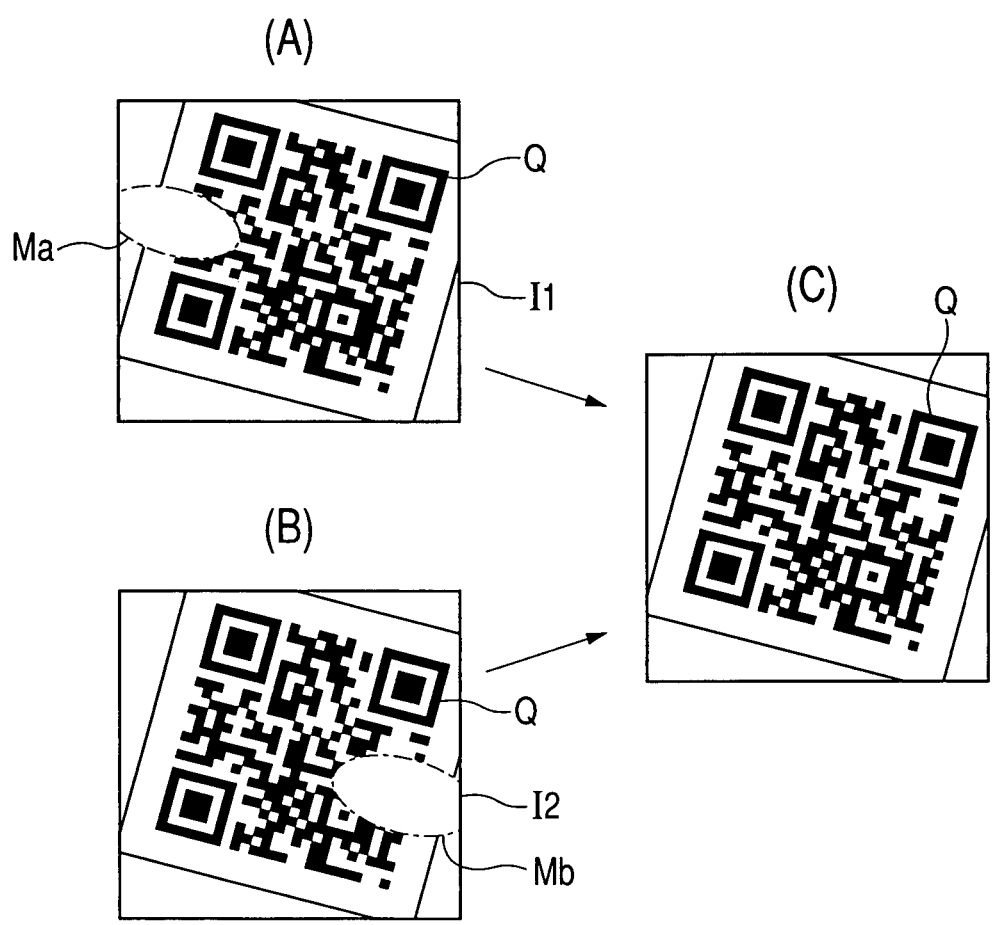
FIG. 9 is a view schematically illustrating a specular reflection region contained in each of a first image and a second image and a QR code image from which the specular reflection region is eliminated according to the first embodiment.

In the first embodiment, for example, it is assumed that a first image I1 is picked up by the first photodetector 23A, and a second image I2 is picked up by the second photodetector 23B (see [a] and [b] of FIG. 9).

Specifically, as illustrated in [a] of FIG. 9, the first image I1 contains a specular reflection region Ma positioned at its left side, and the second image I2 contains a specular reflection region Mb positioned at its right side, which is shifted from the specular reflection region Ma.

The reason why the specular reflection region Ma and the specular reflection region Mb are misaligned from each other will be described hereinafter with reference to FIG. 10.

Figure 10:
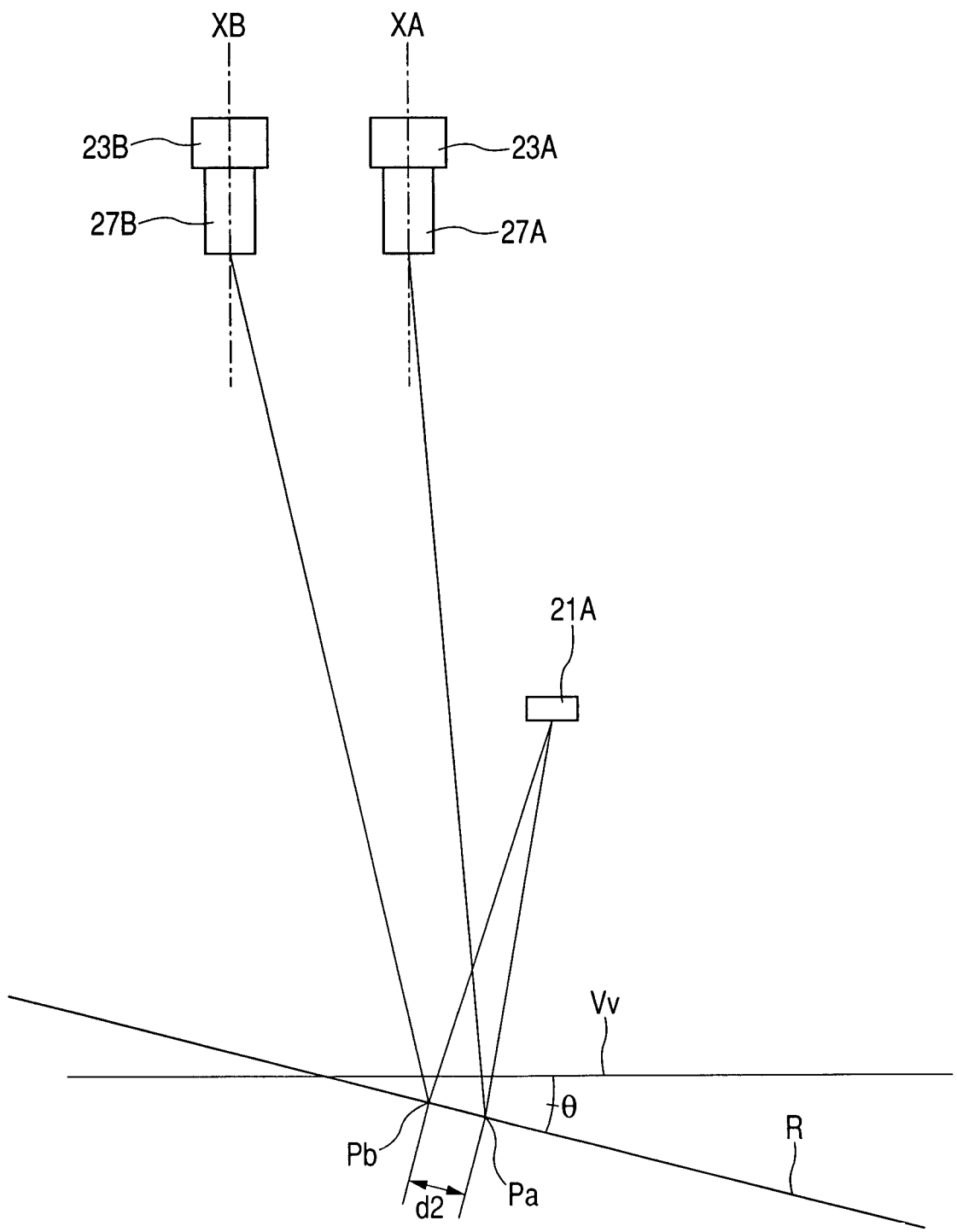
FIG. 10 is a view schematically illustrating misalignment between a specular reflection region contained in the first image and that contained in the second image.

Referring to FIG. 10, it is assumed that the one surface of the target R to which the QR code Q is attached is inclined by an angle of θ away from a virtual plane Vv intersecting the target R and orthogonal to the center axes XA and XB of the first and second photodetectors 23A and 23B.

In this assumption, part of light emitted from, for example, the first LED 21A, is reflected directly from different points Pa and Pb of the target R. Light reflected directly from the points Pa and Pb of the target R based on the part of light is entered into the first and second photodetectors 23A and 23B via the first and second imaging lenses 27A and 27B, respectively. For example, the points Pa and Pb are different from each other by a distance of d2 along the target R.

In this situation, if the incident angle of the part of light with respect to the target R and the reflection angle thereof are substantially identical to each other, the part of light to be entered into each of the first and second photodetectors 23A and 23B may become a specular reflection component.

As described above, the points Pa and Pb of the target R, which cause part of light emitted from the first LED 21A to be specularly reflected thereat so as to be respectively entered into the first and second photodetectors 23A and 23B are different from each other by the distance d2. This can be effected by part of light emitted from the second LED 21B.

For this reason, as illustrated in, for example, [a] and [b] of FIG. 9, the specular reflection region Ma appearing in the first image I1 and the specular reflection region Mb appearing in the second image I2 are different in position from each other.

In the first embodiment, as illustrated in (A2) and (A3) of FIGS. 8A and 8B, it is assumed that the first image data DQ1 is generated based on the first image I1 containing the specular reflection region Ma so that cells 1-6, 2-6, 1-7, and 2-7 in the image data DQ1 correspond to the specular reflection region Ma.

Similarly, as illustrated in (B2) of FIG. 8A, it is assumed that the second image data DQ2 is generated based on the second image I2 containing the specular reflection region Mb so that cells 12-6, 13-6, 12-7, and 13-7 in the image data DQ2 correspond to the specular reflection region Mb.

Note that a reference numeral assigned to each of the cells in (A3) and (B3) of FIG. 8B shows a digital value indicative of a level of light intensity of a corresponding one of the cells.

For example, "36" assigned to the cell 1-5 illustrated in (A3) shows a digital value "36" corresponding to a level 36 in the 256 levels of light intensity, and "78" assigned to the cell 1-6 illustrated in (B3) shows a digital value "78" corresponding to a level 78 in the 256 levels of light intensity.

As described above, because the cells 1-6, 2-6, 1-7, and 2-7 in the first image data DQ1 correspond to the specular reflection region Ma, the digital values respectively assigned to the cells 1-6, 2-6, 1-7, and 2-7 represent "255" level (maximum level) in the 256 levels of light intensity.

Similarly, because the cells 12-6, 13-6, 12-7, and 13-7 in the second image data DQ2 correspond to the specular reflection region Mb, the digital values respectively assigned to the cells 12-6, 13-6, 12-7, and 13-7 represent the 255 level (maximum level) in the 256 levels of light intensity.

Specifically, the specular reflection region Ma is different in position from the specular reflection region Mb. For this reason, the cells 1-6, 2-6, 1-7, and 2-7 in the second image data DQ2, which are the same as the cells 1-6, 2-6, 1-7, and 2-7 in the first digital image DQ1 corresponding to the specular reflection region Ma, do not correspond to the specular reflection region Mb. Thus, digital values except for the digital value corresponding to the maximum level of light intensity are assigned to the cells 1-6, 2-6, 1-7, and 2-7 in the second image data DQ2, respectively.

The digital value of each cell of each of the first and second image data DQ1 and DQ2 is stored in its corresponding unique address of the memory 35, this unique address is supplied from a corresponding one of the address generators 36A and 36B.

Returning to FIG. 6, after completion of the mapping task in step S18, the control circuit 40 searches one of the first and second image data DQ1 and DQ2 stored in the memory 35 for the existence of cells each with the 255 level (maximum level) in step S20.

Then, in step S20, the control circuit 40 determines whether at least one specular reflection region is contained in one of the first and second image data DQ1 and DQ2 based on the search result.

Specifically, in step S20, because the cells 1-6, 1-7, 2-6, and 2-7 each with the 255 level are contained in the first image data DQ1, the control circuit 40 identifies the cells 1-6, 1-7, 2-6, and 2-7 in the first image data DQ1 as a specular reflection region (the determination in step S20 is YES). Then, the control circuit 40 proceeds to step S22.

Otherwise, when no cells with the 255 level are contained in the first image data DQ1, the control circuit 40 determines that no specular reflection regions are contained in the first image data DQ1 based on the search result (the determination in step S20 is NO). Then, the control circuit 40 goes to step S24.

In step S22, the control circuit 40 corrects the first image data DQ1 at the cells 1-6, 1-7, 2-6, and 2-7 based on the digital values "78", "78", "25", and "24" in the corresponding cells 1-6, 1-7, 2-6, and 2-7 in the second image data DQ2.

For example, the control circuit 40 replaces the digital values "255" in the cells 1-6, 1-7, 2-6, and 2-7 in the first image data DQ1 identified as the specular reflection region into the digital values "78", "78", "25", and "24" in the corresponding cells 1-6, 1-7, 2-6, and 2-7 in the second image data DQ2 (see (A4) in FIG. 8B).

The correcting task in step S22 allows the specular reflection region to be eliminated from the first image data DQ1 (see [c] in FIG. 9).

After completion of the correcting task in step S22, the control circuit 40 executes a task of decoding the corrected first image data DQ1 in step S24.

Specifically, in step S24, the control circuit 40 compares the digital value of each cell in the corrected first image data DQ1 with a predetermined threshold digital value, thus determining whether the digital value of each cell in the corrected first image data DQ1 shows black (dark) color or white color.

For example, the control circuit 40 compares the digital value of each cell in the corrected first image data DQ1 with a predetermined threshold digital value of "50".

When the digital value of one of the cells in the corrected first image data DQ1 is higher than the predetermined threshold digital value of "50", the control circuit 40 determines that the one of the cells in the corrected first image data DQ1 shows light color corresponding to a bit of "0".

In addition, when the digital value of another one of the cells in the corrected first image data DQ1 is equal to or lower than the predetermined threshold digital value of "50", the control circuit 40 determines that another one of the cells in the corrected first image data DQ1 shows dark color corresponding to a bit of "1".

Therefore, the control circuit 40 can decode information stored in the QR code Q and indicated as the light (white) or dark (black) colored cells C thereof.

Next, the control circuit 40 determines whether the ratio (percent) of the number of cells whose colors are unidentified in step S24 to the total number of cells in the first image data DQ1 exceeds the error correction level in step S26. Note that, when a cell of the QR code Q is dirty or damaged, the color of the cell may be unidentified by the information reader 10. Note that the ratio of the number of cells whose colors are unidentified in step S24 to the total number of cells in the first image data DQ1 will be referred to as "error ratio" hereinafter.

When the error ratio exceeds the error correction level, the control circuit 40 determines that the decoding of the first image data DQ1 is unsuccessfully completed (the determination in step S26 is NO). Then, the control circuit 40 returns to step S12, so that the tasks in steps S12 to S 26 are repeated until the determination in step S26 is affirmative.

Otherwise, when the error ratio is equal to or lower than the error correction level, the control circuit 40 determines that the decoding of the first image data DQ1 is successfully completed (the determination in step S26 is YES).

Thereafter, the control circuit 40 sends the decoded information stored in the QR code Q to the host system as an example, exiting the operations of the information reader 10 in step S28.

As described above, in the information reader 10 according to the first embodiment, the first and second photodetectors 23A and 23B are configured to simultaneously pick up an image of the QR code Q under control of the control circuit 40. Next, the first and second clipping circuits 32A and 32B are configured to respectively clip the first and second QR code images QI1 and QI2 from the picked-up image under control of the control circuit 40.

In addition, the first and second A/D converters 33A and 33B are configured to respectively convert the first and second QR code images QI1 and QI2 cell by cell into the first and second image data DQ1 and DQ2.

Specifically, the first A/D converter 33A is configured to obtain, as the first image data DQ1, the digital values of 13×13 cells each corresponding to one level of light intensity within the range from 0 level to 255 level. Similarly, the second A/D converter 33B is configured to obtain, as the second image data DQ2, the digital values of 13×13 cells each corresponding to one level of light intensity within the range from 0 level to 255 level.

Moreover, the control circuit 40 is configured to determine whether at least one specular reflection region with the maximum light-intensity level is contained in, for example, the first image data DQ1.

When it is determined that the specular reflection region Ma with the maximum light-intensity level is contained in the first image data DQ1, the control circuit 40 replaces the digital values in the cells of the specular reflection region in the first image data DQ1 into those in the corresponding same cells in the second image data DQ2.

The correcting task of the control circuit 40 makes it possible to eliminate the specular reflection region from the first image data DQ1.

That is, in the first embodiment, the number of cells of the QR code Q is set to be extremely lower than the number of pixels (optoelectric transducers) of each of the first and second photodetectors 23A and 23B. Therefore, in the first embodiment, the converting task using the first and second QR code images QI1 and QI2, and the specular-reflection region correcting task using one of the first and second image data DQ1 and DQ2 obtained by the converting tasks can be carried out cell by cell.

For this reason, as compared with the image superimposing tasks being carried out pixel by pixel of each of first and second images of a target disclosed in the Patent Publication No. H02-98789 (third example), it is possible to simply eliminate a specular reflection region contained in the first image data DQ1, thus rapidly decoding information stored in the QR code Q.

Moreover, in the first embodiment, as illustrated in FIG. 2, the first and second photodetectors 23A and 23B are respectively mounted on the first circuit board 15 such that:

their pixel areas face the first and second imaging lenses 27A and 27B;

their other surfaces are located on a virtual plane VP disposed orthogonal to their center axes XA and XB of their pixel areas; and their center axes XA and XB are arranged with the interval d1 therebetween to be shifted laterally from and parallely to the optical axes Xa and Xb of the first and second imaging lenses 27A and 27B.

The arrangement of the first and second photodetectors 23A and 23B and the first and second imaging lenses 27A and 27B allow predetermined FOVs FA and FB of the first and second photodetectors 23A and 23B to be superimposed on a virtual plane P1 (see FIG. 4). The virtual plane P1 is located at the constant distance D1 from the virtual plane P2 in the direction X of the information reader 10; this virtual plane P2 contains the pixel areas of the first and second photodetectors 23A and 23B.

Specifically, while the information reader 10 is located such that the QR code Q is positioned within the FOVs FA and FB (see FIG. 4) with the reflected light being focused on the pixel area of each of the first and second photodetectors 23A and 23B, the optoelectric transducers of the first photodetector 23A and those of the second photodetector 23B are simultaneously driven.

This allows the first and second images of the optoelectric transducers of the first and second photodetectors 23A and 23B corresponding to the target R containing the QR code Q to be simultaneously picked up by the first and second photodetectors 23A and 23B, respectively.

Therefore, the first QR code image obtained by the first photodetector 23A and the first clipping circuit 32A and the second QR code image obtained by the second photodetector 23B and the second clipping circuit 32B can be substantially identical in size and orientation to each other.

This makes it possible to easily match the positions of the cells in the first QR code image and those of the same cells in the second QR code image without associating addresses of a region of the memory 35 in which the first image is stored with those of another region thereof in which the second QR code image is stored.

In addition, the first and second photodetectors 23A and 23B are configured such that their center axes XA and XB are arranged with the interval d1 therebetween to be shifted laterally from and parallely to the optical axes Xa and Xb of the first and second imaging lenses 27A and 27B. The arrangement of the first and second photodetectors 23A and 23B allows a specular reflection region contained in the first QR code image to be shifted in position from a specular reflection region contained in the second QR code image.

Accordingly, digital values in the cells of a specular reflection region contained in one of the first and second QR code images can be replaced into those in the same cells of a corresponding region contained in the other of the first and second QR code images. This makes it possible to eliminate the impact of specular reflection from the one of the first and second QR code images, thus properly reading the QR code Q even if a positional relationship between the target R and each of the first and second photodetectors 23A and 23B causes a specular reflection component to be contained in at least one of the first and second QR code images.

Second Embodiment

Figure 11:
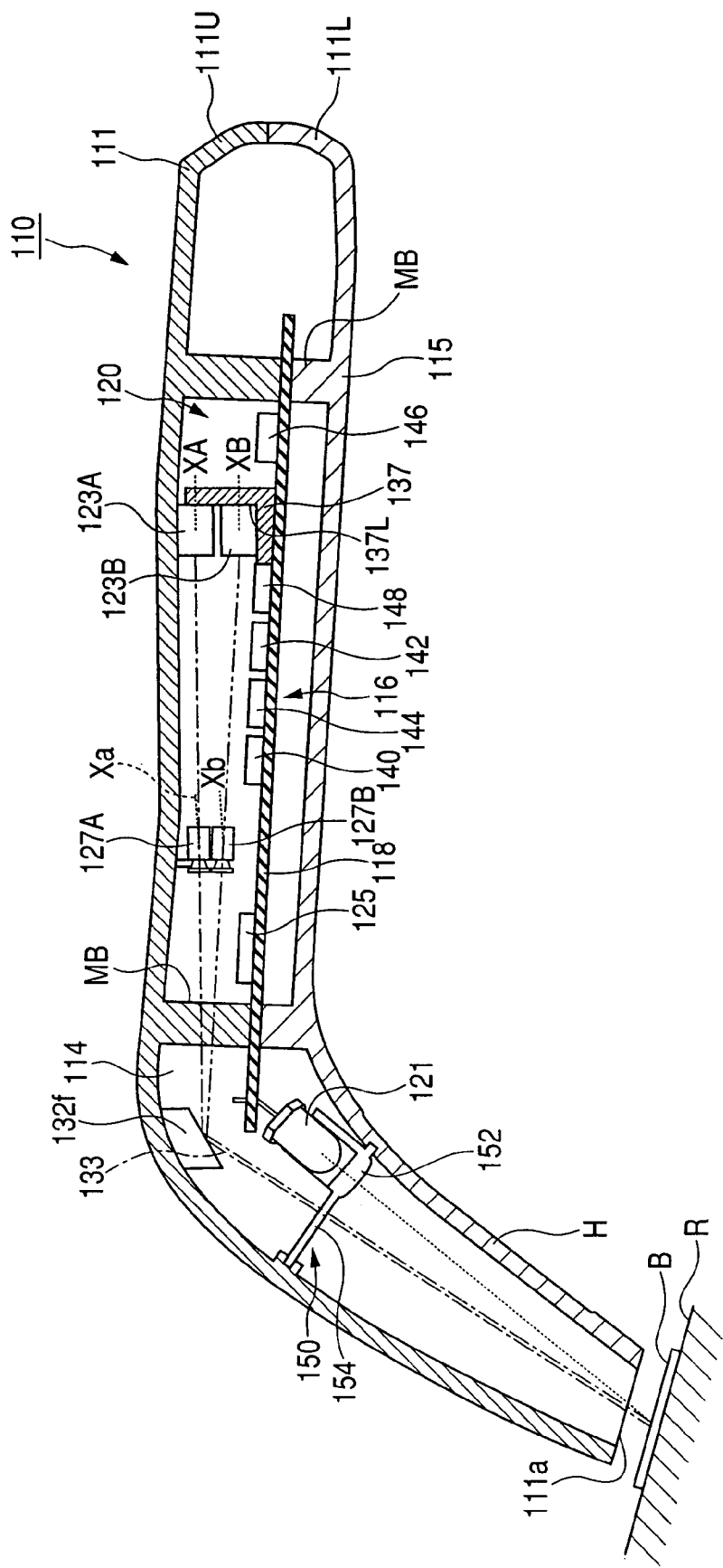
FIG. 11 is a cross sectional view schematically illustrating an example of the structure of a barcode reader according to a first embodiment of the present invention.
Figure 12:
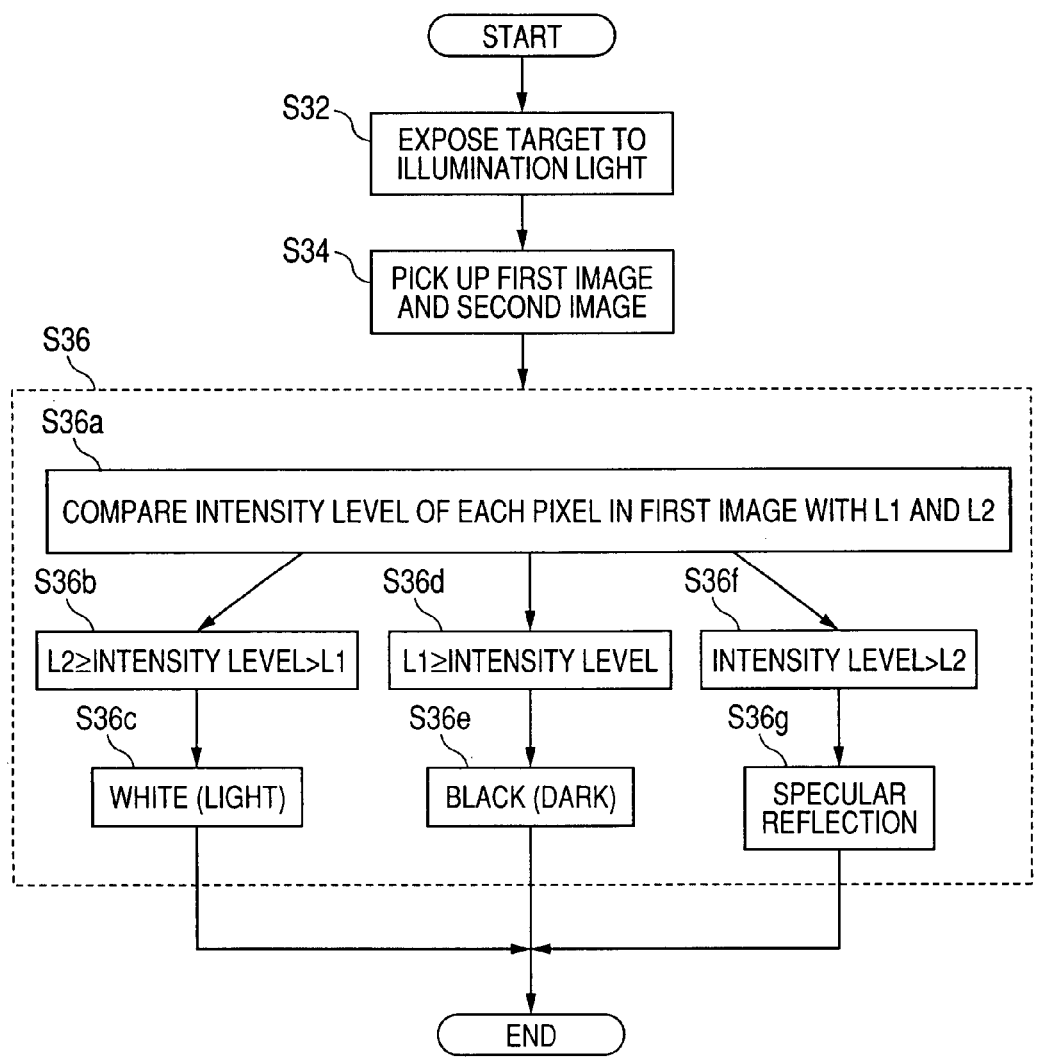
FIG. 12 is a flowchart schematically illustrating flow of reading operations of a QR code executable by the barcode reader illustrated in FIG. 11.

Referring to FIGS. 11 and 12, a barcode reader 110 as an example of optical information readers according to a second embodiment of the present invention is designed to read graphic symbols including barcodes.

The barcode reader 110 is provided with a substantially gun-shaped housing (case) 111, a reading unit 114, and a data processing unit 116.

The case 111 consists of an upper case part 111U and a lower case part 111L. The upper case part 111U has an elongated hollow box structure with one opening surface, and the lower case part 111L has the symmetrical structure as the upper case part 111U. The case 111 is assembled such that the upper case part 111U is mounted at its opening-surface side edge on the opening-surface side edge of the lower case part 111L.

One end portion H of the case 111 in its longitudinal direction is bent to be directed diagonally to the longitudinal direction. The bent portion H of the case 111 will be referred to as "head portion H" hereinafter. The remaining portion of the case 111 serves as a grip portion 115 that allows a user to easily grip the barcode reader 110 in one hand and handle it.

The rectangular-shaped tip end of the head portion H is wholly formed with a substantially rectangular-shaped reading window 111a communicated with the inner hollow space of the head portion H, the inner hollow space of the head portion H is also communicated with the inner hollow space of the grip portion 115. The inner hollow spaces of the head portion H and the grip portion 115 provide a light channel.

The size of the reading window 111a is designed to allow the barcode reader 110 to read various types of barcodes as targets of the barcode reader 110.

The barcode reader 110 is provided with a circuit board 118 constituting part of the reading unit 114 and the most part of the data processing unit 116 and arranged in the longitudinal direction of the grip portion 115.

The circuit board 118 is supported from both sides by a pair of mounting bosses MB such that one end is located at the rear side of the inner hollow portion of the head portion H and the other end is located at that of the grip portion 115.

Components of the reading unit 114 are mainly disposed in the rear side of the inner hollow space of the head portion H and in the inner hollow space of the grip portion 115. Similarly, components of the data processing unit 116 are mainly disposed in the inner hollow space of the grip portion 115.

The barcode reader 110 is provided with a substantially plate-like dustproof member 150 located in the inner hollow space of the head portion H at a predetermined position allowing the components of the reading unit 114 and those of the data processing unit 116 to be shielded from particles, such as dusts, entering through the reading window 111a from the outside thereof. In other words, the dustproof member 150 is configured to block flow of particles into the reading unit and data processing unit side in the case 111.

The dustproof member 150 also allows red illumination light to be transmissive therethrough; this red illumination light is used for reading various types of barcodes in the second embodiment.

Any type of barcodes basically consists of a graphic symbol, in block form, of alternating black bars and white spaces corresponding to digital data.

The reading unit 114 is composed of a pair of first and second illuminating red LEDs 121 corresponding to the first and second LEDs 21A and 21B. The reading unit 114 is also composed of a light emission driver 125, a illumination lens 152, and a reflector 132f. The reading unit 114 is composed of a pair of first and second imaging lenses 127A and 127B corresponding to the first and second imaging lenses 27A and 27B, and a pair of first and second photodetectors 123A and 123B.

In the second embodiment, the dustproof member 150 is integrally composed of the illumination lens 152, a light-transmissive plate 154 as an example of light-transmissive members, and a holder 156.

Each of the first and second LEDs 121 serving as an illumination light source is supported by the holder 156, and is electrically connected to the emission driver 125.

The dustproof member 150 is arranged in the inner hollow portion of the head portion H such that:

each of the first and second LEDs 121 supported by the holder 156 is disposed close to the surface wall of the lower case part 111L;

optical axes of the first and second LEDs 121 supported by the holder 156 are directed to one line passing through the center of the reading window 111a along the longitudinal direction thereof;

the illumination lens 152 is coaxially disposed between the reading window 111a and each LED 121; and the peripheral portion of the dustproof member 150 is gas-tightly contacted respectively on the inner wall of the upper case part 111U and that of the lower case part 111L to block the light channel formed in the head portion H.

The alignment of each of the LEDs 121 and the illumination lens 152 permits the lower half of the light channel formed in the head portion H to be allocated as an illumination light channel; this lower half is the half of the light channel on the lower case part side thereof.

In addition, note that the remaining half of the light channel formed in the head portion H is allocated as a reflected-light channel.

Specifically, in preparation for reading a barcode B attached to a goods as an example of a target, the reading window 111a of the barcode reader 110 is positioned to be opposite to (e.g. substantially in contact with) the barcode B such that the long side direction of the reading window 111a is substantially parallel to the length direction across the bars of the barcode B.

After the preparation, when the light emission driver 125 causes each of the first and second LEDs 121 to emit red illumination light, the red illumination light emitted from each of the first and second LEDs 121 through the illumination light channel is focused by the illumination lens 152 of the dustproof member 150 to be irradiated via the reading window 111a onto the barcode B.

Light reflected from the barcode B via the reading window 111a based on the red illumination light is transferred through the reflected-light channel in the head portion H, and passes through the light-transmissive plate 154 of the dustproof member 150; this reflected light from the barcode B has an intensity pattern corresponding to the bar and space pattern (black and white pattern) of the barcode B.

Each of the first and second photodetectors 123A and 123B is for example composed of a one-dimensional image sensor, such as a CMOS image sensor, a CCD image sensor, or the like. Specifically, each of the first and second photodetectors 123A and 123B is provided at its one surface with a light-sensitive pixel area.

The light-sensitive pixel area of each of the first and second photodetectors 123A and 123B has a substantially rectangular shape allowing various barcodes to be scanned, and is composed of optoelectric transducers (pixels) horizontally arranged in parallel to the longitudinal directin of the reading window 1a. Each of the optoelectric transducers of each of the first and second photodetectors 123A and 123B is operative to sense light, convert the sensed light to an electric signal (image), and output it.

The structures of the first and second imaging lenses 127A and 127B are substantially identical to those of the first and second imaging lenses 27A and 27B, so descriptions of which are omitted.

The first and second imaging lenses 127A and 127B are mounted on the inner surface of the upper case part 111U to be symmetrically disposed both sides of the center axis of the barcode reader 110 in parallel to the direction Y of the reading window 111a as in the case of the information reader 10 (see FIG. 2).

The first and second imaging lenses 127A and 127B are arranged such that their optical axes Xa and Xb are parallel to the center axis XC of the reader 110 as in the case of the information reader 10 (see FIG. 2).

The first and second photodetectors 123A and 123B are respectively mounted on the circuit board 118 through a holder 137 with a substantially L-shape in the longitudinal direction of the barcode reader 110 such that:

their pixel areas face the first and second imaging lenses 127A and 127B;

their other surfaces are located on a virtual plane 137L disposed orthogonal to their optical axes (center axes) XA and XB of their pixel areas; and their optical axes XA and XB are arranged with a predetermined interval therebetween to be shifted laterally from and parallely to the optical axes Xa and Xb of the first and second imaging lenses 127A and 127B.

Specifically, as compared with the first and second imaging lenses 27A and 27B, the first and second imaging lenses 127A and 127B are arranged to have an interval therebetween longer than that between the first and second imaging lenses 27A and 27B. The interval between the lenses 127A and 127B is determined depending on the length of various barcodes as target of the barcode reader 110.

Similarly, as compared with the first and second photodetectors 23A and 23B, the first and second photodetectors 123A and 123B are arranged to have an interval therebetween longer than the interval d1 between the photodetectors 23A and 23B. The interval between the photodetectors 123A and 123B is determined depending on the length of various barcodes as target of the barcode reader 110.

As in the case of the first embodiment, the arrangement of the first and second photodetectors 123A and 123B and the first and second imaging lenses 127A and 127B allow predetermined FOVs of the first and second photodetectors 123A and 123B to be superimposed on a first virtual plane. The first virtual plane is located externally close to and parallel to the reading window 111a of the reader 110 at a constant distance from a second virtual plane in the longitudinal direction of the reader 110; this second virtual plane contains the pixel areas of the first and second photodetectors 123A and 123B.

Specifically, in starting to read a barcode B attached onto one surface of a target R, the barcode reader 110 is located so that the reading window 111a is opposite to be close to the target R and that the barcode B is positioned within the FOVs of the first and second photodetectors 123A and 123B.

For example, when each of the first and second LEDs 121 is activated, it emits red illumination light toward the target R. The red illumination light emitted from each of the LEDs 121 is transferred via the illumination lens 152 and the reading window 111a to be irradiated on the target R and the barcode B.

Light reflected from the target R containing the barcode B based on the red illumination light is entered through the reading window 111a into each of the imaging lenses 127A and 127B. The reflected light entered into each of the imaging lenses 127A and 127B is focused on the pixel area of a corresponding one of the first and second photodetectors 123A and 123B.

At that time, the optoelectric transducers of each of the first and second photodetectors 123A and 123B are simultaneously driven so that an image corresponding to the target R containing the barcode B is picked up by each of the first and second photodetectors 123A and 123B.

Specifically, a charge in each optoelectric transducer of the pixel area of the first photodetector 123A based on the reflected light imaged on the pixel area is scanned horizontal-line by horizontal-line so that a first image corresponding to a light intensity of each optoelectric transducer of the pixel area of the first photodetector 123A is picked up. Similarly, a second image corresponding to a light intensity of each optoelectric transducer of the pixel area of the second photodetector 123B can be picked up.

The data processing unit 116 is mainly installed in the inner hollow space of the grip portion 115 to be supported by the mounting bosses MB.

The data processing unit 116 is composed of a plurality of circuit components 120a including a waveform shaping unit 140, a memory unit 142, a decoding circuit 144, and an output circuit 146, each of which is mounted on the circuit board 118 to be arranged in accordance with a predetermined circuit design.

The waveform shaping unit 140 is electrically connected to each of the first and second photodetectors 123A and 123B and to the decoding circuit 144. The first and second images detected by the optoelectric transducers of the first and second photodetectors 123A and 123B are sent to the waveform shaping unit 140.

The waveform shaping unit 140 is operative to carry out waveform shaping of the sent first and second images and to supply the waveform-shaped first and second images to the decoding circuit 144.

Specifically, the intensity level of the first and second images outputted from the photodetectors 123A and 123B represents the bar and space pattern (symbology) of the barcode B.

The decoding circuit 144 is operative to digitize at least one of the first and second images based on their intensity levels, thereby decoding the barcode B. The decoding circuit 144 is operative to store, in the memory unit 42, the decoded data (information) to be stored on the barcode B. The microcomputer 44 is operative to send information stored in the memory unit 42 via the output circuit 146 to a host system at given timing.

In addition, the beeper 148 is electrically connected to the decoding circuit 144. Upon success of decoding the barcode B, the decoding circuit 144 causes the beeper 148 to beep.

Specifically, in starting to read a barcode B attached onto one surface of a target R, the barcode reader 110 is located so that the reading window 111a is opposite to be close to the target R and that the barcode B is positioned within the FOVs of the first and second photodetectors 123A and 123B.

For example, when each of the first and second LEDs 121 is activated under control of the control circuit 40, it emits red illumination light toward the target R in step S32 of FIG. 12. The red illumination light emitted from each of the LEDs 121 is transferred via the illumination lens 152 and the reading window 111a to be irradiated on the target R and the barcode B.

Light reflected from the target R containing the barcode B based on the red illumination light is entered through the reading window 111a into each of the imaging lenses 127A and 127B. The reflected light entered into each of the imaging lenses 127A and 127B is focused on the pixel area of a corresponding one of the first and second photodetectors 123A and 123B.

At that time, the control circuit 40 controls the optoelectric transducers of each of the first and second photodetectors 123A and 123B to, for example, simultaneously drive the corresponding optoelectric transducers thereof based on a corresponding shutter speed. This allows first and second images of the optoelectric transducers of the first and second photodetectors 123A and 123B corresponding to the target R containing the barcode B to be simultaneously picked up by the first and second photodetectors 123A and 123B, respectively in step S34.

Next, the decoding circuit 144 caries out a decoding task including a specular reflection determining task based on the first and second images in step S36.

Specifically, in step S36a, the decoding circuit 144 compares the intensity level of the first image of each pixel with a first predetermined threshold level L1 and a second predetermined threshold level L2 higher than the first threshold level L1.

Figure 13:
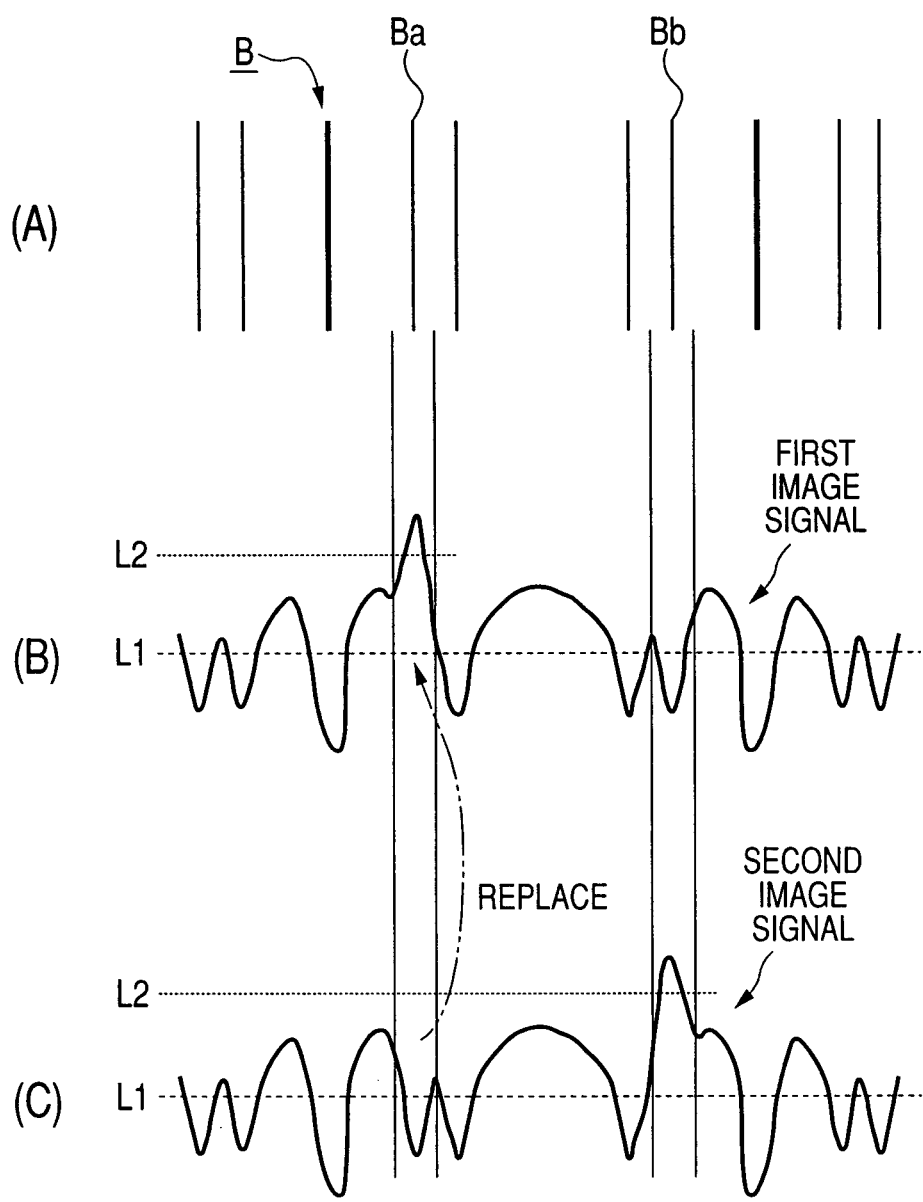
FIG. 13 is a view schematically illustrating a part of a barcode as a reading target of the barcode reader, and waveforms of a first image and a second image respectively picked up by first and second photodetectors illustrated in FIG. 11.

For example, as illustrated in (B) of FIG. 13, when the intensity levels of the first image of some pixels are higher than the first threshold level L1, and equal to or lower than the second threshold level L2, the decoding circuit 144 digitizes the first image of some pixels to a white image corresponding to a binary digit of 0 in steps S36b and S36c.

In contrast, when the intensity levels of the first image of some pixels are equal to or lower than the first threshold level L1, the decoding circuit 144 digitizes the first image of some pixels to a black image corresponding to a binary digit of 1 in steps S36d and S36e.

Otherwise, as illustrated in (B) of FIG. 13, when the intensity levels of the first image of some pixels corresponding to a bar Ba of the barcode B are higher than the second threshold level L2, the decoding circuit 144 determines that the first image contains a specular reflection region located at the bar Ba and thereabout in steps S36f and 36g.

The processes in steps S36 (S36a to S36g) are carried out for the second image in the same manner as the first image.

In cases where a specular reflection region appears in the first image data at a portion corresponding to the bar Ba in steps S36f and 36g, the processes in steps S36f and S36g are carried out for the second image. This allows the decoding circuit 144 to determine that the second image contains a specular reflection region located at a bar Bb and thereabout (see (C) of FIG. 13, which is misaligned with the bar Ba for the same reasons as the first embodiment (see FIG. 10).

Thus, in cases where a specular reflection region appears in the first image data at a portion corresponding to the bar Ba in steps S36f and 36g, the decoding circuit 144 proceeds to step S36h.

In step S36h, the decoding circuit 144 corrects the first image by replacing the first image of some pixels corresponding to the bar Ba of the barcode B identified as the specular reflection region into the second image of the same pixels corresponding to the bar Ba (see (B) and (C) of FIG. 13). Thereafter, the decoding circuit 144 decodes the replaced second image of some pixels corresponding to the bar Ba of the barcode B using the first and second threshold levels L1 and L2.

As described above, like the first embodiment, the arrangement of the first and second photodetectors 123A and 123B and the first and second imaging lenses 127A and 127B allow predetermined FOVs of the first and second photodetectors 123A and 123B to be superimposed on the first virtual plane. The first virtual plane is located at a constant distance from the second virtual plane in the longitudinal direction of the barcode reader 110; this second virtual plane contains the pixel areas of the first and second photodetectors 123A and 123B.

Specifically, while the barcode reader 110 is located such that the barcode B is positioned within the FOVs of the photodetectors 123A and 123B with the reflected light being focused on the pixel area of each of the photodetectors 123A and 123B, the optoelectric transducers of the first photodetector 123A and those of the second photodetector 123B are simultaneously driven.

This allows the first and second images of the optoelectric transducers of the first and second photodetectors 123A and 123B corresponding to the target R containing the barcode B to be simultaneously picked up by the first and second photodetectors 123A and 123B, respectively.

Therefore, the first image obtained by the first photodetector 123A and the second image obtained by the second photodetector 123B can be substantially identical in size and orientation to each other.

This makes it possible to easily match the positions of the bars (spaces) in the first image and those of the bars (spaces) in the second image without associating addresses of a region of the memory unit 142 in which the first image is stored with those of another region thereof in which the second image is stored.

In addition, the first and second photodetectors 123A and 123B are configured such that their center axes XA and XB are arranged with the interval therebetween to be shifted laterally from and parallely to the optical axes Xa and Xb of the first and second imaging lenses 127A and 127B. The arrangement of the first and second photodetectors 123A and 123B allows a specular reflection region contained in the first image to be shifted in position from a specular reflection region contained in the second image.

Accordingly, intensity levels in a bar and/or space corresponding to a specular reflection region in one of the first and second images can be replaced into those in the same bar and/or space in the other of the first and second images. This makes it possible to eliminate the impact of specular reflection from the one of the first and second images, thus properly reading the barcode B even if a positional relationship between the target R and each of the first and second photodetectors 123A and 123B causes a specular reflection component to be contained in at least one of the first and second images.

Third Embodiment

An optical information reader according to a third embodiment of the present invention will be described hereinafter. The structure of the optical information reader according to the third embodiment is substantially identical to that of the optical information reader 10 according to the first embodiment.

Thus, like reference characters are assigned to like parts in the optical information readers according to the first and third embodiments, and therefore, descriptions of the structure of the optical information reader according to the third embodiment are omitted.

Operations of the information reader 10 according to the third embodiment, which are different from those of the reader according to the first embodiment, will be described hereinafter with reference to FIGS. 14 to 17 hereinafter.

Figure 14:
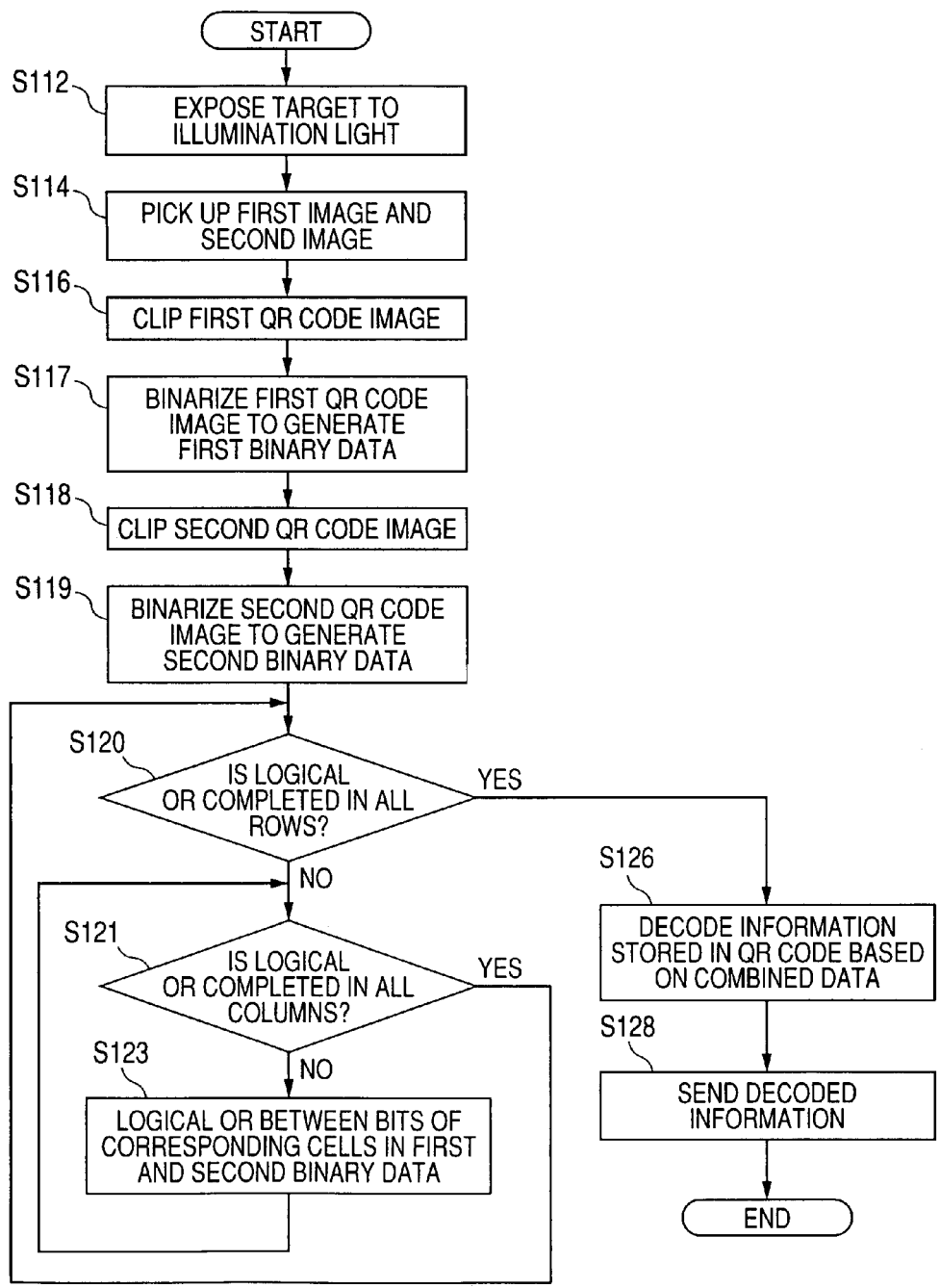
FIG. 14 is a flowchart schematically illustrating flow of reading operations of a QR code executable by an optical information reader according to a third embodiment of the present invention.

In the information reader 10 according to the third embodiment, the tasks in steps S112 and S114 of FIG. 14, which are identical to those in steps S12 and S14 of FIG. 6, are carried out by the control circuit 40, each of the first and second LEDs 21A and 21B, and each of the first and second photodetectors 23A and 23B.

Thus, first and second images of the target R containing the QR code Q are simultaneously picked up by the optoelectric transducers of the first and second photodetectors 23A and 23B, respectively.

A corresponding one of the first and second images outputted from each of the first and second photodetectors 23A and 23B is amplified by a corresponding one of the first and second amplifiers 31A and 31B to be transferred to a corresponding one of the first and second clipping circuits 32A and 32B.

Next, the control circuit 40 controls the first clipping circuit 32A to clip a first QR code image QI1 corresponding to the QR code Q from the amplified first image outputted from the first amplifier 31A in step S116 in which the operations in step S16 (S16a to S16e) are carried out.

(A1) of FIG. 15 schematically illustrates the first QR code image QI1. As illustrated in FIG. 2 and (A1) of FIG. 15, the clipped first QR code image QI1 becomes distorted such that its one side (Y1 side, such as right side) in the Y direction is wider than its other side (Y2 side, such as left side) therein closer to the center axis XC than the one side of the image QI1. This is because the first photodetector 23A is arranged such that its center axis XA is shifted toward the Y1 side from the center axis XC in the Y direction.

Subsequently, the control circuit 40 controls the first A/D converter 33A to execute a mapping task to thereby convert the first QR code image QI1 cell by cell into first binary data BQ1 of the QR code Q.

In the third embodiment, like the first embodiment, as first image data DQ1, the digital values of 13×13 cells each corresponding to one level of light intensity within the range from 0 level to 255 level can be obtained by the first A/D converter 33A.

In addition, in step S117, the control circuit 40 compares the digital value of each cell in the first image data DQ1 with a predetermined threshold value corresponding to an intermediate level, such as 50 level in the 256 levels of light intensity. This allows the digital value of each cell in the first image data DQ1 to be binarized so that the first binary data BQ1 is generated.

Specifically, when the digital value of one cell in the first image data DQ1 is equal to or higher than the predetermined threshold value, the digital value of the one cell in the first image data DQ1 is binarized to a bit of 0 as the one cell of the first binary data BQ1 corresponding to a white (light) pattern.

In contrast, when the digital value of one cell in the first image data DQ1 is lower than the predetermined threshold value, the digital value of the one cell in the first image data DQ1 is binarized to a bit of 1 of the one cell of the first binary data BQ1 corresponding to a black (dark) pattern.

As well as the first image, the control circuit 40 controls the second clipping circuit 32B to clip a second QR code image QI2 corresponding to the QR code Q from the amplified second image outputted from the second amplifier 31B in step S118 in which the operations in step S16 (S16a to S16e) are carried out.

As illustrated in (B1) of FIG. 15, the clipped second QR code image QI2 becomes distorted such that its one side (Y2 side, such as left side) in the Y direction is wider than its other side (Y1 side, such as right side) in the Y direction closer to the center axis XC than the one side of the image QI2. This is because the second photodetector 23B is arranged such that its center axis XB is shifted toward the Y2 side from the center axis XC in the Y direction.

Subsequently, the control circuit 40 controls the second A/D converter 33B to execute a mapping task to thereby convert the second QR code image QI2 cell by cell into second binary data BQ2 of the QR code Q.

Like the first image data DQ1, as the second image data DQ2, the digital values of 13×13 cells each corresponding to one level of light intensity within the range from 0 level to 255 level can be obtained by the second A/D converter 33B.

In addition, in step S119, the control circuit 40 compares the digital value of each cell in the second image data DQ2 with the predetermined threshold value. This allows the digital value of each cell in the second image data DQ2 to be binarized so that the second binary data BQ2 is generated.

Specifically, when the digital value of one cell in the second image data DQ2 is equal to or higher than the predetermined threshold value, the digital value of the one cell in the second image data DQ2 is binarized to a bit of 0 as the one cell of the second binary data BQ2 corresponding to a white (light) pattern.

In contrast, when the digital value of one cell in the second image data DQ2 is lower than the predetermined threshold value, the digital value of the one cell in the second image data DQ2 is binarized to a binary bit of 1 of the one cell of the second binary data BQ2 corresponding to a black (dark) pattern.

The binary data of 1 or 0 of each cell of each of the first and second binary data BQ1 and BQ2 is stored in its corresponding unique address of the memory 35, this unique address is supplied from a corresponding one of the address generators 36A and 36B.

Note that, if the QR code Q has 21×21 cells, as the first binary data BQ1, the binary data of 1 or 0 of each of 21×21 cells can be obtained by the control circuit 40. Similarly, as the second binary data BQ2, the binary data of 1 or 0 of each of 21×21 cells can be obtained by the control circuit 40.

(A2) and (B2) of FIG. 15 schematically illustrate the first binary data BQ1 of 13×13 cells in rows and columns and the second binary data BQ2 of 13×13 cells in rows and columns, respectively. In addition, (A1) and (B1) of FIG. 16 schematically illustrate part of cells in the first binary data BQ1 and that of cells in the second binary data BQ2, respectively.

The cells of each of the first and second binary data BQ1 and BQ2 are labeled in the same manner as the first and second image data DQ1 and DQ2.

Figure 16:
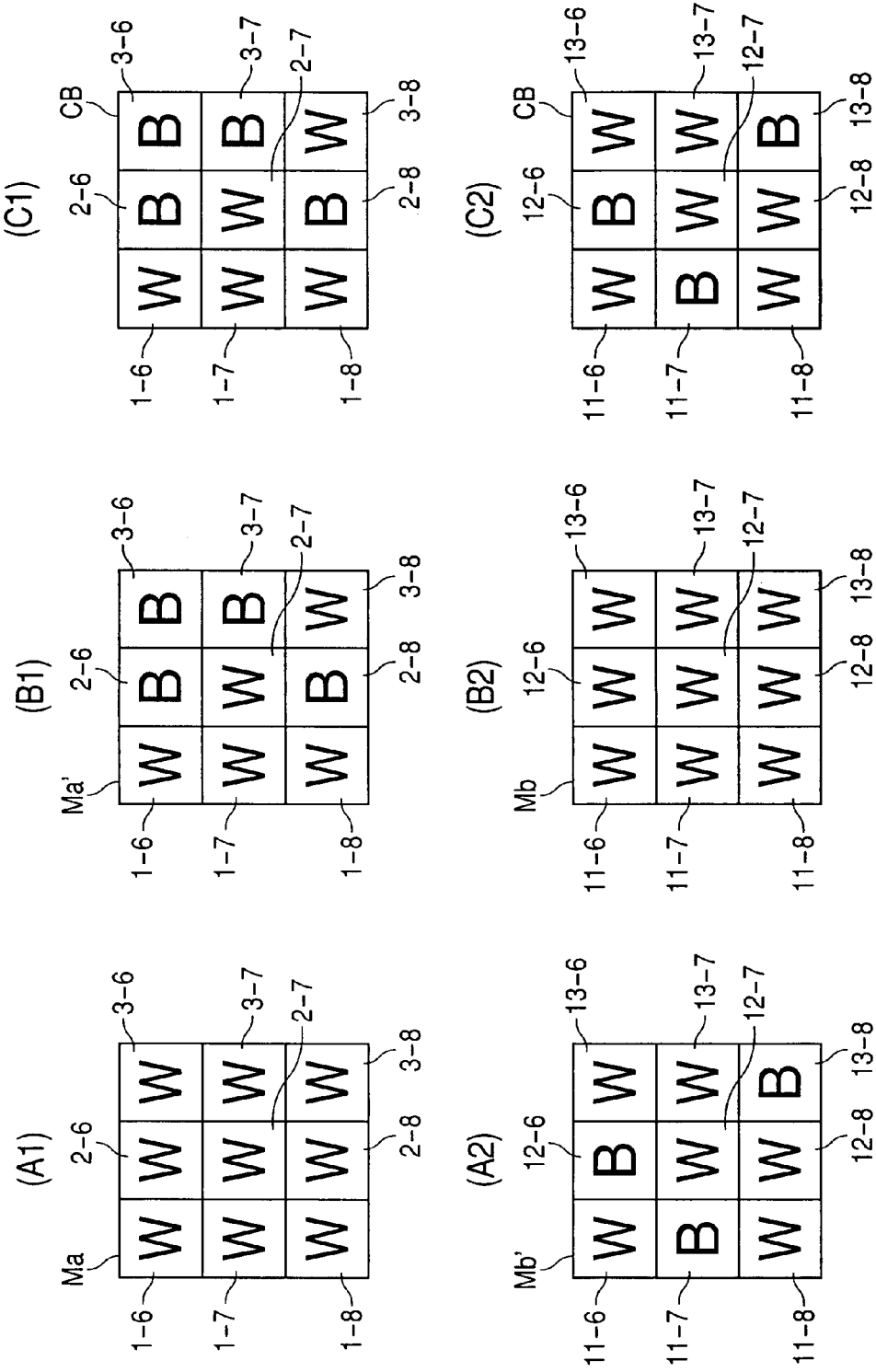
FIG. 16 is a view schematically illustrating binary digits assigned to cells in the first binary data, binary digits assigned to the same cells in the second binary data, and binary digits assigned to the same cells of combined image data according to the third embodiment.

A bit of 0 to be assigned to some of cells in each of the first and second binary data BQ1 and BQ2 is illustrated in (A2) and (B2) of FIG. 15 and (A1) and (B1) of FIG. 16 as "W". Similarly, a bit of 1 to be assigned to some of cells in each of the first and second binary data BQ1 and BQ2 is illustrated in (A2) and (B2) of FIG. 15 and (A1) and (B1) of FIG. 16 as "B".

Figures 17, 18:
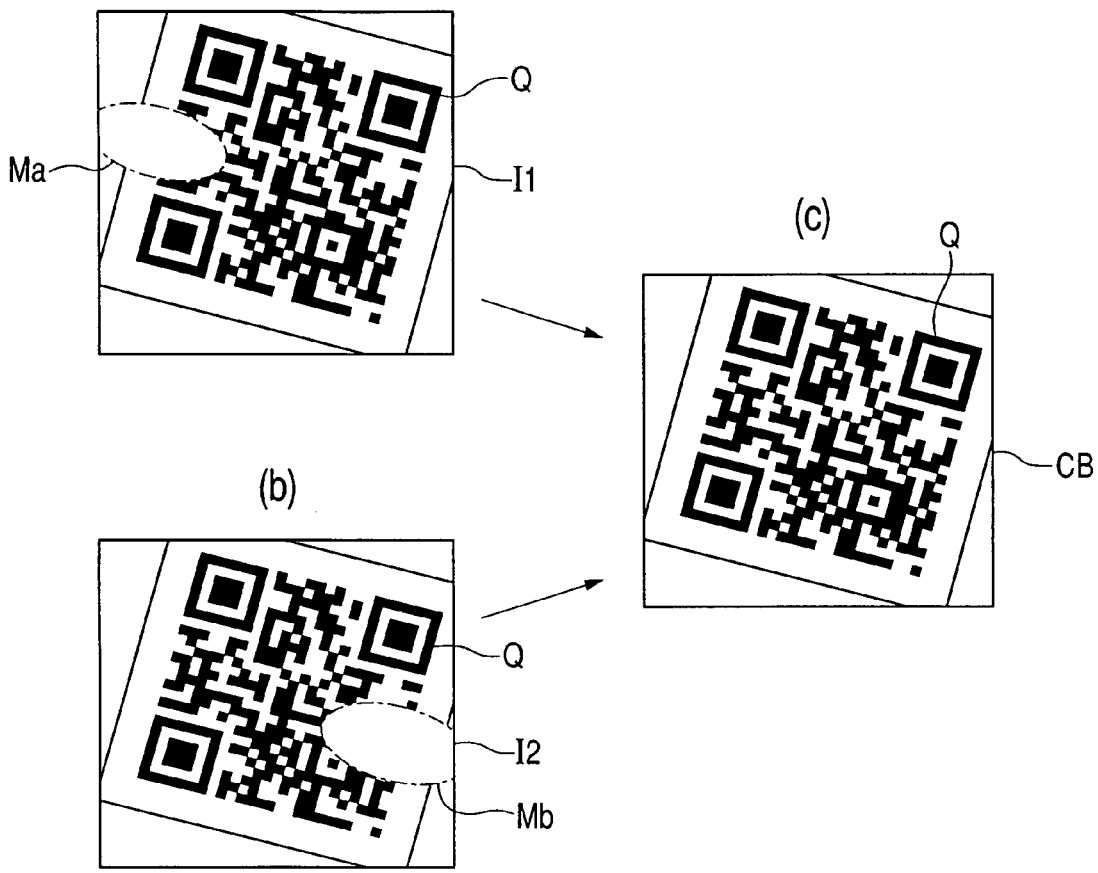
FIG. 17 is a view schematically illustrating a specular reflection region contained in each of a first image and a second image and a QR code image from which the specular reflection region is eliminated according to the third embodiment.
FIG. 18 is a table schematically illustrating a logical combination rule used by the optical information reader according to the third embodiment.

In the third embodiment, for example, it is assumed that a first image I1 is picked up by the first photodetector 23A, and a second image I2 is picked up by the second photodetector 23B (see [a] and [b] of FIG. 17).

Specifically, as illustrated in [a] of FIG. 17, the first image I1 contains a specular reflection region Ma positioned at its left side, and the second image I2 contains a specular reflection region Mb positioned at its right side, which is shifted from the specular reflection region Ma.

The reason why the specular reflection region Ma and the specular reflection region Mb are misaligned from each other have been described hereinbefore with reference to FIG. 10.

Specifically, as illustrated in, for example, [a] and [b] of FIG. 17, the specular reflection region Ma appearing in the first image I1 and the specular reflection region Mb appearing in the second image I2 are different in position from each other.

In the third embodiment, as illustrated in (A2) of FIG. 15 and (A1) of FIG. 16, it is assumed that the first binary data BQ1 is generated based on the first image I1 containing the specular reflection region Ma so that cells 1-6, 2-6, 3-6, 1-7, 2-7, 3-7, 1-8, 2-8, and 3-8 in the binary data BQ1 correspond to the specular reflection region Ma. As illustrated in (A1) of FIG. 16, a bit of 0 (W) is assigned to each of the cells 1-6, 2-6, 3-6, 1-7, 2-7, 3-7, 1-8, 2-8, and 3-8 in the binary data BQ1 correspond to the specular reflection region Ma.

Similarly, as illustrated in (B2) of FIG. 15 and (B2) of FIG. 16, it is assumed that the second binary data BQ2 is generated based on the second image I2 containing the specular reflection region Mb so that cells 11-6, 12-6, 13-6, 11-7, 12-7, 13-7, 11-8, 12-8, and 13-8 in the binary data BQ2 correspond to the specular reflection region Mb. As illustrated in (B2) of FIG. 16, a bit of 0 (W) is assigned to each of the cells 11-6, 12-6, 13-6, 11-7, 12-7, 13-7, 11-8, 12-8, and 13-8 in the binary data BQ2 correspond to the specular reflection region Mb.

In contrast, as illustrated in (B1) of FIG. 16, bits of cells 1-6, 2-6, 3-6, 1-7, 2-7, 3-7, 1-8, 2-8, and 3-8 of a region Ma' in the second binary data BQ2 corresponding to the specular reflection region Ma are properly binarized.

Similarly, as illustrated in (A2) of FIG. 16, bits of cells 1-6, 12-6, 13-6, 11-7, 12-7, 13-7, 11-8, 12-8, and 13-8 of a region Mb' in the first binary data BQ1 corresponding to the specular reflection region Mb are properly binarized.

Thus, the control circuit 40 carries out logical combination between the bit of each cell in the first binary data BQ1 and the bit of a corresponding one of the cells in the second binary data BQ2 row by row and column by column in accordance with a logical combination rule T1 (see FIG. 18) indicative of logical OR in steps S120, S121, and S123.

For example, logical OR between the bit (W) of each of the cells 1-6, 2-6, 3-6, 1-7, 2-7, 3-7, 1-8, 2-8, and 3-8 in the first binary data BQ1 corresponding to the specular reflection region Ma and the bit of a corresponding one of the cells 1-6, 2-6, 3-6, 1-7, 2-7, 3-7, 1-8, 2-8, and 3-8 in the second binary data BQ2 provide bits of cells 1-6, 2-6, 3-6, 1-7, 2-7, 3-7, 1-8, 2-8, and 3-8 in combined data CB illustrated (C1) of FIG. 16.

These bits of the cells 1-6, 2-6, 3-6, 1-7, 2-7, 3-7, 1-8, 2-8, and 3-8 in the combined data CB are equivalent to the bits of the cells 1-6, 2-6, 3-6, 1-7, 2-7, 3-7, 1-8, 2-8, and 3-8 of the region Ma' in the second binary data BQ2, which include no specular reflection regions.

Similarly, logical OR between the bit (W) of each of the cells 11-6, 12-6, 13-6, 11-7, 12-7, 13-7, 11-8, 12-8, and 13-8 in the second binary data BQ2 corresponding to the specular reflection region Mb and the bit of a corresponding one of the cells 11-6, 12-6, 13-6, 11-7, 12-7, 13-7, 11-8, 12-8, and 13-8 in the first binary data BQ1 provide bits of cells 11-6, 12-6, 13-6, 11-7, 12-7, 13-7, 11-8, 12-8, and 13-8 in the combined data CB illustrated (C2) of FIG. 16.

These bits of the cells 11-6, 12-6, 13-6, 11-7, 12-7, 13-7, 11-8, 12-8, and 13-8 in the combined data CB are equivalent to the bits of the cells 11-6, 12-6, 13-6, 11-7, 12-7, 13-7, 11-8, 12-8, and 13-8 of the region Mb' in the first binary data BQ1, which include no specular reflection regions.

Specifically, in the third embodiment, the combination of the first binary data BQ1 and the second binary data BQ2 cell by cell allows at least one specular reflection region to be eliminated without detecting the at least one specular reflection region.

When the logical OR between the bit of each cell in the first binary data BQ1 and the bit of a corresponding one of the cells in the second binary data BQ2 is completed in all rows and all columns (the determinations in steps S120 and S121 are affirmative), the control circuit 40 proceeds to step S126.

In step S126, the control circuit 40 decodes information stored in the QR code Q and indicated as the light (white) or dark (black) colored cells C thereof based on the bit 1 or 0 of each cell of the combined data CB.

Thereafter, the control circuit 40 sends the decoded information stored in the QR code Q to the host system as an example, exiting the operations of the information reader 10 in step S128.

As described above, in the information reader 10 according to the third embodiment, the first and second photodetectors 23A and 23B are configured to simultaneously pick up an image of the QR code Q under control of the control circuit 40. Next, the first and second clipping circuits 32A and 32B are configured to respectively clip the first and second QR code images QI1 and QI2 from the picked-up image under control of the control circuit 40.

The first A/D converter 33A is configured to obtain, as the first image data DQ1, the digital values of 13×13 cells each corresponding to one level of light intensity within the range from 0 level to 255 level. Similarly, the second A/D converter 33B is configured to obtain, as the second image data DQ2, the digital values of 13×13 cells each corresponding to one level of light intensity within the range from 0 level to 255 level.

The control circuit 40 is configured to binarize:

the digital value of each cell in the first image data DQ1 corresponding to the light intensity of each cell to thereby generate the first binary data BQ1; and the digital value of each cell in the second image data DQ2 corresponding to the light intensity of each cell to thereby generate the second binary data BQ2.

Moreover, the control circuit 40 carries out logical combination between the bit of each cell in the first binary data BQ1 and the bit of a corresponding one of the cells in the second binary data BQ2 row by row and column by column in accordance with the logical combination rule T1 indicative of logical OR. This allows at least one specular reflection region contained in each of the first and second binary data BQ1 and BQ2 to be eliminated.

That is, in the third embodiment, the number of cells of the QR code Q is set to be extremely lower than the number of pixels (optoelectric transducers) of each of the first and second photodetectors 23A and 23B. Therefore, in the third embodiment, the combination task using the first and second binary data BQ1 and BQ2 can be carried out cell by cell.

For this reason, as compared with the image superimposing tasks being carried out pixel by pixel of each of first and second images of a target disclosed in the Patent Publication No. H02-98789 (third example), it is possible to simply eliminate a specular reflection region contained in each of the first and second images QI1 and QI2, thus rapidly decoding information stored in the QR code Q.

In addition, the first and second photodetectors 23A and 23B are configured such that their center axes XA and XB are arranged with the interval d1 therebetween to be shifted laterally from and parallely to the optical axes Xa and Xb of the first and second imaging lenses 27A and 27B. The arrangement of the first and second photodetectors 23A and 23B allows a specular reflection region contained in the first QR code image to be shifted in position from a specular reflection region contained in the second QR code image.

Accordingly, logical OR between the bit of each cell in the first binary data BQ1 and the bit of a corresponding one of the cells in the second binary data BQ2 cell by cell allows bits in the cells of a specular reflection region contained in one of the first and second binary data BQ1 and BQ2 to be replaced into those in the same cells of a corresponding region contained in the other of the first and second binary data BQ1 and BQ2.

This makes it possible to eliminate the impact of specular reflection from the one of the first and second QR code images, thus properly reading the QR code Q even if a positional relationship between the target R and each of the first and second photodetectors 23A and 23B causes a specular reflection component to be contained in at least one of the first and second QR code images.

Fourth Embodiment

An optical information reader according to a fourth embodiment of the present invention will be described hereinafter. The structure of the optical information reader according to the fourth embodiment is substantially identical to that of the optical information reader 10 according to the first embodiment.

Thus, like reference characters are assigned to like parts in the optical information readers according to the first and fourth embodiments, and therefore, descriptions of the structure of the optical information reader according to the fourth embodiment are omitted.

Operations of the information reader 10 according to the fourth embodiment, which are different from those of the reader according to the first embodiment or the third embodiment, will be described hereinafter with reference to FIGS. 19 to 23 hereinafter.

Figure 19:
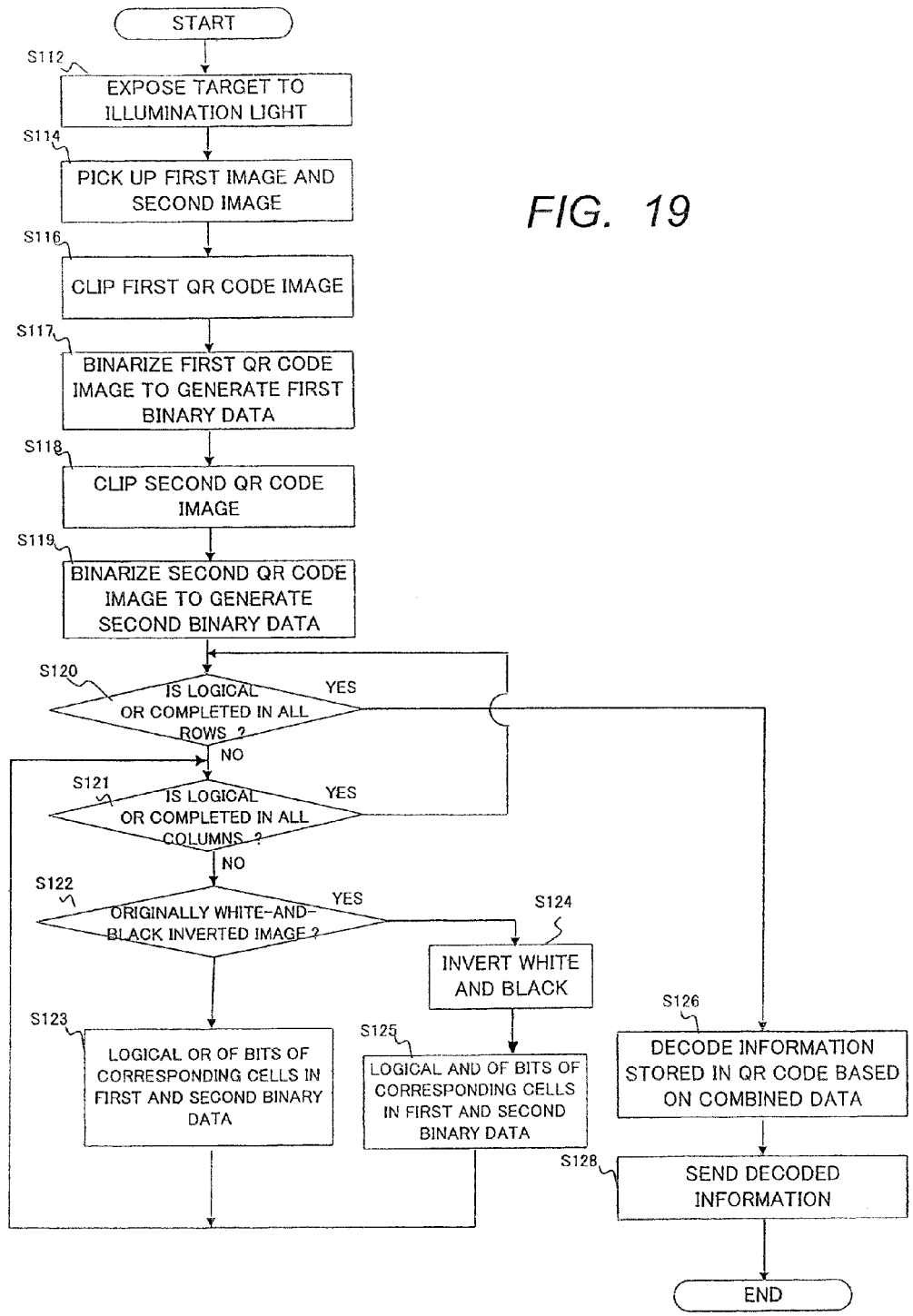
FIG. 19 is a flowchart schematically illustrating flow of reading operations of a QR code executable by an optical information reader according to a fourth embodiment of the present invention.

In the information reader 10 according to the fourth embodiment, the tasks in steps S112 and S119 of FIG. 19, which are identical to those in steps S112 to S119 of FIG. 14, are carried out by the information reader 10.

Note that, in the fourth embodiment, a QR code Q5 is directly marked on a metal surface of a target R.

Specifically, as illustrated in (A1) of FIG. 20, dot-marked portions in the QR code Q5 are colored in white (light) in a first image I1A, and dot-unmarked portions are colored in black (dark) in the first image I1A. When a specular reflection region Mc is contained in the first image I1A, the specular reflection region Mc is colored in white (light).

In contrast, a normal QR code Q has dot-marked portions colored in black (dark), and dot-unmarked portions colored in white (light). That is, the directly marked QR code Q5 is designed such that black cells of a normal QR code Q are turned to white cells, and white cells of the normal QR code Q are turned to black cells. Such a first image I1A of the QR code Q5 will be referred to as an originally reversal first image I1A.

Similarly, as illustrated in (B1) of FIG. 20, dot-marked portions in the QR code Q5 are colored in white (light) in a second image I2A, and the dot-unmarked portions colored in black (dark) in the second image I2A. When a specular reflection region Md corresponding to the specular reflection region Mc is contained in the second image I2A, the specular reflection region Md is colored in white (light).

(A2) of FIG. 20 illustrates a first image I1B of the QR code Q5 whose originally black cells are inverted to white cells and originally white cells are inverted to black cells. Similarly, (B2) of FIG. 20 illustrates a second image I2B of the QR code Q5 whose originally black cells are inverted to white cells and originally white cells are inverted to black cells.

In the black-and-white inverted first image I2A illustrated in (A2) of FIG. 20, however, the specular reflection region Mc is inverted in color from white to black. Similarly, in the black-and-white inverted second image I2B illustrated in (B2) of FIG. 20, however, the specular reflection region Md is inverted in color from white to black.

Logical OR between the black-and-white inverted first and second binary data cannot eliminate the specular reflection region Mc because the specular reflection region Mc is colored black corresponding to a bit of 1.

Thus, in the fourth embodiment, logical AND is used to combine the black and white inverted first and second binary data.

(A1) of FIG. 21 schematically illustrates the black-and-white inverted first QR code image QI1A clipped by the first clipping circuit 32A. As illustrated in FIG. 2 and (A1) of FIG. 21, the clipped first QR code image QI1A becomes distorted such that its one side (Y1 side, such as right side) in the Y direction is wider than its other side (Y2 side, such as left side) therein. This is because the first photodetector 23A is arranged such that its center axis XA is shifted toward the Y1 side from the center axis XC in the Y direction.

Similarly, (B1) of FIG. 21 schematically illustrates the black-and-white inverted second QR code image QI2A clipped by the second clipping circuit 32B.

As illustrated in (B1) of FIG. 21, the clipped second QR code image QI2A becomes distorted such that its one side (Y2 side, such as left side) in the Y direction is wider than its other side (Y1 side, such as right side) in the Y direction closer to the center axis XC than the one side of the image QI2A. This is because the second photodetector 23B is arranged such that its center axis XB is shifted toward the Y2 side from the center axis XC in the Y direction.

(A2) and (B2) of FIG. 21 schematically illustrate the first binary data BQ1A of 13×13 cells in rows and columns obtained based on the clipped first QR code image QI1A and the second binary data BQ2A of 13×13 cells in rows and columns obtained based on the clipped second QR code image QI2A, respectively. In addition, (A1) and (B1) of FIG. 22 schematically illustrate part of cells in the first binary data BQ1A and that of cells in the second binary data BQ2A, respectively.

Figure 22:
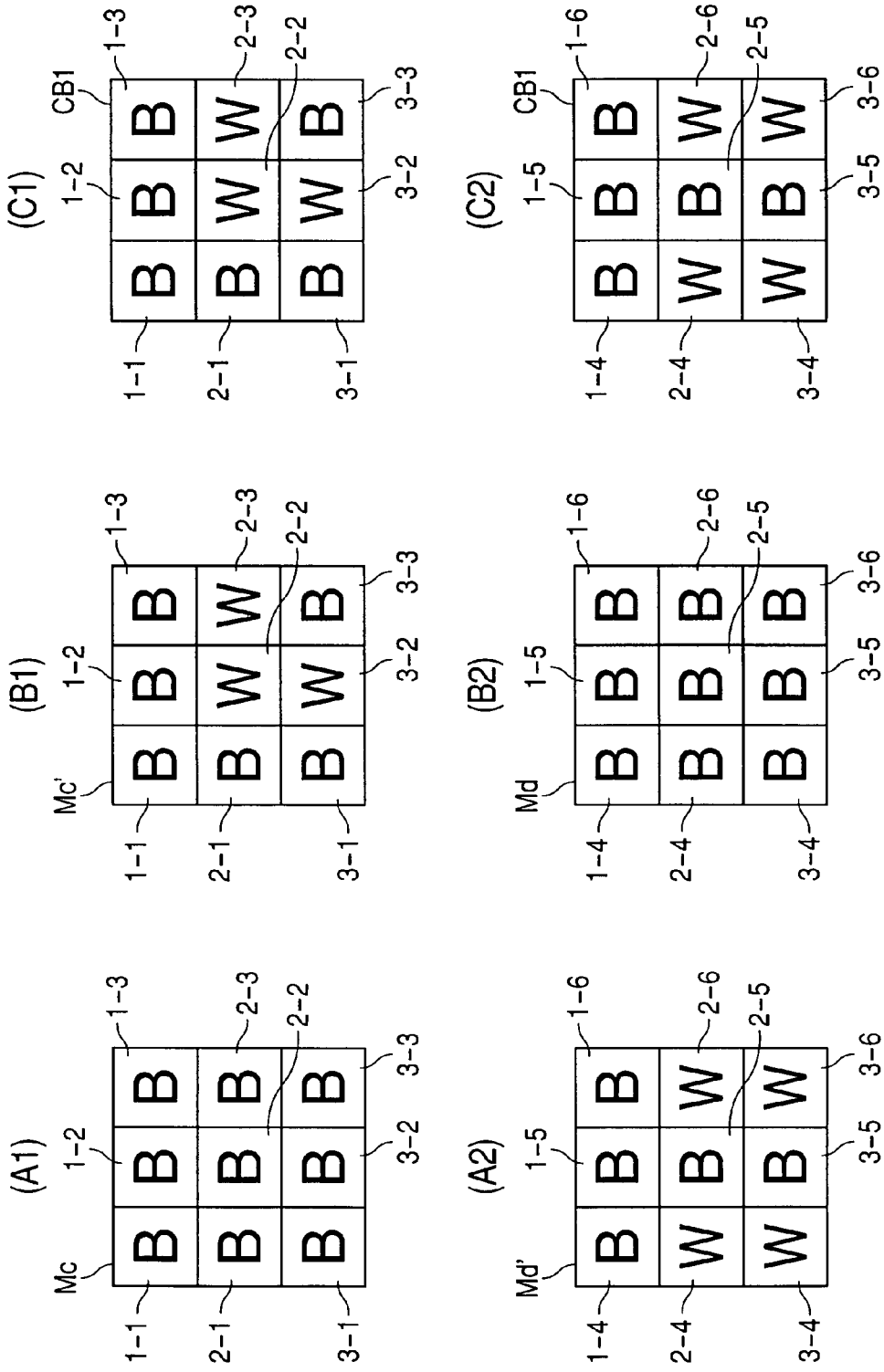
FIG. 22 is a view schematically illustrating binary digits assigned to cells in the first binary data, binary digits assigned to the same cells in the second binary data, and binary digits assigned to the same cells of combined image data according to the third embodiment.

A bit of 0 to be assigned to some of cells in each of the first and second binary data BQ1A and BQ2A is illustrated in (A2) and (B2) of FIG. 21 and (A1) and (B1) of FIG. 22 as "W". Similarly, a bit of 1 to be assigned to some of cells in each of the first and second binary data BQ1A and BQ2A is illustrated in (A2) and (B2) of FIG. 21 and (A1) and (B1) of FIG. 22 as "B".

In the fourth embodiment, as illustrated in (A2) of FIG. 21 and (A1) of FIG. 22, it is assumed that the first binary data BQ1A is generated based on the black-and-white inverted first image I1B containing the specular reflection region Mc so that cells 1-1, 2-1, 3-1, 1-2, 2-2, 3-2, 1-3, 2-3, and 3-3 in the binary data BQ1A correspond to the specular reflection region Mc. As illustrated in (A1) of FIG. 22, a bit of 1 (B) is assigned to each of the cells 1-1, 2-1, 3-1, 1-2, 2-2, 3-2, 1-3, 2-3, and 3-3 in the binary data BQ1A correspond to the specular reflection region Mc.

Similarly, as illustrated in (B2) of FIG. 21 and (B2) of FIG. 22, it is assumed that the second binary data BQ2A is generated based on the black-and-white inverted second image I2B containing the specular reflection region Md so that cells 1-4, 2-4, 3-4, 1-5, 2-5, 3-5, 1-6, 2-6, and 3-6 in the binary data BQ2A correspond to the specular reflection region Md. As illustrated in (B2) of FIG. 22, a bit of 1 (B) is assigned to each of the cells 1-4, 2-4, 3-4, 1-5, 2-5, 3-5, 1-6, 2-6, and 3-6 in the binary data BQ2 correspond to the specular reflection region Md.

In contrast, as illustrated in (B1) of FIG. 22, bits of cells 1-1, 2-1, 3-1, 1-2, 2-2, 3-2, 1-3, 2-3, and 3-3 of a region Mc' in the second binary data BQ2A corresponding to the specular reflection region Mc are properly binarized.

Similarly, as illustrated in (A2) of FIG. 22, bits of cells 1-4, 2-4, 3-4, 1-5, 2-5, 3-5, 1-6, 2-6, and 3-6 of a region Md' in the first binary data BQ1A corresponding to the specular reflection region Md are properly binarized.

Thus, the control circuit 40 determines whether the first and second binary data are generated based on originally reversal first and second images 11A and 12A illustrated in (A1) (B1) of FIG. 20.

When the first and second binary data are not generated based on the originally reversal first and second images 11A and 12A, the determination in step S122 is negative. Then, the control circuit 40 carries out logical OR between the bit of each cell in the first binary data BQ1 and the bit of a corresponding one of the cells in the second binary data BQ2 row by row and column by column in steps S120, S121, and S123.

Otherwise, when the first and second binary data are generated based on the originally reversal first and second images 11A and 12A, the determination in step S122 is affirmative.

Then, the control circuit 40 inverts the first binary data BQ1 such that black cells are turned to white cells and vice versa to generate the first binary data BQ1A. Similarly, the control circuit 40 inverts the second binary data BQ2 such that black cells are turned to white cells and vice versa to generate the second binary data BQ2A in step S124 (see (A2) and (B2) of FIG. 20 and (A2) and (B2) of FIG. 21).

Thereafter, the control circuit 40 carries out logical combination between the bit of each cell in the first binary data BQ1A and the bit of a corresponding one of the cells in the second binary data BQ2A row by row and column by column in accordance with a logical combination rule T2 (see FIG. 23) indicative of logical AND in steps S120, S121, and S125.

For example, logical AND between the bit (B) of each of the cells 1-1, 2-1, 3-1, 1-2, 2-2, 3-2, 1-3, 2-3, and 3-3 in the first binary data BQ1A corresponding to the specular reflection region Mc and the bit of a corresponding one of the cells 1-1, 2-1, 3-1, 1-2, 2-2, 3-2, 1-3, 2-3, and 3-3 in the second binary data BQ2A provide bits of cells 1-1, 2-1, 3-1, 1-2, 2-2, 3-2, 1-3, 2-3, and 3-3 in combined data CB1 illustrated (C1) of FIG. 22.

These bits of the cells 1-1, 2-1, 3-1, 1-2, 2-2, 3-2, 1-3, 2-3, and 3-3 in the combined data CB1 are equivalent to the bits of the cells 1-1, 2-1, 3-1, 1-2, 2-2, 3-2, 1-3, 2-3, and 3-3 of the region Mc' in the second binary data BQ2A, which include no specular reflection regions.

Similarly, logical AND between the bit (B) of each of the cells 1-4, 2-4, 3-4, 1-5, 2-5, 3-5, 1-6, 2-6, and 3-6 in the second binary data BQ2A corresponding to the specular reflection region Md and the bit of a corresponding one of the cells 1-4, 2-4, 3-4, 1-5, 2-5, 3-5, 1-6, 2-6, and 3-6 in the first binary data BQ1A provide bits of cells 1-4, 2-4, 3-4, 1-5, 2-5, 3-5, 1-6, 2-6, and 3-6 in the combined data CB1 illustrated (C2) of FIG. 22.

These bits of the cells 1-4, 2-4, 3-4, 1-5, 2-5, 3-5, 1-6, 2-6, and 3-6 in the combined data CB1 are equivalent to the bits of the cells 1-4, 2-4, 3-4, 1-5, 2-5, 3-5, 1-6, 2-6, and 3-6 of the region Md' in the first binary data BQ1A, which include no specular reflection regions.

Specifically, in the fourth embodiment, the combination of the first binary data BQ1A and the second binary data BQ2A cell by cell allows at least one specular reflection region to be eliminated without detecting the at least one specular reflection region.

When the logical AND or logical OR operation between the bit of each cell in the first binary data and the bit of a corresponding one of the cells in the second binary data is completed in all rows and all columns (the determinations in steps S120 and S121 are affirmative), the control circuit 40 proceeds to step S126.

In step S126, the control circuit 40 decodes information stored in the QR code Q5 and indicated as the light (white) or dark (black) colored cells C thereof based on the bit 1 or 0 of each cell of the combined data CB or CB1.

Thereafter, the control circuit 40 sends the decoded information stored in the QR code Q5 to the host system as an example, exiting the operations of the information reader 10 in step S128.

As described above, in the information reader 10 according to the fourth embodiment, the control circuit 40 carries out logical combination between the bit of each cell in the first binary data BQ1A and the bit of a corresponding one of the cells in the second binary data BQ2A row by row and column by column in accordance with the logical combination rule T2 indicative of logical AND. This allows at least one specular reflection region contained in each of the first and second binary data BQ1A and BQ2A to be eliminated.

That is, in the fourth embodiment, the number of cells of the QR code Q5 is set to be extremely lower than the number of pixels (optoelectric transducers) of each of the first and second photodetectors 23A and 23B. Therefore, in the fourth embodiment, the combination task using the first and second binary data BQ1A and BQ2A can be carried out cell by cell.

For this reason, as compared with the image superimposing tasks being carried out pixel by pixel of each of first and second images of a target disclosed in the Patent Publication No. H02-98789 (third example), it is possible to simply eliminate a specular reflection region contained in each of the first and second images QI1A and QI2A, thus rapidly decoding information stored in the QR code Q5.

In addition, the first and second photodetectors 23A and 23B are configured such that their center axes XA and XB are arranged with the interval d1 therebetween to be shifted laterally from and parallely to the optical axes Xa and Xb of the first and second imaging lenses 27A and 27B. The arrangement of the first and second photodetectors 23A and 23B allows a specular reflection region contained in the first QR code image to be shifted in position from a specular reflection region contained in the second QR code image.

Accordingly, logical AND between the bit of each cell in the first binary data BQ1A and the bit of a corresponding one of the cells in the second binary data BQ2A cell by cell allows bits in the cells of a specular reflection region contained in one of the first and second binary data BQ1A and BQ2A to be replaced into those in the same cells of a corresponding region contained in the other of the first and second binary data BQ1A and BQ2A.

This makes it possible to eliminate the impact of specular reflection from the one of the first and second QR code images, thus properly reading the QR code Q5 even if a positional relationship between the target R and each of the first and second photodetectors 23A and 23B causes a specular reflection component to be contained in at least one of the first and second QR code images.

Note that, in the fourth embodiment, logical AND is carried out cell by cell between the bit of each cell in the black-and-white inverted first binary data BQ1A and the bit of a corresponding one of the cells in the black-and-white inverted second binary data BQ2A. The present invention is however not limited to the structure.

Specifically, logical AND is carried out cell by cell between the bit of each cell in the first binary data BQ1 obtained by the first image I1A and the bit of a corresponding one of the cells in the second binary data BQ2 obtained thereby, thus generating combined data. Thereafter, the black cells are turned into white cells and vice versa. This allows bits in the cells of a specular reflection region contained in one of the first and second binary data BQ1 and BQ2 to be replaced into those in the same cells of a corresponding region contained in the other of the first and second binary data BQ1 and BQ2.

Fifth Embodiment

An optical information reader according to a fifth embodiment of the present invention will be described hereinafter. Like reference characters are assigned to like parts in the optical information readers according to the first and fifth embodiments.

In the fifth embodiment, as schematically illustrated in FIG. 24, a reading unit 18A is composed of first, second, and third photodetectors 23A, 23B, and 23C, and first, second, and third imaging lenses 27A, 27B, and 27C.

For example, in the fifth embodiment, like the first embodiment, the first to third imaging lenses 27A to 27C are mounted on the one surface of the first circuit board 15 to be symmetrically disposed with reference to the center axis XC of the information reader 10 in parallel to the direction Y of the reading window 11a.

The first to third imaging lenses 27A to 27C are arranged such that their optical axes Xa to Xc are parallel to the center axis XC of the information reader 10.

The first to third photodetectors 23A to 23C are respectively mounted on the first circuit board 15 such that:

their pixel areas respectively face the first to third imaging lenses 27A to 27C;

their other surfaces are located on a virtual plane VP disposed orthogonal to their optical axes (center axes) of their pixel areas; and their optical axes are arranged with a predetermined interval therebetween to be shifted laterally from and parallely to the optical axes Xa to Xc of the first to third imaging lenses 27A to 27C.

The arrangement of the first to third photodetectors 23A to 23C and the first to third imaging lenses 27A to 27C allow predetermined FOVs FA to FC of the first to third photodetectors 23A to 23C to be superimposed on a virtual plane P1 (see FIG. 24).

In addition, a third amplifier 31C, a third clipping circuit 32C, a third A/D converter 33C, a third address generator 36C, and a third synchronous signal generator 38C are provided for the set of the third photodetector 23C and the third imaging lens 27C. The operations of the third amplifier 31C, third clipping circuit 32C, third A/D converter 33C, third address generator 36C, and third synchronous signal generator 38C are substantially identical to those of the first ampler 31A, first clipping circuit 32A, first A/D converter 33A, first address generator 36A, and first synchronous signal generator 38A.

Other structures of the optical information reader according to the fifth embodiment are substantially identical to those of the optical information reader 10 according to the first embodiment.

Operations of the information reader 10 according to the fifth embodiment, which are different from those of the reader according to the first embodiment, the third embodiment, or the fourth embodiment will be described hereinafter with reference to FIGS. 25 to 27 hereinafter.

Figure 25:
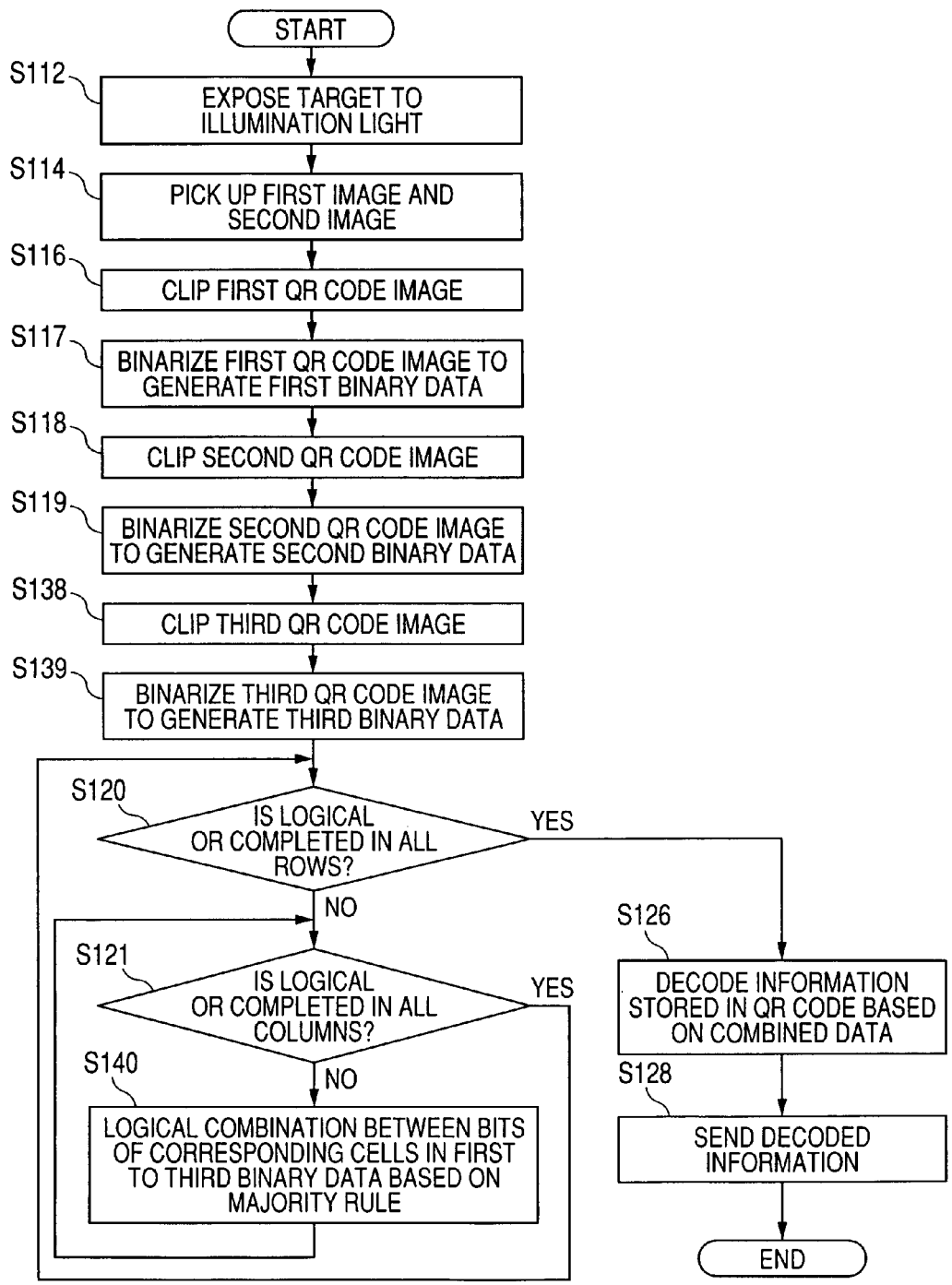
FIG. 25 is a flowchart schematically illustrating flow of reading operations of a QR code executable by an optical information reader according to the fifth embodiment of the present invention.

In the information reader 10 according to the fifth embodiment, the tasks in steps S112 and S114 of FIG. 25, which are identical to those in steps S112 to S119 of FIG. 14, are carried out by the information reader 10.

Especially, first to third images of the target R containing the QR code Q are simultaneously picked up by the optoelectric transducers of the first to third photodetectors 23A to 23C, respectively.

A corresponding one of the first to third images outputted from each of the first to third photodetectors 23A to 23C is amplified by a corresponding one of the first to third amplifiers 31A and 31C to be transferred to a corresponding one of the first to third clipping circuits 32A to 32C.

Moreover, the tasks in steps S116 to S119 of FIG. 25, which are identical to those in steps S116 to S119 of FIG. 14, are carried out by the information reader 10.

In addition, as well as the first image, the control circuit 40 controls the third clipping circuit 32C to clip a third QR code image QI3 corresponding to the QR code Q from the amplified third image outputted from the third amplifier 31C in step S138 in which the operations in step S16 (S16a to S16e) are carried out.

Subsequently, the control circuit 40 controls the third A/D converter 33C to execute a mapping task to thereby convert the third QR code image QI3 cell by cell into third binary data BQ3 of the QR code Q.

Like the first and second image data DQ1 and DQ2, as the third image data DQ3, the digital values of 13×13 cells each corresponding to one level of light intensity within the range from 0 level to 255 level can be obtained by the third A/D converter 33C.

In addition, in step S139, the control circuit 40 compares the digital value of each cell in the third image data DQ3 with the predetermined threshold value. This allows the digital value of each cell in the third image data DQ3 to be binarized so that the third binary data BQ3 is generated.

Specifically, when the digital value of one cell in the third image data DQ3 is equal to or higher than the predetermined threshold value, the digital value of the one cell in the third image data DQ3 is binarized to a bit of 0 as the one cell of the third binary data BQ3 corresponding to a white (light) pattern.

In contrast, when the digital value of one cell in the third image data DQ3 is lower than the predetermined threshold value, the digital value of the one cell in the third image data DQ3 is binarized to a binary bit of 1 of the one cell of the third binary data BQ3 corresponding to a black (dark) pattern.

The binary data of 1 or 0 of each cell of each of the first to third binary data BQ1 to BQ3 is stored in its corresponding unique address of the memory 35, this unique address is supplied from a corresponding one of the address generators 36A to 36C.

Figure 26:
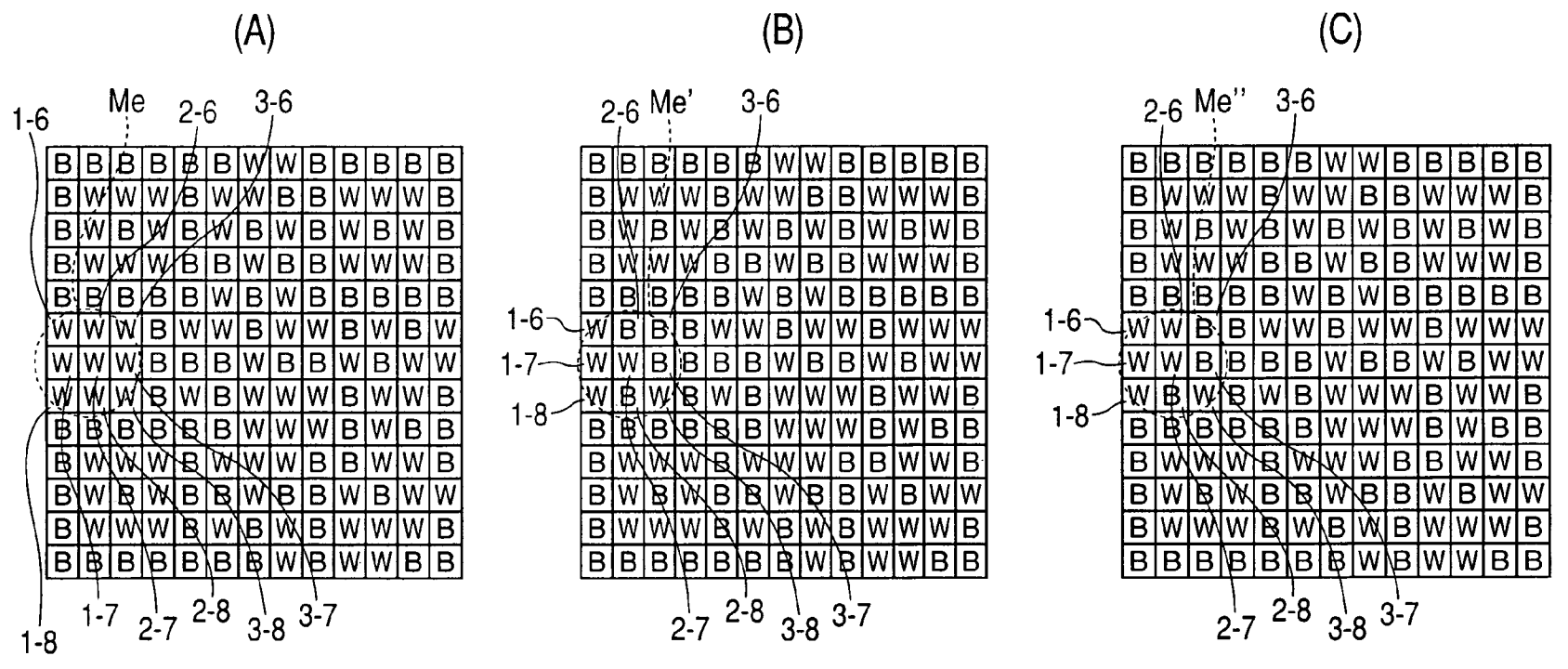

(A) to (C) of FIG. 26 schematically illustrate the first binary data BQ1 of 13×13 cells in rows and columns obtained based on the clipped first QR code image QI1 to the third binary data BQ3 of 13×13 cells in rows and columns obtained based on the clipped third QR code image QI3, respectively. In addition, (A) to (C) of FIG. 27 schematically illustrate part of cells in the first binary data BQ1 to that of cells in the third binary data BQ3, respectively.

Figure 27:
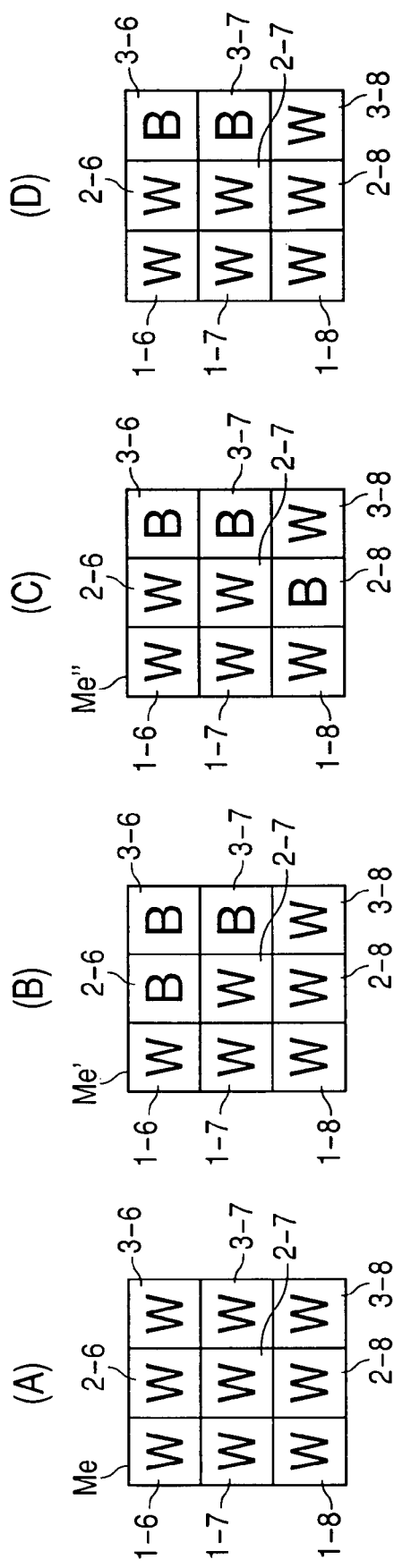
FIG. 27 is a view schematically illustrating binary digits assigned to cells in the first binary data, binary digits assigned to the same cells in the second binary data, binary digits assigned to the same cells in the third binary data, and binary digits assigned to the same cells of combined image data according to the fifth embodiment.

A bit of 0 to be assigned to some of cells in each of the first to third binary data BQ1 to BQ3 is illustrated in (A) to (C) of FIG. 26 and (A) to (C) of FIG. 27 as "W". Similarly, a bit of 1 to be assigned to some of cells in each of the first to third binary data BQ1 to BQ3 is illustrated in (A) to (C) of FIG. 26 and (A) to (C) of FIG. 27 as "B".

In the fifth embodiment, as illustrated in (A) of FIG. 26 and (A) of FIG. 27, it is assumed that the first binary data BQ1 is generated based on the first image I1 containing a specular reflection region Me so that cells 1-6, 2-6, 3-6, 1-7, 2-7, 3-7, 1-8, 2-8, and 3-8 in the binary data BQ1 correspond to the specular reflection region Me. As illustrated in (A) of FIG. 27, a bit of 0 (W) is assigned to each of the cell 1-6, 2-6, 3-6, 1-7, 2-7, 3-7, 1-8, 2-8, and 3-8 in the binary data BQ1 correspond to the specular reflection region Me.

In contrast, as illustrated in (B) of FIG. 27, bits of cells 1-6, 2-6, 3-6, 1-7, 2-7, 3-7, 1-8, 2-8, and 3-8 of a region Me' in the second binary data BQ2 corresponding to the specular reflection region Me are properly binarized.

Similarly, as illustrated in (C) of FIG. 27, bits of cells 1-6, 2-6, 3-6, 1-7, 2-7, 3-7, 1-8, 2-8, and 3-8 of a region Me" in the third binary data BQ3 corresponding to the specular reflection region Me are properly binarized.

Thus, the control circuit 40 executes logical combination between the bit of each cell in the first binary data BQ1, the bit of a corresponding one of the cells in the second binary data BQ2, and the bit of a corresponding one of the cells in the third binary data BQ3 row by row and column by column based on majority rule in steps S120, S121, and S140.

For example, in each of the cells 1-6, 2-6, 1-7, 2-7, 1-8, 2-8, and 3-8 among the first to third binary data BQ1 to BQ3, the bit (W) is decided based on majority rule. In contrast, in each of the remaining cells 3-6 and 3-7 among the first to third binary data BQ1 to BQ3, the bit (B) is decided based on majority rule.

Therefore, the cells 1-6, 2-6, 1-7, 2-7, 1-8, 2-8, and 3-8 to which the bit (W) is assigned and the remaining cells 3-6 and 3-7 to which the bit (B) is assigned are generated as combined data CB2.

Specifically, in the fifth embodiment, the combination of the first binary data BQ1 to the third binary data BQ3 cell by cell allows at least one specular reflection region to be eliminated without detecting the at least one specular reflection region.

When the logical combination between the bit of each cell in the first binary data BQ1, the bit of a corresponding one of the cells in the second binary data BQ2, and the bit of a corresponding one of the cells in the third binary data BQ3 based on majority rule is completed in all rows and all columns (the determinations in steps S120 and S121 are affirmative), the control circuit 40 proceeds to step S126.

In step S126, the control circuit 40 decodes information stored in the QR code Q and indicated as the light (white) or dark (black) colored cells C thereof based on the bit 1 or 0 of each cell of the combined data CB2.

Thereafter, the control circuit 40 sends the decoded information stored in the QR code Q to the host system as an example, exiting the operations of the information reader 10 in step S128.

As described above, in the information reader 10 according to the fifth embodiment, the control circuit 40 carries out logical combination between the bit of each cell in the first binary data BQ1, the bit of a corresponding one of the cells in the second binary data BQ2, and the bit of a corresponding one of the cells in the third binary data BQ3 row by row and column by column in accordance with the majority rule. This allows at least one specular reflection region contained in at least one of the first to third binary data BQ1 to BQ3 to be eliminated.

That is, in the fifth embodiment, the number of cells of the QR code Q is set to be extremely lower than the number of pixels (optoelectric transducers) of each of the first to third photodetectors 23A to 23C. Therefore, in the fifth embodiment, the combination task using the first to third binary data BQ1 to BQ3 can be carried out cell by cell.

For this reason, as compared with the image superimposing tasks being carried out pixel by pixel of each of first and second images of a target disclosed in the Patent Publication No. H02-98789 (third example), it is possible to simply eliminate a specular reflection region contained in each of the first to third images QI1 to QI3, thus rapidly decoding information stored in the QR code Q.

In the fifth embodiment, logical combination between the bit of each cell in the first binary data BQ1, the bit of a corresponding one of the cells in the second binary data BQ2, and the bit of a corresponding one of the cells in the third binary data BQ3 based on the majority rule cell by cell allows bits in the cells of a specular reflection region contained in one of the first to third binary data BQ1 to BQ3 to be replaced into those in the same cells of a corresponding region contained in another one of the first to third binary data BQ1 and BQ3.

This makes it possible to eliminate the impact of specular reflection from the one of the first to third QR code images, thus properly reading the QR code Q even if a positional relationship between the target R and each of the first to third photodetectors 23A to 23C causes a specular reflection component to be contained in at least one of the first to third QR code images.

Especially, calculation of the bit 1 or 0 of each cell of the combined data CB2 is carried out in accordance with majority rule using the first to third binary data BQ1 to BQ3 generated based on the first to third images picked up by the first to third photodetectors 23A to 23C, respectively. This makes it possible to further reliably read the QR code Q.

Sixth Embodiment

An optical information reader 10A according to a sixth embodiment of the present invention will be described hereinafter. The structure of the optical information reader 10A according to the sixth embodiment is substantially identical to that of the optical information reader 10 according to the first embodiment except for the structure of a reading unit and that of a circuit unit.

Thus, like reference characters are assigned to like parts in the optical information readers according to the first and sixth embodiments, and therefore, descriptions of the structure of the optical information reader according to the sixth embodiment are omitted.

Figure 28:
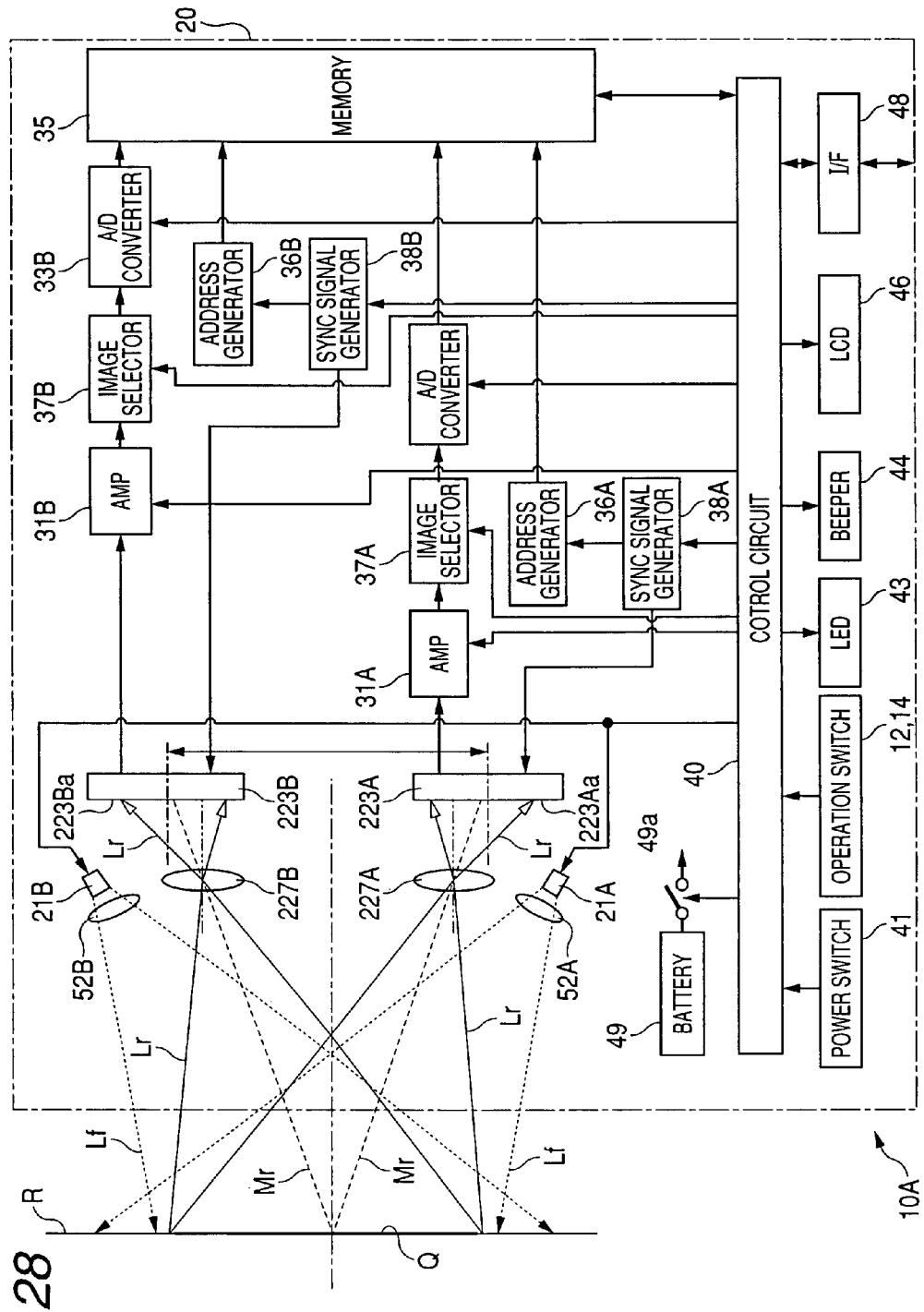
FIG. 28 is a block diagram schematically illustrating an example of the circuit structure of an optical information reader according to a sixth embodiment of the present invention.
Figure 29:
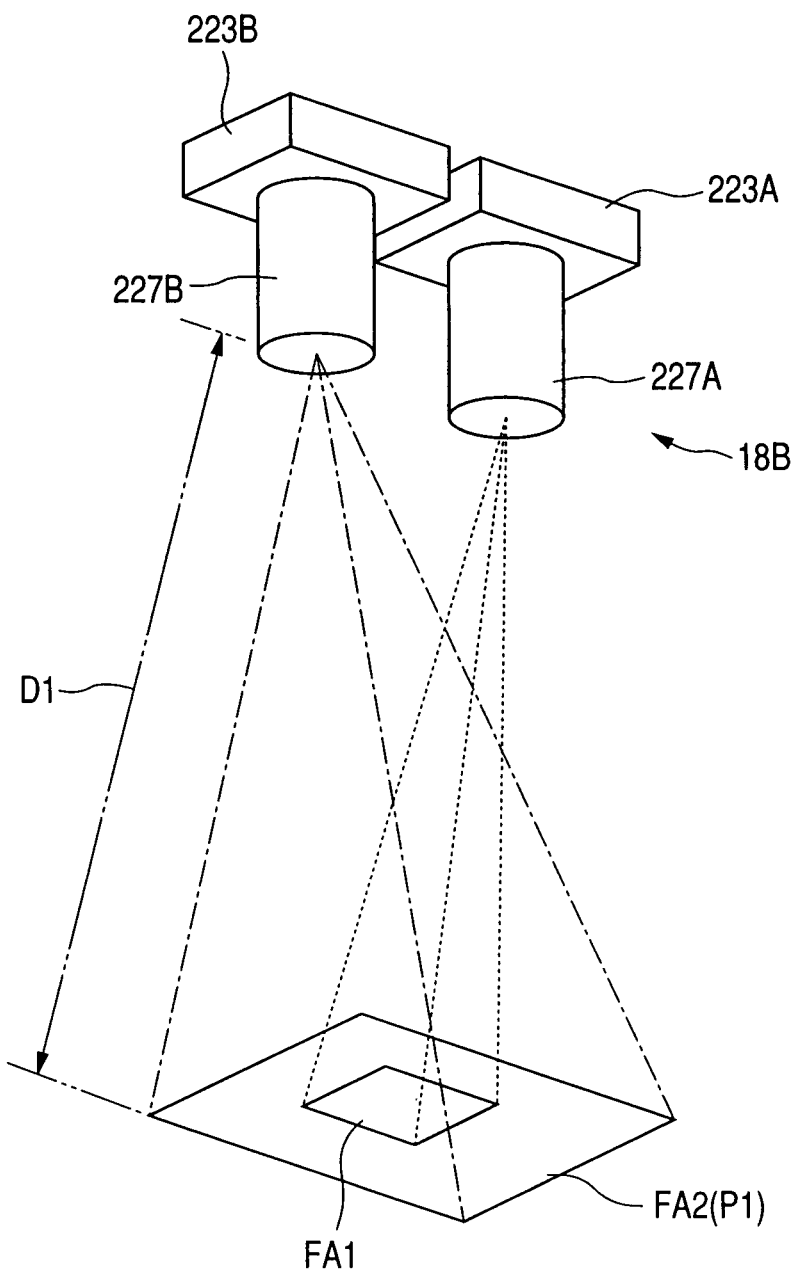
FIG. 29 is a perspective view schematically illustrating field of views of first and second photodetectors illustrated in FIG. 28.

As illustrated in FIGS. 2, 28 and 29, the reading unit 18B is composed of a pair of first and second photodetectors 223A and 223B and a pair of first and second imaging lenses 227A and 227B.

Each of the first and second photodetectors 223A and 223B is for example composed of a common two-dimensional image sensor, such as a CMOS image sensor, a CCD (Charge Coupled Device) image sensor, or the like. The structure of each the first and second photodetectors 223A and 223B is substantially identical to that of a corresponding one of the first and second photodetectors 23A and 23B, and therefore descriptions of which are omitted.

The structure of each of the first and second imaging lenses 227A and 227B is substantially identical to that of a corresponding one of the first and second imaging lenses 27A and 27B except for the angle of view thereof.

Specifically, the angle of view of the second imaging lens 227B is wider than that of view of the first imaging lens 227A.

Arrangement of the first and second photodetectors 223A and 223B and the first and second imaging lenses 227A and 227B is substantially identical to that of the first and second photodetectors 23A and 23B and the first and second imaging lenses 27A and 27B (see FIG. 2).

Thus, because the angle of view of the second imaging lens 227B is wider than that of view of the first imaging lens 227A, a predetermined FOV FB1 of the second photodetector 223B via the second imaging lens 227B is larger in size than a predetermined FOV FA1 of the first photodetector 223A via the first imaging lens 227A.

Specifically, as illustrated in FIG. 29, the arrangement of the first and second photodetectors 223A and 223B and the first and second imaging lenses 227A and 227B allow the FOV FA1 to be contained in the FOV FB1 of the second photodetector 223B on a virtual plane P1.

(A) of FIG. 30 schematically illustrates a first QR code image QI11A of a QR code Q1 being picked up by the FOV FA1 of the first photodetector 223A and first imaging lens 227A of the reading apparatus 10A. (B) of FIG. 30 schematically illustrates a first QR code image QI12A of a QR code Q2 being picked up by the first FOV FA1 of the first photodetector 223A and first imaging lens 227A of the reading apparatus 10A. The QR code Q2 is larger in size of each cell than the QR code Q1.

(C) of FIG. 30 schematically illustrates a second QR code image I11B of the QR code Q1 being picked up by the FOV FB1 of the second photodetector 223B and second imaging lens 227B of the reading apparatus 10A. (D) of FIG. 30 schematically illustrates a second QR code image I12B of the QR code Q2 being picked up by the FOV FB1 of the second photodetector 223B and second imaging lens 227B of the reading apparatus 10A.

As understood by comparison between (A) and (C) of FIG. 30, the number of pixels of the first photodetector 223A to which each cell of the first QR code image QI11A is assigned is greater than the number of pixels of the second photodetector 223B to which each cell of the second QR code image QI11B is assigned. This allows the whole of the QR code Q1 to be imaged without blurring occurring.

However, as illustrated in (B) of FIG. 30, because the area of the QR code image QI12A is larger than the FOV FA1 of the first photodetector 223A, it is difficult to properly read the QR code Q2.

As understood by comparison between (A) and (C) of FIG. 30, the QR code image QI11B is relatively smaller in size than the FOV FB1. For this reason, the number of pixels of the second photodetector 223B to which each cell of the second QR code image QI11B is assigned is lower than the number of pixels of the first photodetector 223A to which each cell of the first QR code image QI11A is assigned.

In contrast, as illustrated in (D) of FIG. 30, because the area of the QR code image QI12B is smaller than the FOV FB1 of the second photodetector 223B, it is properly and rapidly read the QR code Q2.

Accordingly, when the information reader 10A reads such a QR code Q1, the control circuit 40 is configured to use the first image data DQ1 of the QR code Q1 to be decoded.

In contrast, when the information reader 10A reads such a QR code Q2, the control circuit 40 is configured to use the second image data DQ2 of the QR code Q2 to be decoded.

Figure 31:
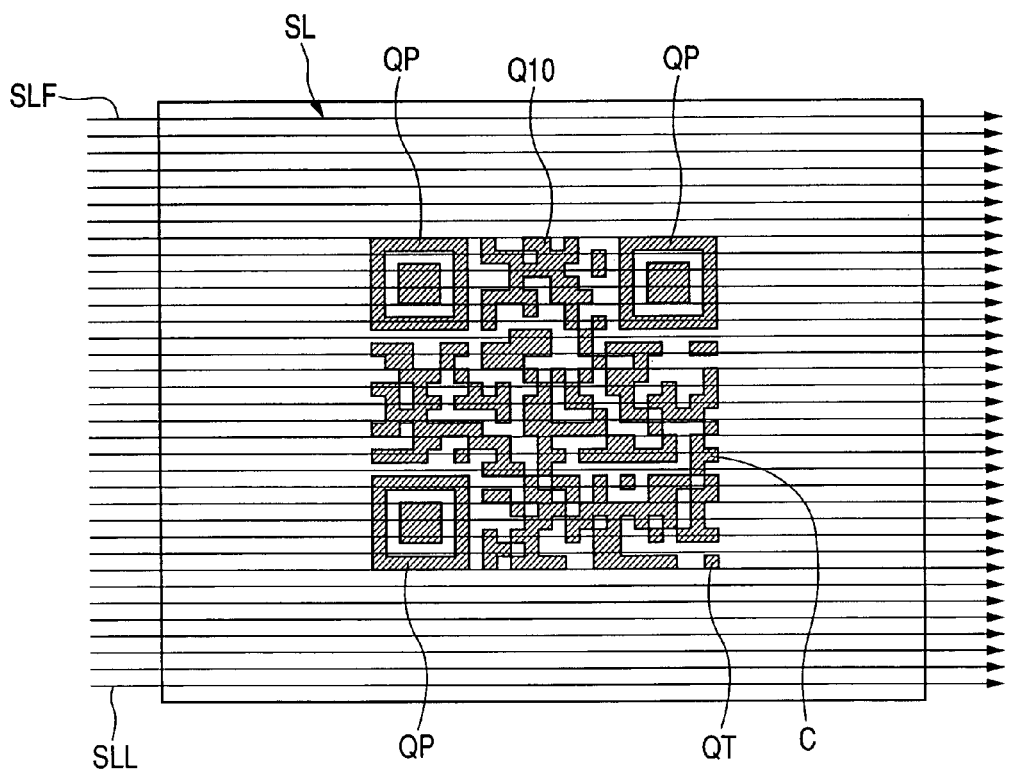
FIG. 31 is a view schematically illustrating a relationship between horizontal scanning lines of a photodetector and a QR code to be read according to the sixth embodiment.

The structure of a QR code Q10 to be readable by the information reader 10A is illustrated in FIG. 31.

The QR code Q10 has a substantially square shape with four apexes at its corners. The QR code Q10 is composed of three isolated positioning marks (finding patterns) QP, QP, QP disposed respectively at three corners of the QR code Q10.

The QR code Q10 is also composed of an apex detecting cell QT located at the remaining corner of the QR code Q, and of a data region QG arranged among the three isolated positioning marks QP, QP, QP and the apex detecting cell QT.

The QR code Q10 is constituted by the same number of vertical and horizontal cells C, for example, 21×21 cells.

Each cell C is selected from optically identifiable two kinds of cells. For example, in the sixth embodiment, one of the optically identifiable two kinds of cells is printed in black (dark) color whereas the other thereof is printed in white (light) color whose light reflectance is different from that of the black (dark) color (see FIG. 31).

Reference character SL denotes horizontal scanning lines, such as 512 scanning lines, of each of the first and second photodetectors 223A and 223B of the information reader 10A.

Specifically, the first scanning line SLF corresponds to the first row of the pixels in each of the first and second photodetectors 223A and 223B. The last scanning line SLL corresponds to the last row of the pixels in each of the first and second photodetectors 223A and 223B. The remaining horizontal scanning lines corresponds to the remaining rows of the pixels in each of the first and second photodetectors 223A and 223B, respectively.

In addition, the circuit unit 20A includes first and second decode image selectors 37A and 37B in place of the first and second clipping circuit 32A and 32B. Specifically, the first decode image selector 37A is electrically connected to the first amplifier 31A and the first A/D converter 33A and operative to select, as a target of decoding, at least one of the first and second images picked up by the first and second photodetectors 223A and 223B.

Next, operations of the information reader 10A according to the sixth embodiment will be described hereinafter.

When a user wants to read the QR code Q10 attached to the target R, the user locates the information reader 10A so that the reading window 11a is opposite to the target R and that the QR code Q10 is positioned within at least the FOV FB1 (see FIG. 29).

In this state, the user operates the operation switch 12 to turn it on. An instruction indicative of the turning on of the operation switch 12 is sent to the control circuit 40.

Figure 32:
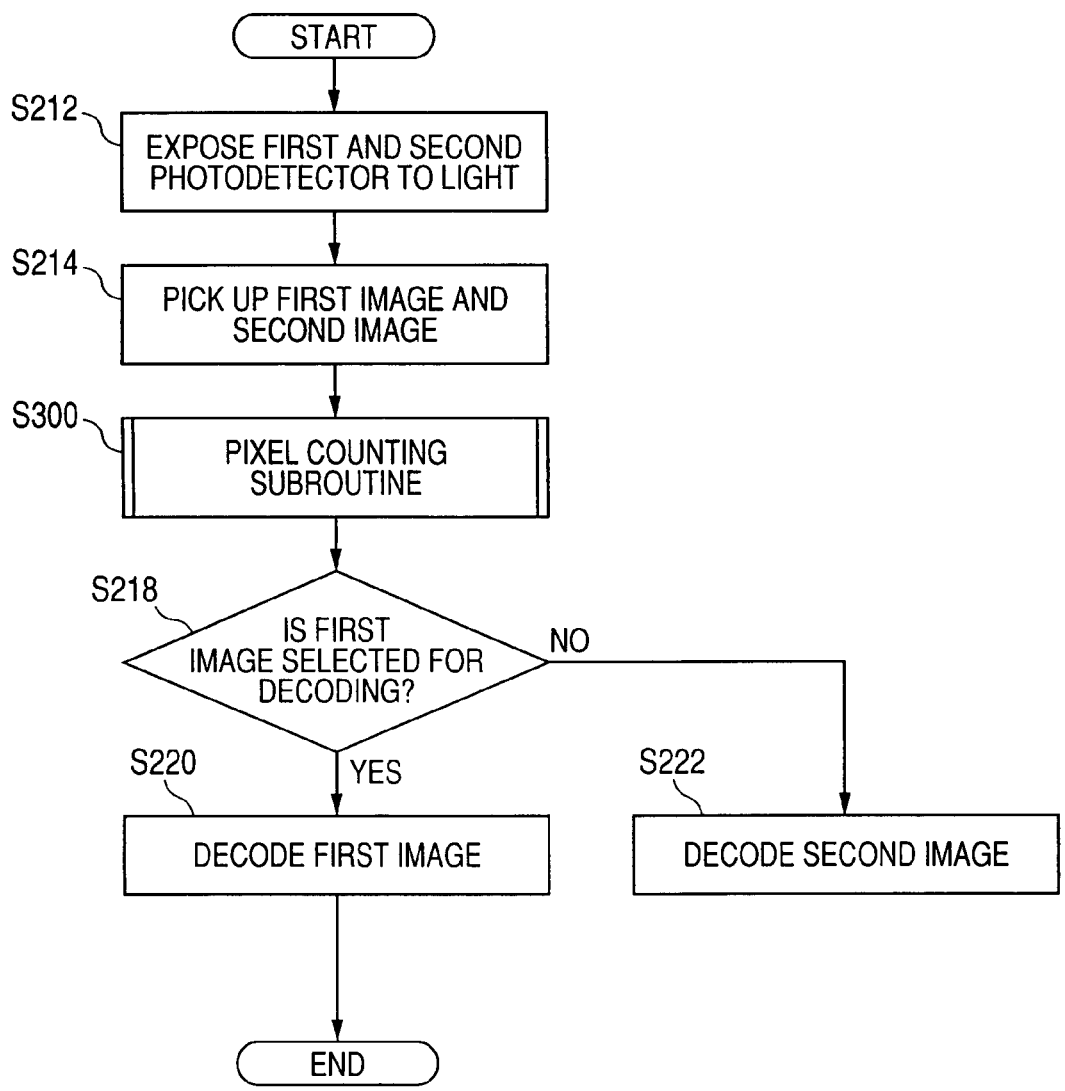
FIG. 32 is a flowchart schematically illustrating flow of reading operations of a QR code executable by an optical information reader according to the sixth embodiment of the present invention.

The control circuit 40 controls each of the first and second LEDs 21A and 21B to emit the red illumination light Lf toward the target R in step S212 of FIG. 32. This allows the target R containing the QR code Q10 to be exposed to the red illumination light emitted from each of the LEDs 21A and 21B via a corresponding one of the first and second collective lenses 52A and 52B and the reading window 11a in step S212.

While the target R containing the QR code Q10 is exposed to the red illumination light, light reflected from the target R containing the QR code Q10 based on the red illumination light is entered through the reading window 11a into each of the imaging lenses 227A and 227B. The reflected light entered into each of the imaging lenses 227A and 227B is focused on the pixel area of a corresponding one of the first and second photodetectors 223A and 223B.

During the reflected light being focused on the pixel area of each of the first and second photodetectors 223A and 223B, the optoelectric transducers of each of the first and second photodetectors 223A and 223B are simultaneously driven in step S214. As a result, first and second images of the target R containing the QR code Q10 are simultaneously picked up by the optoelectric transducers of the first and second photodetectors 223A and 223B, respectively.

A corresponding one of the first and second images is scanned horizontal-line by horizontal-line in each of the photodetectors 223A and 223B so that a corresponding one of the first and second images is sequentially output horizontal-line by horizontal-line.

The first and second image signals outputted from each of the first and second photodetectors 223A and 223B is amplified by a corresponding one of the first and second amplifiers 31A and 31B to be transferred to a corresponding one of the first and second decode image selectors 37A and 37B.

Next, under control of the control circuit 40, each of the first and second decode image selectors 37A and 37B executes a pixel counting subroutine in step S300.

Figure 33:
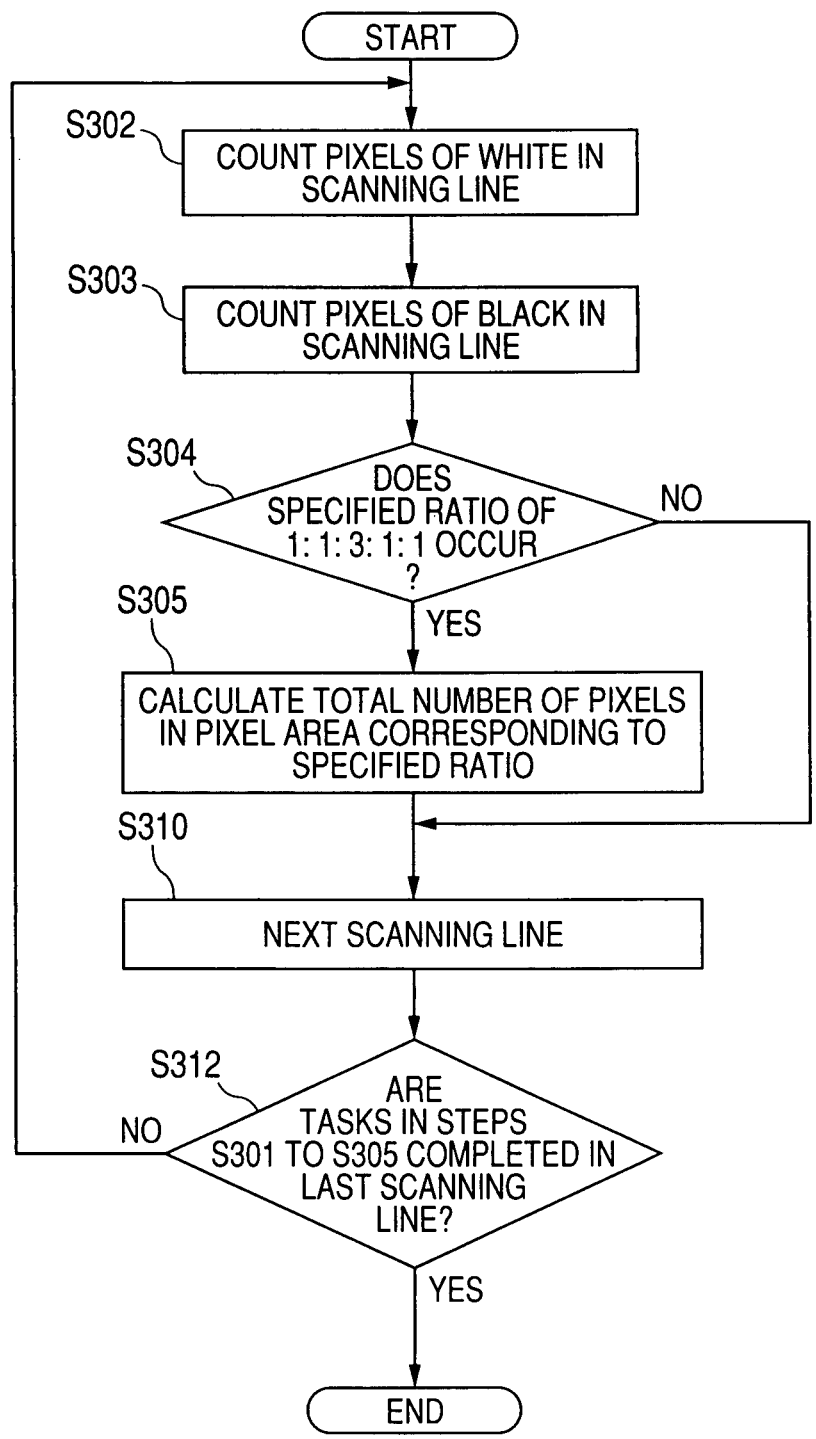
FIG. 33 is a flowchart schematically illustrating a pixel counting subroutine illustrated in FIG. 32.

FIG. 33 schematically illustrates the pixel counting subroutine.

Specifically, the first decode image selector 37A counts every time a pixel of the first image whose intensity level is higher than a predetermined threshold level appears in the first horizontal scanning line SLF in step S302; this pixel corresponds to a white (light) pixel.

In addition, the first decode image selector 37A counts every time a pixel of the first image whose intensity level is equal to or lower than the predetermined threshold level appears in the first horizontal scanning line SLF in step S303; this pixel corresponds to a black (dark) pixel.

Then, the first decode image selector 37A determines whether a ratio between the count value of first black pixels, the count value of first white pixels adjacent to the first black pixels, the count value of second black pixels adjacent to the first white pixels, the count value of second white pixels adjacent to the second black pixels, and the count value of third black pixels adjacent to the second white pixels of the first image in the first horizontal scanning line is equal to the specified ratio of 1:1:3:1:1 in step S304 (see FIGS. 7A and 7B).

When it is determined that the ratio in step S304 is not equal to the specified ratio of 1:1:3:1:1 over the first horizontal scanning line (the determination in step S304 is NO), the first decode image selector 37A proceeds to step S310.

Otherwise, when it is determined that the ratio in step S304 is equal to the specified ratio of 1:1:3:1:1 (the determination in step S304 is YES), the first decode image selector 37A identifies that a pixel area corresponding to the specified ratio of 1:1:3:1:1 in the first horizontal scanning line belongs to one of the positioning marks QP. Then, the first decode image selector 37A calculates the total number of pixels in the pixel area corresponding to the specified ratio of 1:1:3:1:1 in the first horizontal scanning line and adds the calculated total number of pixels to a criterion count value representing the number of pixels of at least part of the positioning makes QP appearing in the first image in step S305, going to step S310. Note that an initial value of the criteria count value is zero.

In step S310, the first decode image selector 37A goes to the next horizontal scanning line in step S310.

Next, in step S312, the first decode image selector 37A determines whether the tasks in steps S301 to S305 are completed in the last horizontal scanning line SLL. When it is determined that the tasks in steps S301 to S305 are not completed in the last horizontal scanning line SLL (the determination in step S312 is NO), the first decode image selector 37A returns to step S301 and repeats the tasks in step S301 to S305 in the next horizontal scanning line.

When it is determined that the tasks in steps S301 to S305 are completed in the last horizontal scanning line SLL (the determination in step S312 is YES), the first decode image selector 37A exits the pixel counting subroutine.

Simultaneously, the second decode image selector 37B executes the pixel counting subroutine illustrated in FIG. 33 for the second image sent thereto.

Returning to the main routine illustrated in FIG. 32 after completion of the pixel counting subroutine of each of the first and second decode image selectors, the control circuit 40 determines whether to select the first image to be decoded by determining whether the criterion count value for the first image is greater than that for the second image in step S218.

When it is determined that the criterion count value for the first image is greater than that for the second image (the determination in step S218 is YES), the control circuit 40 proceeds to step S220. In step S220, the control circuit 40 carries out the mapping task, the decoding task, and data output task illustrated in steps S18, S24, S26, and S28 using the first image picked up by the first photodetector 223A and the first imaging lens 227A.

Otherwise, when it is determined that the criterion count value for the first image is not greater than that for the second image (the determination in step S218 is NO), the control circuit 40 proceeds to step S222. In step S222, the control circuit 40 carries out the mapping task, the decoding task, and data output task illustrated in steps S18, S24, S26, and S28 using the second image picked up by the second photodetector 223B and the second imaging lens 227B.

As described above, the optical information reader 10A according to the sixth embodiment is configured to count the number of pixels belonging to at least one positioning mark QP appearing in each of the first and second images.

In addition, the optical information reader 10A is configured to select one of the first image and second image when the number of pixels belonging to at least one positioning mark QP appearing in one of the first and second images is greater than that of pixels belonging to at least one positioning mark QP appearing in the other of the first and second images.

This allows selection of one of the first and second photodetectors with a corresponding one of the first and second imaging lenses. The angle of view of the selected one of the first and second imaging lenses allows the finding patterns of the QR code Q10 to be properly imaged and the total area of the QR code Q10 to be properly imaged.

Thus, it is possible to reliably read both QR codes greater in size than normal QR codes and QR codes smaller in size than normal QR codes.

Especially, the optical information reader 10A according to the sixth embodiment is configured to count the number of pixels belonging to at least one positioning mark QP in each of the horizontal scanning lines; this at least one positioning mark QP appears in each of the first and second images.

This can identity the size of at least one finding pattern QP appearing in each of the first and second images without clipping at least one finding pattern, making it possible to rapidly select one of the first and second photodetectors with a corresponding one of the first and second imaging lenses having the angle of view suitable for reading QR codes with various sizes.

In the first embodiment, the pair of first and second photodetectors 23A and 23B are used, and in the second embodiment, the pair of first and second photodetectors 123A and 123B are used, but the present invention is not limited to the structure. Specifically a three or more photodetectors can be used in each of the first and second embodiments. In the fifth embodiment, a four or more photodetectors can be used.

In the sixth embodiment, the optical information reader 10A is designed to count the number of pixels belonging to at least one positioning mark QP in each of the horizontal scanning lines; this at least one positioning mark QP appears in each of the first and second images. The present invention is however limited to the structure.

Specifically, the optical information reader 10A can be designed to count the number of pixels belonging to at least one positioning mark QP in at least one of specified horizontal scanning lines; this at least one positioning mark QP appears in each of the first and second images. For example, the optical information reader 10A can be designed to count the number of pixels belonging to at least one positioning mark QP in every three scanning lines; this at least one positioning mark QP appears in each of the first and second images.

In the sixth embodiment, a three or more photodetectors can be used.

In the sixth embodiment, each of the first and second decode image selectors 37A and 37B are configured to count the number of pixels belonging to at least one positioning mark QP appearing in a corresponding one of the first and second images amplified by a corresponding one of the first and second amplifiers 31A and 31B.

However, the present invention is not limited to the structure.

Specifically, the control circuit 40 can be programmed to:

carry out the operations of the first image selector 37A based on first image data A/D converted from the first image by the first A/D converter 33A and stored in the memory 35; and carry out the operations of the second image selector 37B based on second image data A/D converted from the second image by the second A/D converter 33B.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. An apparatus for optically reading a graphic symbol composed of a plurality of optically identifiable unit sections of information, the apparatus comprising:

a first image pickup unit having a first photodetector and configured to pick up a first optical image of the graphic symbol based on light detected by the first photodetector;

a second image pickup unit having a second photodetector and configured to pick up a second optical image of the graphic symbol based on light detected by the second photodetector; and a correcting unit configured to replace a light intensity level of at least one section of one of the first and second optical images with a light intensity level of a corresponding section of the other of the first and second optical images to thereby correct the light intensity level of the at least one section of one of the first and second optical images, the at least one section corresponding to at least one of the unit sections of information of the graphic symbol, the unit sections being optically identifiable unit sections of information, the graphic symbol being composed of a plurality of the unit sections, the unit sections being optically identifiable unit sections of information, the graphic system being composed of a plurality of the unit sections, the unit sections being larger than pixels, the graphic symbol being composed of a plurality of the unit sections, each unit section being larger than a pixel, and wherein the apparatus decodes the 2d code by decoding each unit section.

2. An apparatus according to claim 1, wherein the light detected by the first photodetector corresponds to a target containing the graphic symbol, the first image pickup unit further comprises a first clip unit configured to clip the first optical image from a first image of the target based on the light detected by the first photodetector, the light detected by the second photodetector corresponds to the target containing the graphic symbol, and the second image pickup unit further comprises a second clip unit configured to clip the second optical image from a second image of the target based on the light detected by the second photodetector.

3. An apparatus according to claim 1, wherein the correcting unit further comprises:

a first converter configured to convert the light intensity level of each of sections of the first optical image into a digital value indicative of the light intensity level, each of the sections of the first optical image being assigned to a corresponding one of the unit sections of information in the graphic symbol;

a second converter configured to convert the light intensity level of each of sections of the second optical image into a digital value indicative of the light intensity level, each of the sections of the second optical image being assigned to a corresponding one of the unit sections of information in the graphic symbol; and a replacing unit configured to replace the digital value of at least one section of one of the first and second optical images into the digital value of at least one section of the other of the first and second optical images.

4. An apparatus according to claim 1, wherein the correcting unit further comprises:

a first converter configured to convert the light intensity level of each of sections of the first optical image into a bit of 0 representing white or 1 representing black, each of the sections of the first optical image being assigned to a corresponding one of the unit sections of information in the graphic symbol;

a second converter configured to convert the light intensity level of each of sections of the second optical image into a bit of 0 representing white or 1 representing black, each of the sections of the second optical image being assigned to a corresponding one of the unit sections of information in the graphic symbol; and a combining unit configured to combine the bit of at least one section of one of the first and second optical images with the bit of a corresponding at least one section of the other of the first and second optical images.

5. An apparatus according to claim 4, wherein the combining unit is configured to execute logical OR between the bit of at least one section of one of the first and second optical images and the bit of a corresponding at least one section of the other of the first and second optical images.

6. An apparatus according to claim 1, further comprising:

a third image pickup unit having a third photodetector and configured to pick up a third optical image of the graphic symbol based on light detected by the third photodetector, and the correcting unit further comprises:

a first converter configured to convert the light intensity level of each of sections of the first optical image into a bit of 0 representing white or 1 representing black, each of the sections of the first optical image being assigned to a corresponding one of the unit sections of information in the graphic symbol;

a second converter configured to convert the light intensity level of each of sections of the second optical image into a bit of 0 representing white or 1 representing black, each of the sections of the second optical image being assigned to a corresponding one of the unit sections of information in the graphic symbol;

a third converter configured to convert the light intensity level of each of sections of the third optical image into a bit of 0 representing white or 1 representing black, each of the sections of the third optical image being assigned to a corresponding one of the unit sections of information in the graphic symbol; and a combining unit configured to combine the bit of at least one section of one of the first to third optical images, the bit of a corresponding at least one section of another one of the first to third optical images, and the bit of a corresponding at least one section of the remaining one of the first to third optical images based on majority rule.

7. An apparatus according to claim 1, the optically identifiable unit section comprising plural pixels.

8. An apparatus for optically reading a graphic symbol composed of a plurality of optically identifiable unit sections of information, the apparatus comprising:
- a first image pickup unit having a first photodetector and configured to pick up a first optical image of the graphic symbol based on light detected by the first photodetector;
- a second image pickup unit having a second photodetector and configured to pick up a second optical image of the graphic symbol based on light detected by the second photodetector;
- a correcting unit configured to replace a light intensity level of at least one section of one of the first and second optical images with a light intensity level of a corresponding section of the other of the first and second optical images to thereby correct the light intensity level of the at least one section of one of the first and second optical images, the at least one section corresponding to at least one of the unit sections of information of the graphic symbol, the unit sections being optically identifiable unit sections of information, the graphic symbol being composed of a plurality of the unit sections; and
- a determining unit configured to determine whether a specular reflection region is contained in one of the first and second optical images based on the light intensity levels of the sections of one of the first and second optical images, the determining unit being configured to, upon being determined that a specular reflection region is contained in one of the first and second optical images, detect one or more sections of one of the first and second optical images where the specular reflection region is located, wherein the correcting unit is configured to replace light intensity levels of the one or more sections of one of the first and second optical images with light intensity levels of corresponding one or more sections of the other of the first and second optical images the graphic symbol being composed of a plurality of the unit sections, each unit section being larger than a pixel, and wherein the apparatus decodes the 2d code by decoding each unit section.

9. An apparatus for optically reading a graphic symbol composed of a plurality of optically identifiable unit sections of information the apparatus comprising:
- a first image pickup unit having a first photodetector and configured to pick up a first optical image of the graphic symbol based on light detected by the first photodetector;
- a second image pickup unit having a second photodetector and configured to pick up a second optical image of the graphic symbol based on light detected by the second photodetector;
- a correcting unit configured to replace a light intensity level of at least one section of one of the first and second optical images with a light intensity level of a corresponding section of the other of the first and second optical images to thereby correct the light intensity level of the at least one section of one of the first and second optical images, the at least one section corresponding to at least one of the unit sections of information of the graphic symbol, the unit sections being optically identifiable unit sections of information, the graphic symbol being composed of a plurality of the unit sections,
- wherein the correcting unit further comprises:
  - a first converter configured to convert the light intensity level of each of sections of the first optical image into a bit of 0 representing white or 1 representing black, each of the sections of the first optical image being assigned to a corresponding one of the unit sections of information in the graphic symbol;
  - a second converter configured to convert the light intensity level of each of sections of the second optical image into a bit of 0 representing white or 1 representing black, each of the sections of the second optical image being assigned to a corresponding one of the unit sections of information in the graphic symbol; and
  - a combining unit configured to combine the bit of at least one section of one of the first and second optical images with the bit of a corresponding at least one section of the other of the first and second optical images;
- wherein the first and second optical images are respectively originally reversal first and second optical images in which dot-marked portions of the graphic symbol are colored in white and dot-unmarked portions thereof are colored in black, the first converter is configured to convert the light intensity level of each of sections of the originally reversal first optical image into a bit of 0 representing white or 1 representing black to thereby generate first binary data, each of the sections of the originally reversal first optical image being assigned t a corresponding one of the unit sections of information in the graphic symbol; the second converter is configured to convert the light intensity level of each of sections of the originally reversed second optical image into a bit of 0 representing white or 1 representing black to thereby generate second binary data, each of the sections of the second optical image being assigned to a corresponding one of the unit sections of information in the graphic symbol; and the combining unit is configured to:
- invert the bit of each of the sections of the one of the first and second binary data such that some of sections of bit of 1 of the first binary data are turned to sections of bit of 0 and vice versa; and
- execute logical AND between the bit of at least one of the inverted sections of one of the first and second binary data and the bit of a corresponding at least one of the inverted sections of the other of the first and second binary data the graphic symbol being composed of a plurality of the unit sections, each unit section being larger than a pixel, and wherein the apparatus decodes the 2d code by decoding each unit section.

10. An apparatus for optically reading a graphic symbol composed of a plurality of optically identifiable unit sections of information, the apparatus comprising:
- a first image pickup unit having a first imaging optics and a first photodetector optically coupled thereto, the first imaging optics and the first photodetector having a predetermined first field of view, the first image pickup unit being configured to pick up a first optical image of the graphic symbol based on light transferred from the graphic symbol located within the first field of view;
- a second image pickup unit having a second imaging optics and a second photodetector optically coupled thereto, the second imaging optics and the second photodetector having a predetermined second field of view, the second image pickup unit being configured to pick up a second optical image of the graphic symbol based on light transferred from the graphic symbol located within the second field of view, the first imaging optics, the first photodetector, the second imaging optics, and the second photodetector being optically arranged such that the first field of view and the second field of view are substantially overlapped with each other; and a correcting unit configured to replace a light intensity level of at least one section of one of the first and second optical images with a light intensity level of a corresponding section of the other of the first and second optical images to thereby correct the light intensity level of the at least one section of one of the first and second optical images, the at least one section corresponding to at least one of the unit sections of information of the graphic symbol, the unit sections being optically identifiable unit sections of information, the graphic symbol being composed of a plurality of the unit sections, the unit sections being optically identifiable unit sections of information, the graphic symbol being composed of a plurality of the unit sections, the unit sections being larger than pixels, the graphic symbol being composed of a plurality of the unit sections, each unit section being larger than a pixel, and wherein the apparatus decodes the 2d code by decoding each unit section.

11. An apparatus according to claim 10, wherein the first and second imaging optics have a first optical axis and a second optical axis, respectively, the first and second photodetectors have first and second light sensitive areas, respectively, the light sensitive areas being substantially symmetric with respect to first and second axes, respectively, the first and second photodetectors are arranged such that the first light sensitive area and the second light sensitive area are located on a common virtual plane, the common virtual plane being orthogonal to the first and second axes of the first and second photodetectors, and the first optical axis of the first imaging optics, the second optical axis of the second imaging optics, the first axis of the first photodetector, and the second axis of the second photodetector being unaligned with each other.

12. An apparatus according to claim 11, wherein the first and second photodetectors are arranged such that:
their light sensitive areas respectively face the first imaging optics and second imaging optics; and
their first and second axes are arranged with a predetermined interval therebetween to be shifted laterally from and parallely to the first and second optical axes of the first and second imaging optics.

13. An apparatus according to claim 10, wherein the at least one section of one of the first and second optical images and the at least one section of the other thereof correspond to at least one of the unit sections of information of the graphic symbol.

14. An apparatus according to claim 13, wherein the light detected by the first photodetector corresponds to a target containing the graphic symbol, the first image pickup unit further comprises a first clip unit configured to clip the first optical image from a first image of the target based on the light detected by the first photodetector, the light detected by the second photodetector corresponds to the target containing the graphic symbol, and the second image pickup unit further comprises a second clip unit configured to clip the second optical image from a second image of the target based on the light detected by the second photodetector.

15. An apparatus according to claim 13, wherein the correcting unit further comprises:
a first converter configured to convert the light intensity level of each of sections of the first optical image into a digital value indicative of the light intensity level, each of the sections of the first optical image being assigned to a corresponding one of the unit sections of information in the graphic symbol;
a second converter configured to convert the light intensity level of each of sections of the second optical image into a digital value indicative of the light intensity level, each of the sections of the second optical image being assigned to a corresponding one of the unit sections of information in the graphic symbol; and
a replacing unit configured to replace the digital value of at least one section of one of the first and second optical images into the digital value of at least one section of the other of the first and second optical images.

16. An apparatus according to claim 10, the optically identifiable unit section comprising plural pixels.

17. An apparatus for optically reading a graphic symbol composed of a plurality of optically identifiable unit sections of information, the apparatus comprising:
a first image pickup unit having a first imaging optics and a first photodetector optically coupled thereto, the first imaging optics and the first photodetector having a predetermined first field of view, the first image pickup unit being configured to pick up a first optical image of the graphic symbol based on light transferred from the graphic symbol located within the first field of view;
a second image pickup unit having a second imaging optics and a second photodetector optically coupled thereto, the second imaging optics and the second photodetector having a predetermined second field of view, the second image pickup unit being configured to pick up a second optical image of the graphic symbol based on light transferred from the graphic symbol located within the second field of view, the first imaging optics, the first photodetector, the second imaging optics, and the second photodetector being optically arranged such that the first field of view and the second field of view are substantially overlapped with each other;
a correcting unit configured to replace a light intensity level of at least one section of one of the first and second optical images with a light intensity level of a corresponding section of the other of the first and second optical images to thereby correct the light intensity level of the at least one section of one of the first and second optical images, the at least one section corresponding to at least one of the unit sections of information of the graphic symbol, the unit sections being optically identifiable unit sections of information, the graphic symbol being composed of a plurality of the unit sections, wherein the at least one section of one of the first and second optical images and the at least one section of the other thereof correspond to at least one of the unit sections of information of the graphic symbol; and
a determining unit configured to determine whether a specular reflection region is contained in one of the first and second optical images based on the light intensity levels of the sections of one of the first and second optical images, the determining unit being configured to, upon being determined that a specular reflection region is contained in one of the first and second optical images, detect one or more sections of one of the first and second optical images where the reflection region is located, wherein the correcting unit is configured to replace light intensity levels of the one or more sections of one of the first and second optical images into light intensity levels of corresponding one or more sections of the other of the first and second optical images the graphic symbol being composed of a plurality of the unit sections, each unit section being larger than a pixel, and wherein the apparatus decodes the 2d code by decoding each unit section.

18. An apparatus according to claim 17, wherein the determining unit is configured to determine that a specular reflection region is contained in one of the first and second optical images when the light intensity levels of the sections of one of the first and second optical images are set to a maximum level.

19. An apparatus for optically reading a graphic symbol composed of a plurality of optically identifiable unit sections of information, at least one of the unit sections represents a position detecting pattern, the apparatus comprising:

a first image pickup unit having a first imaging optics and a first photodetector optically coupled thereto, the first imaging optics having a predetermined first angle of view, the first image pickup unit being configured to pick up a first optical image of the graphic symbol based on light transferred from the graphic symbol via the first imaging optics and detected by the first photodetector;

a second image pickup unit having a second imaging optics and a second photodetector optically coupled thereto, the second imaging optics having a predetermined second angle of view different in size from the first angle of view, the second image pickup unit being configured to pick up a second optical image of the graphic symbol based on light transferred from the graphic symbol via the second angle of view and detected by the second photodetector, the first imaging optics, the first photodetector, and the second imaging optics being optically aligned such that a first field of view of the first photodetector and a second field of view of the second photodetector are substantially overlapped with each other; and a decoding unit configured to select one of the first optical image and the second optical image based on a difference between the position detecting pattern contained in the first optical image and the position detecting pattern contained in the second optical image, and to decode information of the unit sections of the graphical symbol based on the selected one of the first optical image and the second optical image the graphic symbol being composed of a plurality of the unit sections, each unit section being larger than a pixel, and wherein the apparatus decodes the 2d code by decoding each unit section.

20. An apparatus according to claim 19, wherein each of the first and second photodetectors has a plurality of light sensitive pixels arranged in rows and columns, the first optical image corresponds to a light intensity level of each pixel, the second optical image corresponds to a light intensity level of each pixel, and the decoding unit is configured to:

count the number of pixels in each row of the first optical image, the pixels corresponding to the position detecting pattern;

count the number of pixels in each row of the second optical image, the pixels corresponding to the position detecting pattern; and select one of the first optical image and the second optical image when the number of pixels of one of the first optical image and the second optical image is greater than the number of pixels of the other thereof.

* * * * *